United States Patent
Naito

(10) Patent No.: US 8,080,332 B2
(45) Date of Patent: *Dec. 20, 2011

(54) BATTERY PACK INCLUDING CYLINDRICAL CELLS ARRANGED IN TWO ROWS AND TWO LAYERS

(75) Inventor: Masakazu Naito, Fukushima (JP)

(73) Assignee: Sony Corporation, Tokyo (JP)

( * ) Notice: Subject to any disclaimer, the term of this patent is extended or adjusted under 35 U.S.C. 154(b) by 643 days.

This patent is subject to a terminal disclaimer.

(21) Appl. No.: 12/104,571

(22) Filed: Apr. 17, 2008

(65) Prior Publication Data

US 2008/0305390 A1    Dec. 11, 2008

(30) Foreign Application Priority Data

May 16, 2007   (JP) .................... 2007-130884

(51) Int. Cl.
*H01M 6/42* (2006.01)
*H01M 10/16* (2006.01)
*H01M 10/48* (2006.01)
*H01M 2/24* (2006.01)
*H01M 2/10* (2006.01)

(52) U.S. Cl. ............. 429/159; 429/7; 429/92; 429/160; 429/208

(58) Field of Classification Search .............. 429/100, 429/159, 158, 156, 92, 99, 1, 7, 160, 208; 320/111, 113, 112, 2; 340/870.02
See application file for complete search history.

(56) References Cited

U.S. PATENT DOCUMENTS

| | | | | |
|---|---|---|---|---|
| 4,247,603 A | * | 1/1981 | Leffingwell et al. | 429/1 |
| 5,448,151 A | * | 9/1995 | Ganse et al. | 320/107 |
| 5,635,814 A | * | 6/1997 | Afzal et al. | 320/111 |
| 6,111,519 A | * | 8/2000 | Bloss et al. | 340/870.02 |
| 6,380,713 B2 | * | 4/2002 | Namura | 320/112 |
| 7,141,330 B2 | | 11/2006 | Aoyama | |
| 2005/0031945 A1 | * | 2/2005 | Morita et al. | 429/158 |
| 2005/0118463 A1 | * | 6/2005 | Okachi et al. | 429/7 |
| 2005/0202315 A1 | * | 9/2005 | Sugeno et al. | 429/156 |

FOREIGN PATENT DOCUMENTS

JP   2003-257388   9/2003

OTHER PUBLICATIONS

U.S. Appl. No. 12/101,671, filed Apr. 11, 2008, Naito.

* cited by examiner

*Primary Examiner* — Jonathan Crepeau
*Assistant Examiner* — Kenneth Douyette
(74) *Attorney, Agent, or Firm* — Oblon, Spivak, McClelland, Maier & Neustadt, L.L.P.

(57) ABSTRACT

A battery pack includes a roughly rectangular casing, a main circuit board disposed at a bottom surface of the casing, and cylindrical battery cells arranged in two rows and two layers over the main circuit board and connected in series.

5 Claims, 35 Drawing Sheets

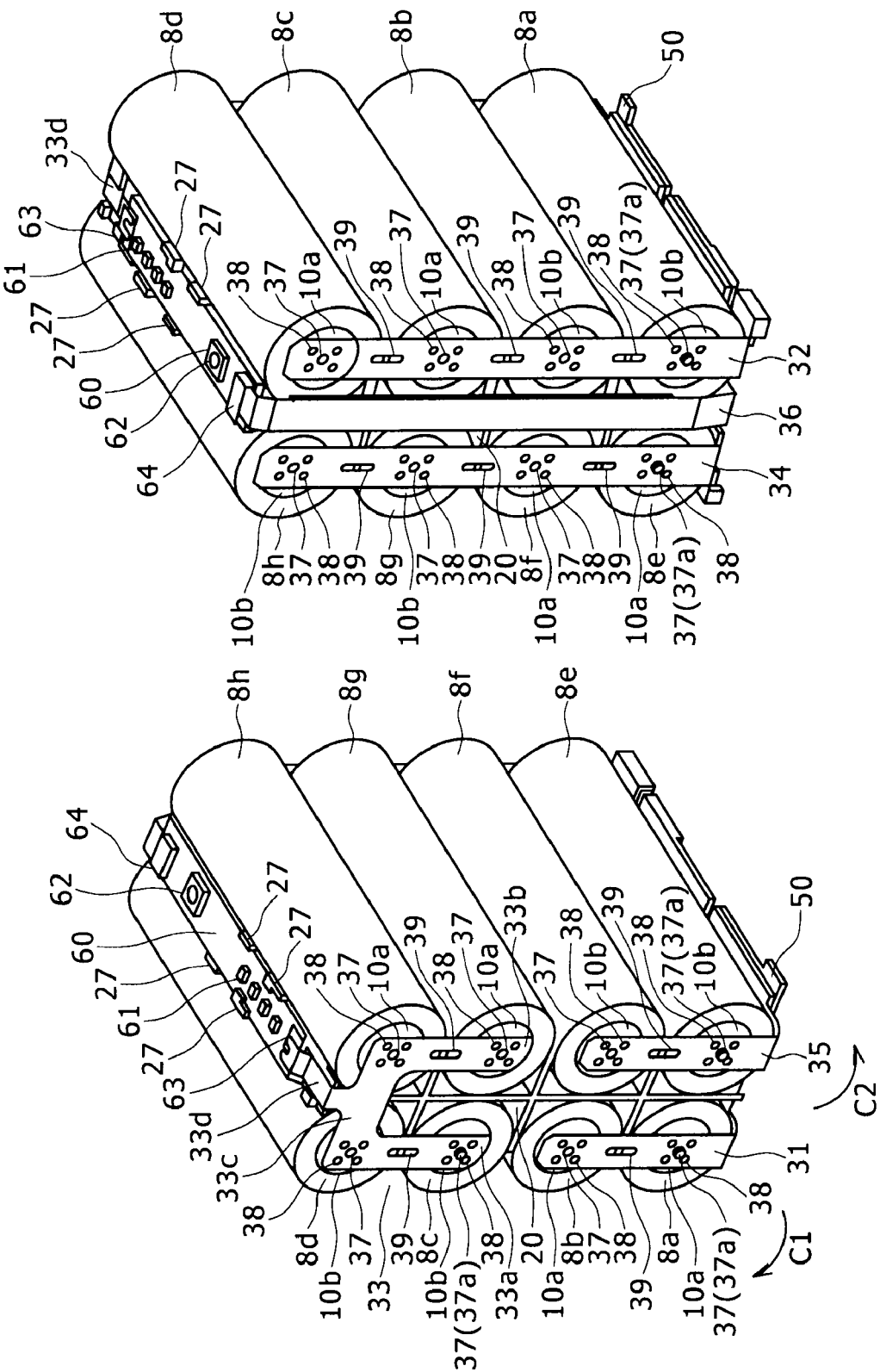

BATTERY PACK INCLUDING CYLINDRICAL CELLS ARRANGED IN TWO ROWS AND TWO LAYERS

CROSS REFERENCES TO RELATED APPLICATIONS

The present invention contains subject matter related to Japanese Patent Application JP 2007-130884 filed in the Japan Patent Office on May 16, 2007, the entire contents of which being incorporated herein by reference.

BACKGROUND OF THE INVENTION

1. Field of the Invention

The present invention relates to a battery pack in which four cylindrical battery cells are arranged in two rows and two layers and are connected in series.

2. Description of the Related Art

A battery pack includes a plurality of cylindrical battery cells, electrode tabs for electrically connecting terminals of the battery cells arranged in a certain pattern, a lower case for containing the battery cells electrically connected through the electrode tabs, and an upper cover for covering the lower case containing the battery cells therein, and is detachably attached to an electronic apparatus such as a video camera for private use, to be used as a power source for the private-use electronic apparatus (refer to Japanese Patent Laid-Open No. 2003-257388).

Battery packs to be used in electronic apparatuses such as video cameras for private use according to the related art needs a rated voltage of about 7.2 V. Meanwhile, a battery cell composed of a cylindrical lithium ion secondary cell, for example, has a rated voltage of about 3.6 V. In the related art, therefore, in order to realize the rated voltage of about 7.2 V, four such battery cells are arranged in two rows and two layers, the battery cells in each set of paired battery cells are connected in parallel through a main circuit board, and the two sets of the parallel-connected paired battery cells are sequentially connected in series.

However, the so-called S-size battery packs composed by use of four battery cells do not include those for use in electronic apparatuses for business use, i.e., those which realize the rated voltage of about 14.4 V. Therefore, there has been a request for an S-size battery pack which is lighter in weight than the so-called L-size battery pack composed by use of eight battery cells according to the related art, and which realizes the rated voltage of about 14.4 V suitable for use as a power source for business-use electronic apparatuses.

SUMMARY OF THE INVENTION

Thus, there is a need for a battery pack in which battery cells are arranged in two rows and two layers and which can be used in an electronic apparatus for business use.

In order to fulfill the above need, according to an embodiment of the present invention, there is provided a battery pack including a roughly rectangular casing, a main circuit board disposed at a bottom surface of the casing, and cylindrical battery cells arranged in two rows and two layers over the main circuit board and connected in series, the battery pack including: a first battery cell having a positive electrode terminal disposed in the vicinity of a positive electrode terminal connection part of the main circuit board provided with the positive electrode terminal connection part on one side thereof and with a negative electrode terminal connection part on the other side thereof; a second battery cell disposed over the first battery cell in the state of having a negative electrode terminal directed to the side to which a positive electrode terminal of the first battery cell is directed; a third battery cell having a negative electrode terminal disposed at the negative electrode terminal connection part of the main circuit board; a fourth battery cell disposed over the third battery cell in the state of having a positive electrode terminal directed to the side to which the negative electrode terminal of the third battery cell is directed; the positive electrode terminal connection part of the main circuit board and the positive electrode terminal of the first battery cell being electrically connected to each other through a first electrode tab; a negative electrode terminal of the first battery cell and a positive electrode terminal of the second battery cell being electrically connected to each other through a second electrode tab; a negative electrode terminal of the second battery cell and a positive electrode terminal of the fourth battery cell being electrically connected to each other through a third electrode tab; a positive electrode terminal of the third battery cell and a negative electrode terminal of the fourth battery cell being electrically connected to each other through a fourth electrode tab; and the negative electrode terminal of the fourth battery cell and the negative electrode terminal connection part of the main circuit board being electrically connected to each other through a fifth electrode tab.

According to the above embodiment of the present invention, the four battery cells are contained in two rows and two layers and they are connected in series, thereby rendering the battery pack applicable to use in business-use electronic apparatuses.

BRIEF DESCRIPTION OF THE DRAWINGS

FIGS. 1A and 1B are perspective views of an L-size battery pack based on the present invention, wherein FIG. 1 is a front side perspective view and FIG. 1B is a back side perspective view;

FIGS. 3A and 3B are perspective views of an S-size battery pack based on the invention, wherein FIG. 3A is a front side perspective view and FIG. 3B is a back side perspective view;

FIGS. 7A and 7B are perspective views of a battery cell, wherein FIG. 7A is a front side perspective view and FIG. 7B is a back side perspective view;

FIGS. 8A and 8B are perspective views of battery cells arranged in two rows and four layers, wherein FIG. 8A is a front side perspective view and FIG. 8B is a back side perspective view;

FIGS. 11A and 11B are side views of a partition member, wherein FIG. 11A is a right side view and FIG. 11B is a left side view;

FIGS. 14A and 14B are horizontal sectional views of the partition member, wherein FIG. 14A is a sectional view taken along line D-D of FIG. 11A and FIG. 14B is a sectional view taken along line E-E of FIG. 11A;

FIGS. 16A and 16B are vertical sectional views of the partition member, wherein FIG. 16A is a sectional view taken along line F-F of FIG. 11A and FIG. 16B is a sectional view taken along line G-G of FIG. 11A;

FIGS. 17A and 17B are perspective view of an essential part of reinforcing ribs of the partition member, wherein FIG. 17A is an essential part perspective view of the reinforcing ribs formed correspondingly to the positive electrode terminal side of the battery cells and FIG. 17B is an essential part perspective view of the reinforcing ribs formed correspondingly to the negative electrode terminal side of the battery cells;

FIGS. 25A and 25B show the terminal case connected to battery cells and a main circuit board, wherein FIG. 25A is a front view and FIG. 25B is a bottom view;

FIGS. 29A to 29C are a plan view and sectional views of an upper cover, wherein FIG. 29A is the plan view of the upper cover, FIG. 29B is a vertical sectional view along the major edge direction of the upper cover and FIG. 29C is a vertical sectional view along the minor edge direction of the lower case;

FIGS. 30A to 30C are a plan view and sectional views of the lower case, wherein FIG. 30A is the plan view of the lower case, FIG. 30B is a vertical sectional view along the major edge direction of the lower case and FIG. 30C is a vertical sectional view along the minor edge direction of the lower case;

FIGS. 34A and 34B are perspective views of battery cells arranged in two rows and two layers, wherein FIG. 34A is a front side perspective view and FIG. 34B is a back side perspective view;

DETAILED DESCRIPTION OF THE PREFERRED EMBODIMENTS

Figure 2:
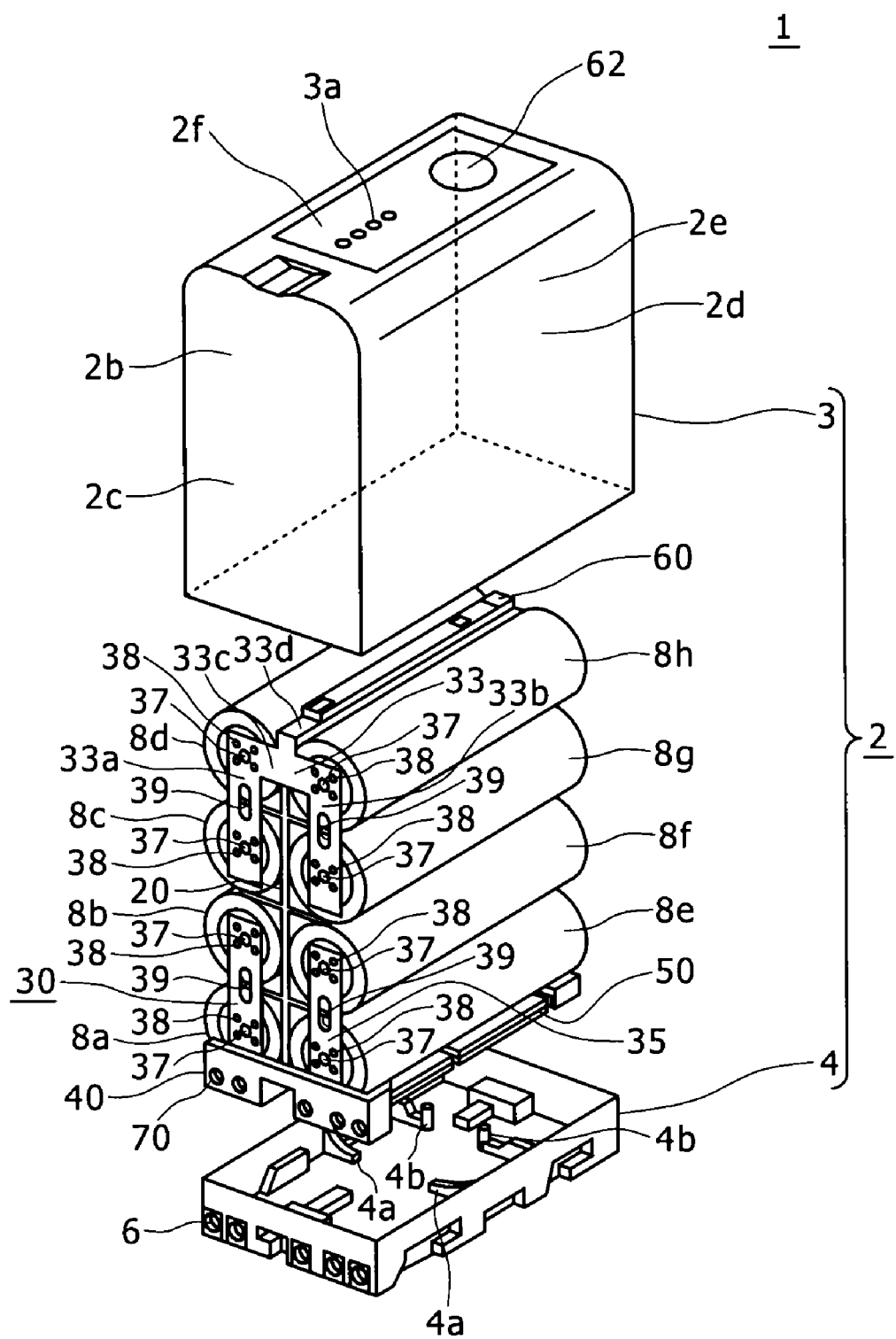
FIG. 2 is an exploded perspective view of the L-size battery pack based on the invention.
Figure 3A:
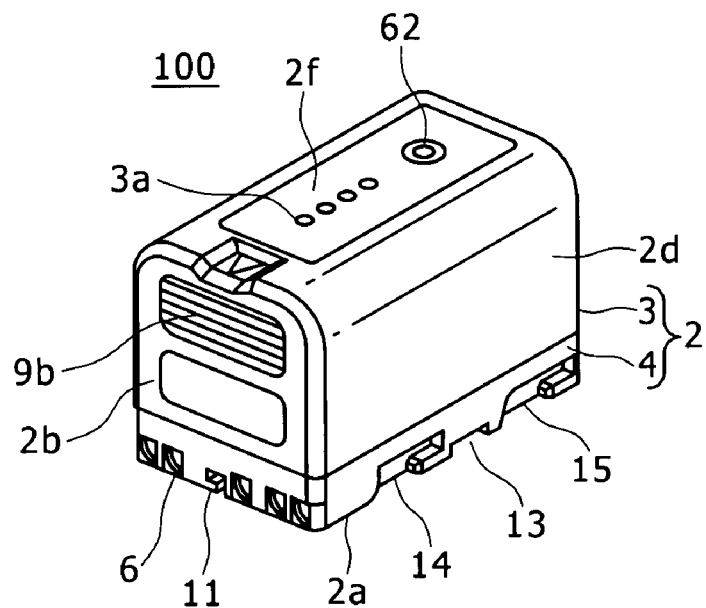
Figure 33:
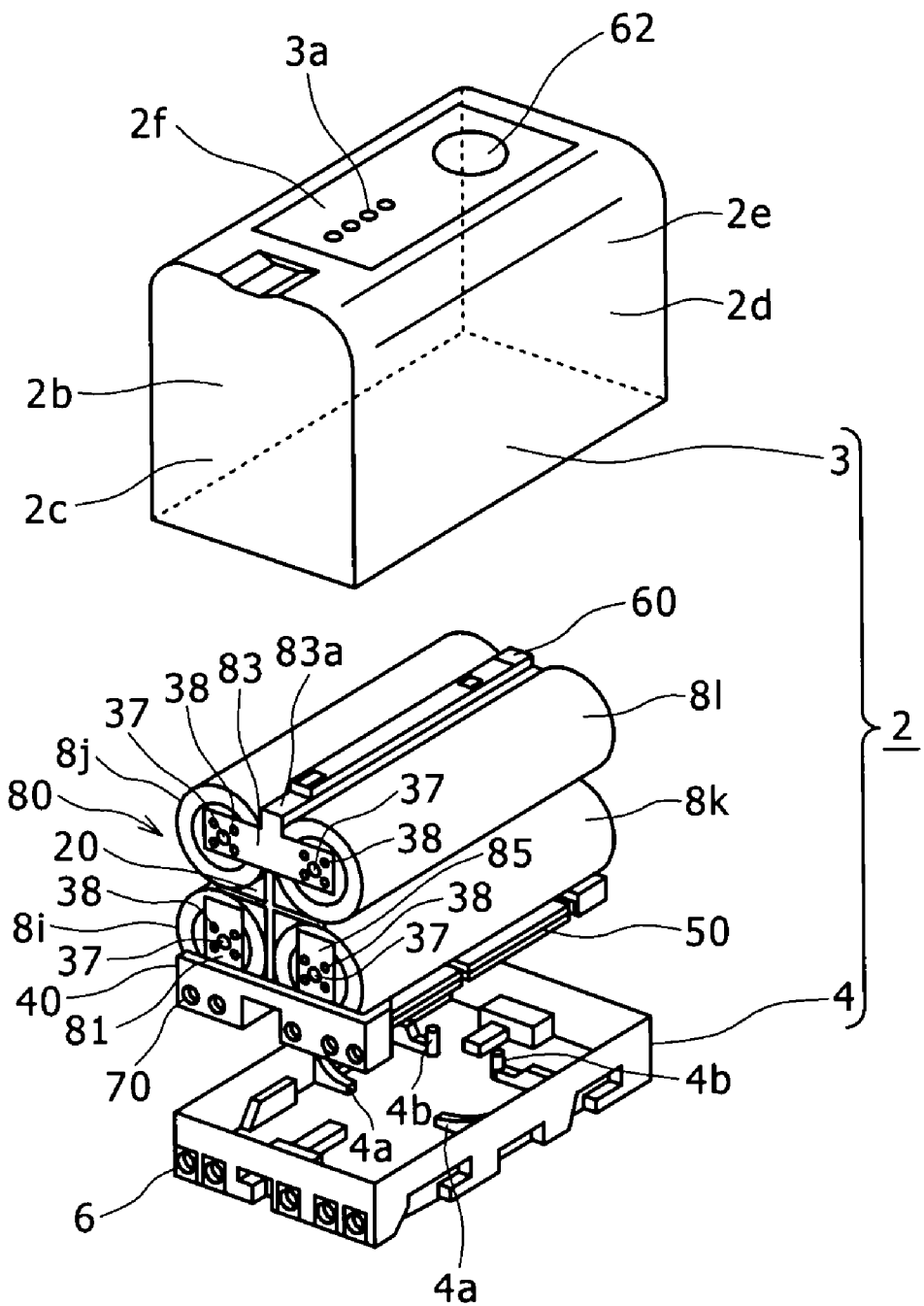
FIG. 33 is an exploded perspective view of an S-size battery pack based on the invention.

Now, a battery pack based on the present invention will be described in detail below, referring to the drawings. The battery pack based on the present invention is prepared in two kinds, according to the number of battery cells 8 contained in a casing 2, for example, an L-size battery pack 1 shown in FIGS. 1A, 1B and 2 and an S-size battery pack 100 shown in FIGS. 3A, 3B and 33. Specifically, the L-size battery pack 1 contains eight battery cells 8a to 8h (hereinafter, the battery cells 8a to 8h will also be referred to simply as the battery cells 8) in two rows and four layers as shown in FIG. 2, while the S-size battery pack 100 contains four battery cells 8i to 8l (hereinafter, the battery cells 8i to 8l will also be referred to simply as the battery cells 8) in two rows and two layers as shown in FIG. 33. The battery packs 1, 100 based on the present invention each have a roughly rectangular casing 2 in which the battery cells 8 are contained and which has a terminal part 6 exposed at a front surface 2b thereof.

As shown in FIG. 2, the casing 2 has an upper cover 3 and a lower case 4 abutted on and joined to each other. In the casing 2, there are contained a plurality of battery cells 8 including lithium ion secondary cells, a partition member 20 for partitioning the battery cells 8 from one another, electrode tabs 30 for electrical connection among terminals of the battery cells 8 partitioned by the partition member 20, a terminal case 40 provided with connection terminals for connection to an external apparatus, a main circuit board 50 attached to the terminal case 40 and electrically connected to the battery cells 8 through the electrode tabs 30, and a display circuit board 60 disposed on the opposite side of the main circuit board 50 with respect to the battery cells 8.

Figure 1A:
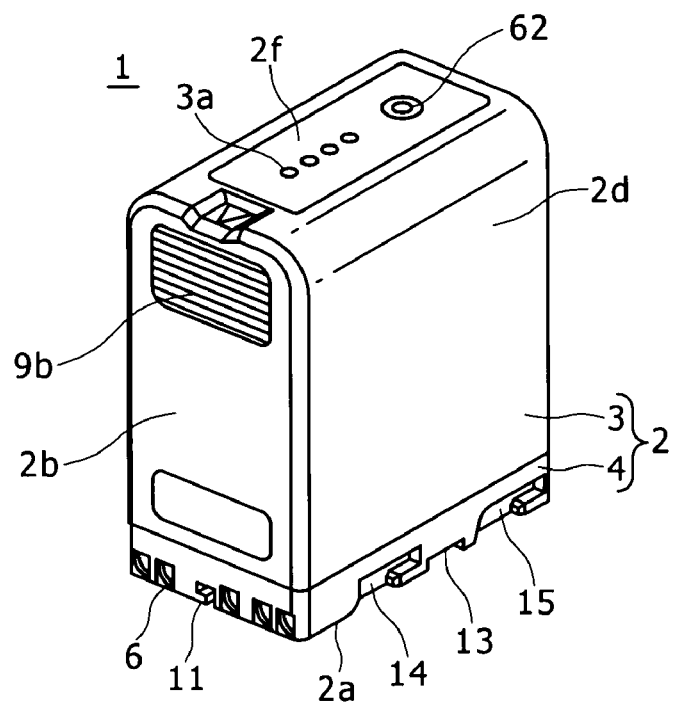
Figure 1B:
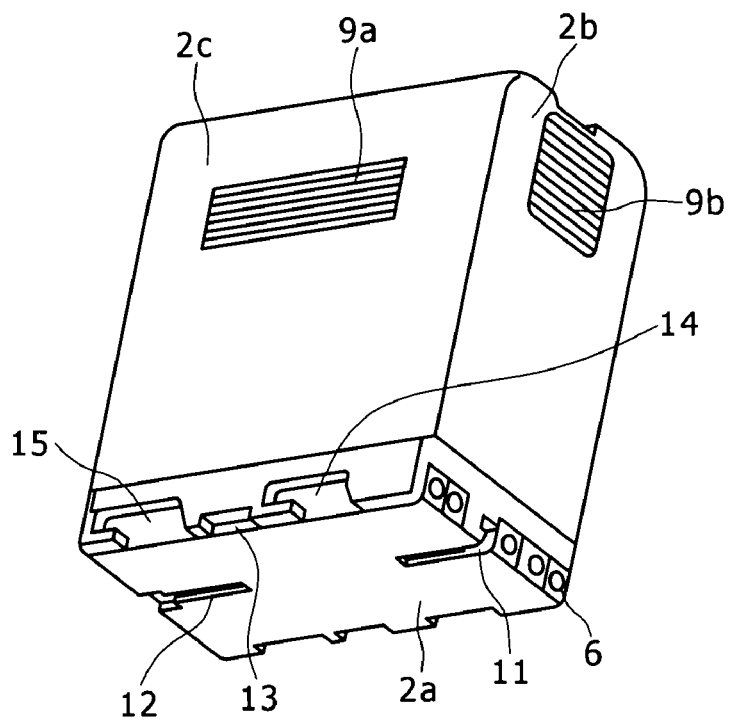
Figure 4:
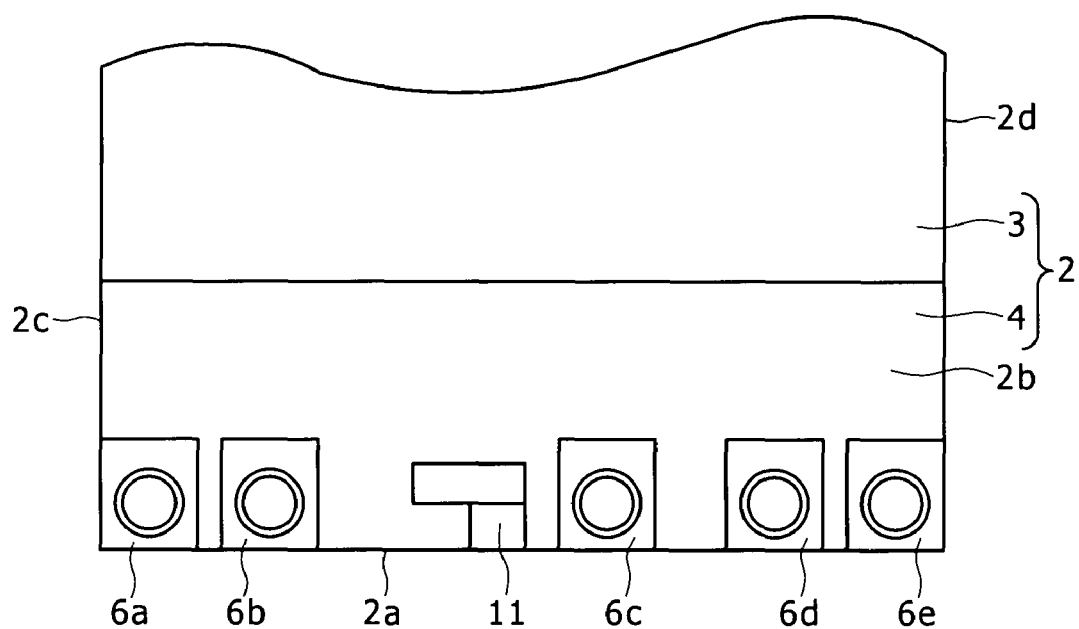
FIG. 4 is a front view of a terminal part.

As shown in FIGS. 1A, 1B and 4, the casing 2 containing the battery cells 8 therein has a configuration in which a lower surface 2a serves as a mount surface to be mounted to a battery mount part 5 on the side of an electronic apparatus such as a video camera, and first to fifth terminal parts 6a to 6e are exposed at a front surface 2b continuous with the mount surface, from one side toward the other side in the width direction of the lower case 4. Terminals formed at the terminal parts 6a to 6e are formed to have respective functions according to a serial interface standard such as the SMBus (System Management Bus) interface standard. More specifically, the first terminal part 6a is a positive electrode terminal of the battery pack 1, 100, the second terminal part 6b is a clock line terminal, the third terminal part 6c is a data line terminal, the fourth terminal part 6d is an ID terminal to which an ID resistor is connected, and the fifth terminal part 6e is a negative electrode terminal of the battery pack 1, 100.

In mounting the battery pack 1, 100 into an electronic apparatus, the battery pack 1, 100 is inserted into the battery mount part 5 on the electronic apparatus side, with the lower surface 2a as an insertion end. After the lower surface 2a comes to abut on a bottom surface of the battery mount part 5, the battery pack 1, 100 is slid toward the side of the front surface 2b, whereby locking recesses 14, 15 provided at both side surfaces 2c, 2d of the casing 2 are locked on locking projections formed in the inside of the battery mount part 5, and the battery pack 1, 100 is mounted in the electronic apparatus. In dismounting the battery pack 1, 100 from the electronic apparatus, the battery pack 1, 100 is slid toward the side of a back surface 2e opposite to the front surface 2b of the casing 2, and is pulled up toward the side of an upper surface 2f opposite to the lower surface 2a, to be thereby dismounted from the electronic apparatus.

Figure 5:
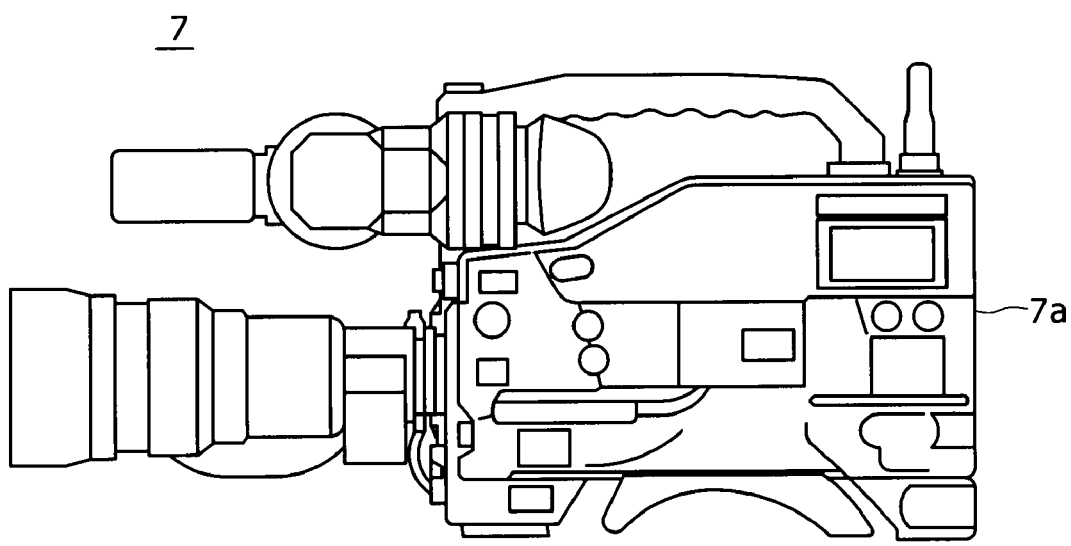
FIG. 5 is a side view of a video camera in which the battery pack based on the invention is to be mounted.
Figure 6:
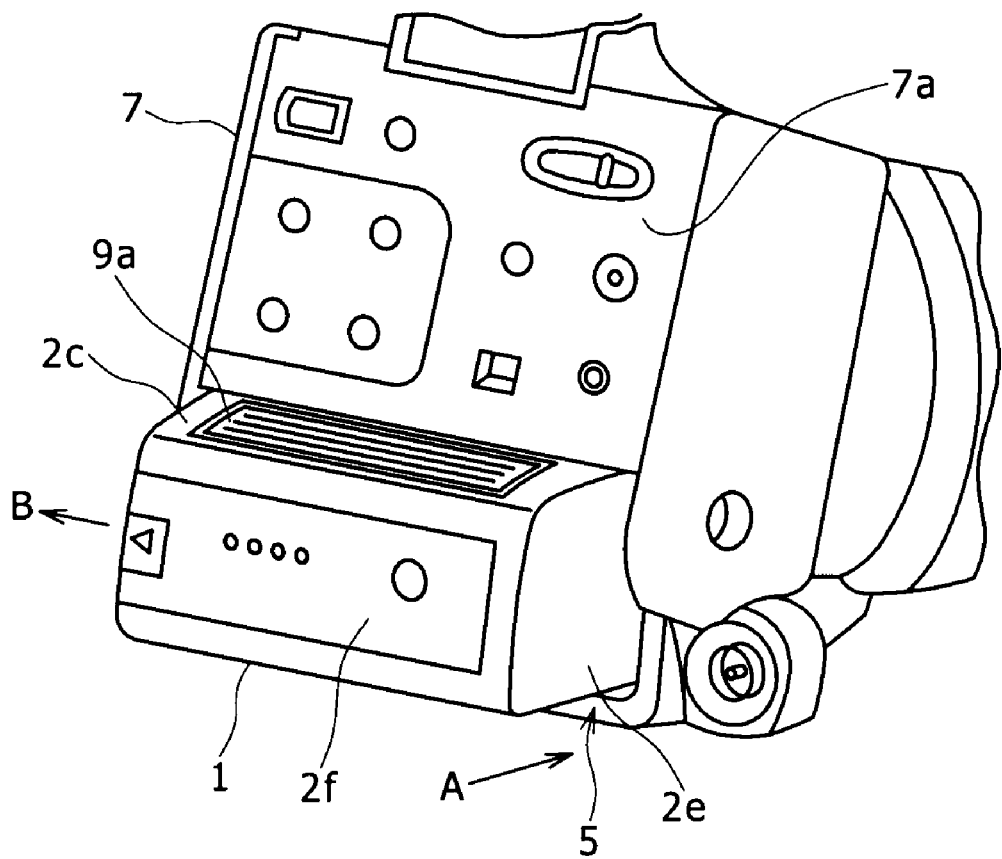
FIG. 6 is a perspective view of the video camera to which the battery pack based on the invention is mounted.

Examples of the electronic apparatus for which the battery pack 1, 100 as above is to be used include a video camera 7 shown in FIG. 5. The video camera 7 is for business use. As shown in FIG. 6, the video camera 7 has a battery mount part 5 formed at a back surface 7a of a main body. In consideration of the use time and frequency of the video camera 7 for business use, the battery mount part 5 is so set that only a battery pack 1, 100 having a considerably high battery capacity can be mounted thereto.

Specifically, the battery pack 1, 100 for use in business-use electronic apparatuses needs to have a rated voltage of about 14.4 V, as contrasted to a rated voltage of about 7.2 V which is requisite for battery packs for use in private-use electronic apparatuses. Besides, in the battery pack 1, 100 for use in business-use electronic apparatuses, the rated voltage of one battery cell 8 is about 3.6 V. Therefore, while it suffices to connect two battery cells 8 in series in the battery pack for use in private-use electronic apparatuses needing the rated voltage of about 7.2 V, four battery cells 8 have to be connected in series in the battery pack 1, 100 for use in business-use electronic apparatuses needing the rated voltage of about 14.4 V. Thus, the battery pack 1, 100 for business-use electronic apparatuses is larger in the number of battery cells 8 and is heavier, as compared with the battery pack for private-use electronic apparatuses.

As shown in FIG. 6, the battery pack 1, 100 is inserted into the battery mount part 5 of the video camera 7 in the direction of arrow A in FIG. 6, with its lower surface 2a as an insertion end and along the right side of the back surface 7a of the video camera 7, until it comes into a loading/unloading position where its lower surface 2a is abutted on the bottom surface of the battery mount part 5. Next, in the battery mount part 5, the battery pack 1, 100 inserted into the loading/unloading position is slid in the direction of arrow B, i.e., toward the left side in FIG. 6 until it comes to a mount position where terminal pins (not shown) exposed in the inside of the battery mount part 5 are inserted in the terminal part 6 provided at the front surface 2b of the battery pack 1, 100 and where locking recesses 14, 15 provided at both side surfaces 2c, 2d are locked on locking projections (not shown) formed in the inside of the battery mount part 5, whereby the mounting is completed.

Now, the configuration of the battery pack 1, 100 will be descried in detail below. First, the L-size battery pack 1 containing eight battery cells 8a to 8h in two rows and four layers therein will be described.

Figure 7A:
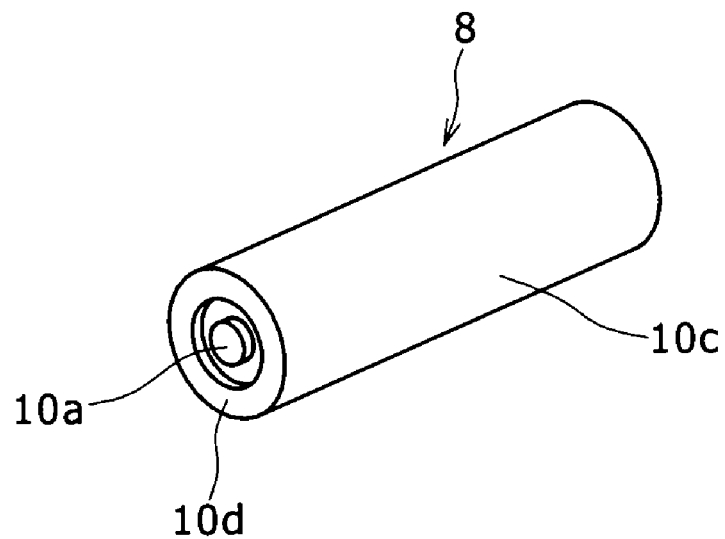
Figure 7B:
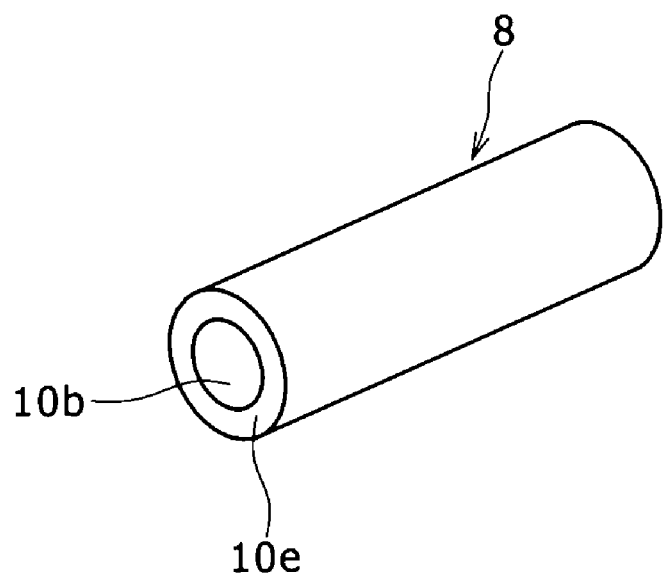

As shown in FIG. 2, the battery cells 8a to 8h contained in two rows and four layers in the casing 2 of the L-size battery pack 1 are each a cylindrical lithium ion secondary cell, as shown in FIGS. 7A and 7B. The battery cell 8 has: a cylindrical metal-made cell can which contains a positive electrode, a negative electrode, a separator and the like therein, which is opened at one end in the longitudinal direction thereof and closed at the other end, and in which the closed other end as a whole serves as a negative electrode terminal 10b; and a positive electrode cap which is welded to the open one end of the cell can and which serves as a positive electrode terminal 10a, with an electrolyte contained in the cell can. In addition, as shown in FIGS. 7A and 7B, the battery cell 8 has a structure in which a side surface 10c, the outer peripheral surface of an end face of the positive electrode terminal 10a and the outer peripheral surface of an end face of the negative electrode terminal 10b are covered with an insulating film. As shown in FIG. 7A, at the end face of the positive electrode terminal 10a of the battery cell 8, there is provided a positive electrode side covered part 10d having an outer peripheral surface covered with the insulating film covering the side surface 10c, and, in a central area of the end face, the positive electrode terminal 10a is exposed from the positive electrode side covered part 10d. Besides, as shown in FIG. 7B, at the end face of the negative electrode terminal 10b of the battery cell 8, there is provided a negative electrode side covered part 10e having an outer peripheral surface covered with the insulating film covering the side surface 10c, and, in a central area of the end face, the negative electrode terminal 10b is exposed from the negative electrode side covered part 10e.

Figure 9:
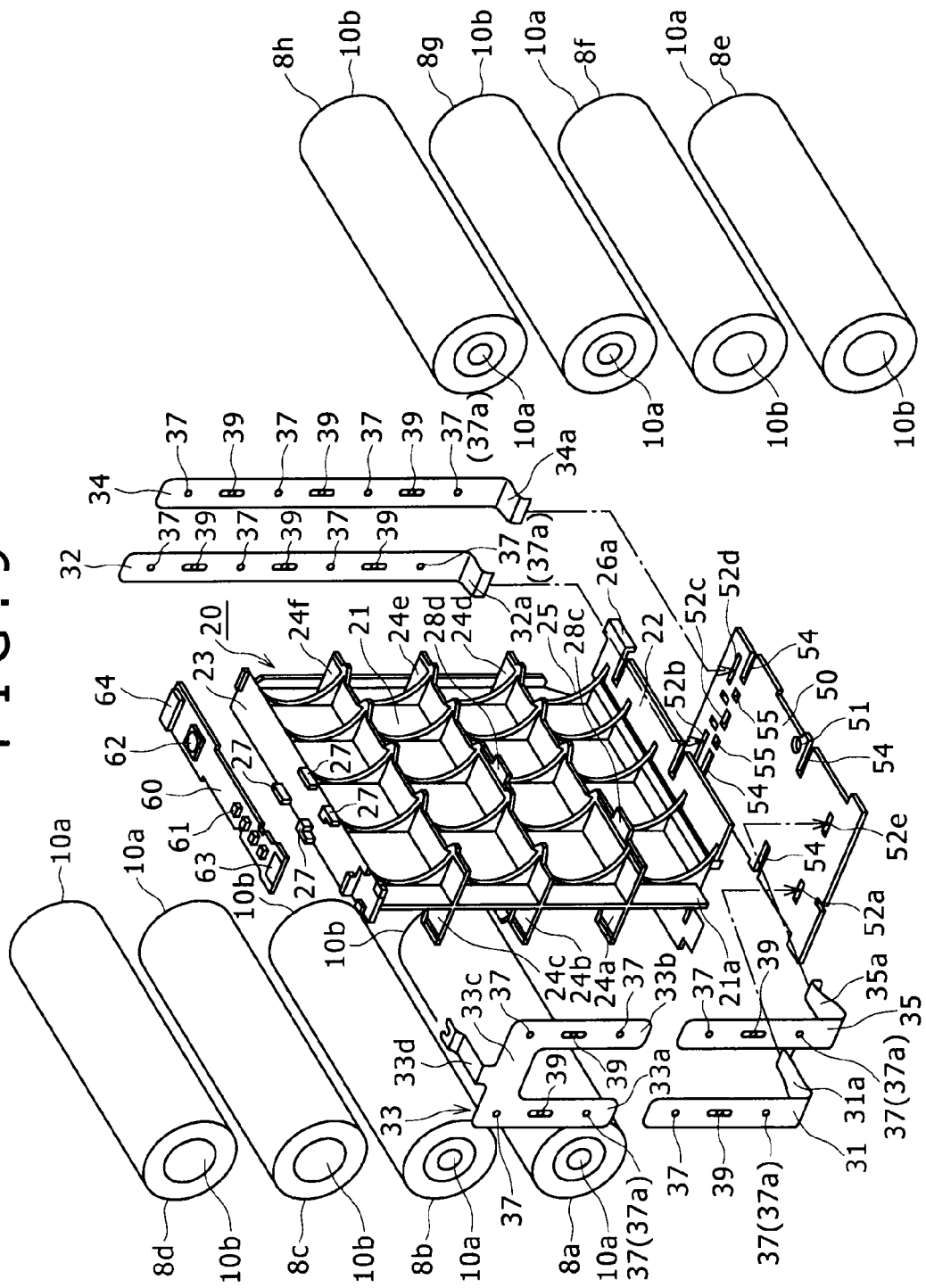
FIG. 9 is an exploded perspective view of the battery cells arranged in two rows and four layers.

The battery cells 8 as above are arranged in two rows and four layers over the main circuit board 50 so that their longitudinal axes are substantially parallel to the major edges of the main circuit board 50. Specifically, the battery cells 8 are arranged as shown in FIGS. 8A, 8B and 9, in which the first battery cell 8a is disposed in the vicinity of a first terminal connection part 53a (see FIG. 25B) which is electrically connected to the first terminal part 6a and which is disposed on one side with respect to the width direction of the main circuit board 50, the second battery cell 8b is disposed over the first battery cell 8a, the third battery cell 8c is disposed over the second battery cell 8b, and the fourth battery cell 8d is disposed over the third battery cell 8c. In addition, of the battery cells 8, the fifth battery cell 8e is disposed in the vicinity of a fifth terminal connection part 53e (see FIG. 25B) which is electrically connected to the fifth terminal part 6e and which is disposed on the other side with respect to the width direction of the main circuit board 50, the sixth battery cell 8f is disposed over the fifth battery cell 8e, the seventh battery cell 8g is disposed over the sixth battery cell 8f, and the eighth battery cell 8h is disposed over the seventh battery cell 8g.

Besides, the first battery cell 8a, the second battery cell 8b, the seventh battery cell 8g and the eighth battery cell 8h are so arranged that their positive electrode terminals 10a front on the terminal part 6 side, i.e., on the front surface 2b side. Further, the third battery cell 8c, the fourth battery cell 8d, the fifth battery cell 8e and the sixth battery cell 8f are so arranged that their negative electrode terminals 10b front on the terminal part 6 side, i.e., on the front surface 2b side.

Of the battery cells 8 arranged in two rows and four layers as above, four battery cells have to be connected in series because the battery pack 1 for use in a business-use electronic apparatus needs a rated voltage of about 14.4 V and each of the battery cells 8 has a rated voltage of about 3.6 V. In view of this, the battery cells 8 are partitioned by the partition member 20, and terminals of the battery cells 8 are connected to one another through the electrode tabs 30; specifically, the battery cells 8 in each set of paired battery cells are connected in parallel, and the four sets of the parallel-connected paired battery cells 8 are connected in series.

More specifically, in the arrangement of the battery cells 8, the positive electrode terminal 10a of the first battery cell 8a disposed in the row on one side, the positive electrode terminal 10a of the second battery cell 8b and a first electrode tab connection part 52a are electrically connected through a rectilinear first electrode tab 31. The first electrode tab 31 is fixed between the terminals by spot welding, and its tip part 31a is bent and soldered to the first electrode tab connection part 52a.

In addition, in the arrangement of the battery cells 8, the negative terminal 10b of the first battery cell 8a disposed in the row on one side, the negative electrode terminal 10b of the second battery cell 8b in the row, the positive electrode terminal 10a of the third battery cell 8c in the row and the positive electrode terminal 10a of the fourth battery cell 8d in the row are electrically connected through a rectilinear second electrode tab 32. The second electrode tab 32 is fixed between the terminals by spot welding, and its tip part 32a is bent and soldered to the second tab connection part 52b.

Further, in the arrangement of the battery cells 8, the negative electrode terminal 10b of the third battery cell 8c disposed in the row on one side, the negative electrode terminal 10b of the fourth battery cell 8d in the row, the positive electrode terminal 10a of the seventh battery cell 8g disposed in the row on the other side and the positive electrode terminal 10a of the eighth battery cell 8h in the row are electrically connected through a roughly inverted U-shaped third electrode tab 33. Specifically, the third electrode tab 33 has a first connection tab part 33a through which the negative electrode terminal 10b of the third battery cell 8c and the negative electrode terminal 10b of the fourth battery cell 8d are electrically connected, and a second connection tab part 33b through which the positive electrode terminal 10a of the seventh battery cell 8g and the positive electrode terminal 10a of the eighth battery cell 8h are electrically connected. The first connection tab part 33a and the second connection tab part 33b, together with a continuous tab part 33c connecting them, form a roughly inverted U-shaped structure. In addition, the third electrode tab 32 is fixed between the terminals by spot welding.

Furthermore, in the arrangement of the battery cells 8, the positive electrode terminal 10a of the fifth battery cell 8e disposed in the row on the other side, the positive electrode terminal 10a of the sixth battery cell 8f in the row, the negative electrode terminal 10b of the seventh battery cell 8g in the row and the negative electrode terminal 10b of the eighth battery cell 8h in the row are electrically connected through a rectilinear fourth electrode tab 34. The fourth electrode tab 34 is fixed between the terminals by spot welding, and its tip part 34a is bent and soldered to the fourth electrode tab connection part 52d of the main circuit board 50.

In addition, in the arrangement of the battery cells 8, the negative electrode terminal 10b of the fifth battery cell 8e in the row on the other side, the negative electrode terminal 10b of the sixth battery cell 8f in the row and the fifth electrode tab connection part 52e of the main circuit board 50 are electrically connected through a rectilinear fifth electrode tab 35. The fifth electrode tab 35 is fixed between the terminals by spot welding, and its tip part 35a is bent and soldered to the fifth electrode tab connection part 52e (hereinafter, the first to fifth electrode tabs 31 to 35 will also be referred to simply as the electrode tabs 30, and their tip parts 31a, 32a, 34a, 35a will also be referred to simply as the tip parts 30a).

Incidentally, the third electrode tab 33 is not limited to the roughly inverted U-shaped one, insofar as it provides continuation between the first connection tab part 33a and the second connection tab part 33b; for example, a roughly H-shaped electrode tab, a roughly U-shaped electrode tab or the like may also be adopted.

Figure 10:
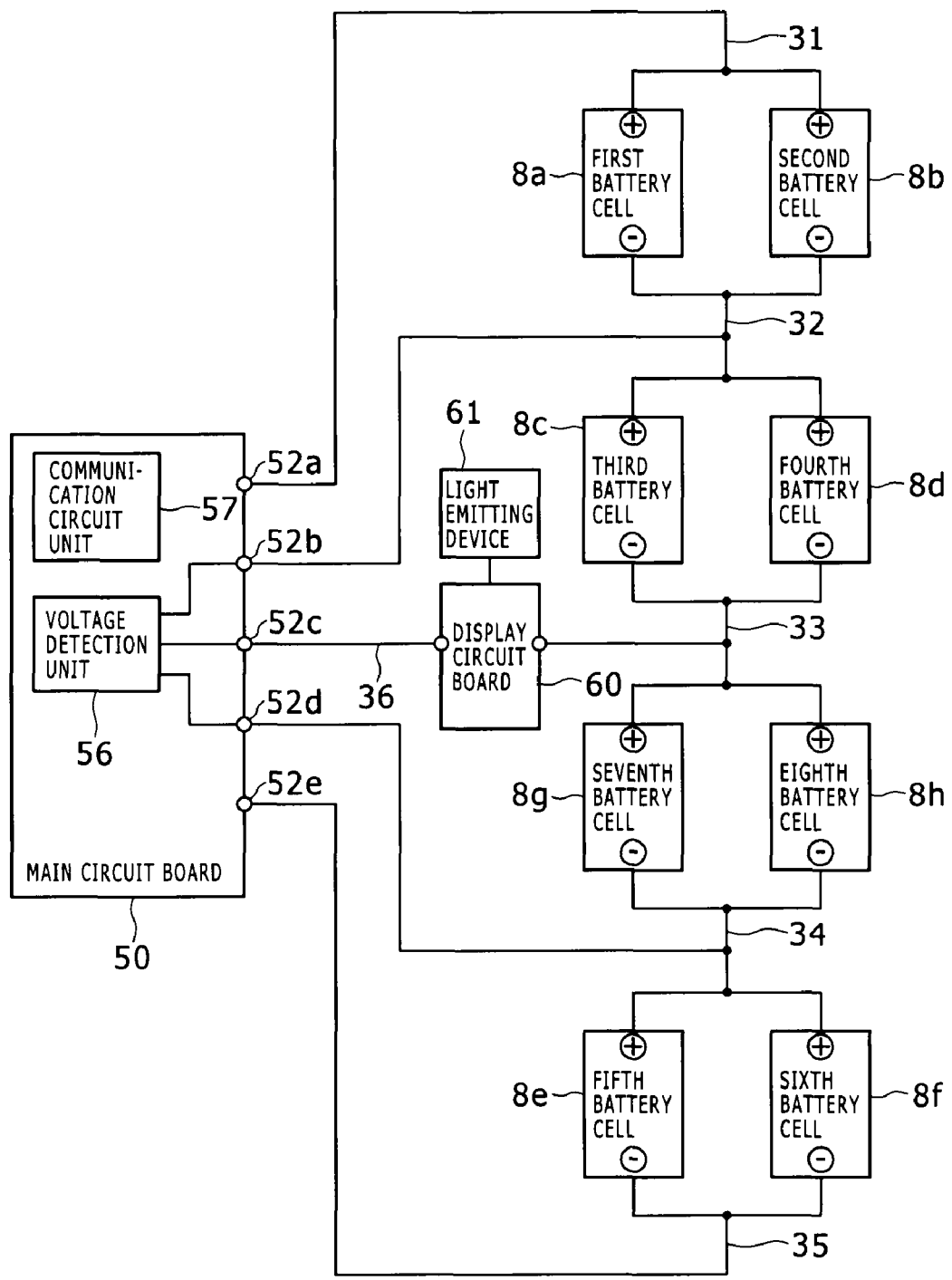
FIG. 10 is a wiring diagram of the battery cells.

In the battery cells 8 thus arranged in two rows and four layers, as shown in FIG. 10, the first battery cell 8a and the second battery cell 8b are connected in parallel by the electrode tabs 30, next the third battery cell 8c and the fourth battery cell 8d are connected in parallel by the electrode tabs 30, then the seventh battery cell 8g and the eighth battery cells 8h are connected in parallel by the electrode tabs 30, and then the fifth battery cell 8e and the sixth battery cell 8f are connected in parallel, whereby the battery cells 8 in each set of paired battery cells are connected in parallel, and the four sets of the parallel-connected paired battery cells 8 are sequentially connected in series.

Consequently, in the battery pack 1 configured as above, the battery cells 8 having a rated voltage of about 3.6 V each are arranged in two row and four layers over the main circuit board 50, the battery cells 8 in each set of paired battery cells are connected in parallel, and the four sets of the parallel-connected paired battery cells 8 are sequentially connected in series, whereby a rated voltage of about 14.4 V can be realized, and the battery pack 1 can be used for business-use electronic apparatuses such as video cameras.

In addition, in the battery pack 1, the area of the lower surface 2a serving as a mount surface in mounting thereof into the battery mount part 5 is equal to the area occupied by a pair of the battery cells 8. Therefore, the battery pack 1 has a reduced insertion area.

Besides, as shown in FIGS. 8A and 8B, the display circuit board 60 is disposed on the partition member 20 at a position on the upper side of the fourth battery cell 8d and the eighth battery cell 8h. The display circuit board 60 is electrically connected to a board connection tab part 33d formed roughly at the midpoint of the continuous tab part 33c of the third electrode tab 33. The board connection tab part 33d is formed by bending in relation to the continuous tab part 33c, and is soldered to a board connection part 63 of the display circuit board 60. Further, the display circuit board 60 is electrically connected to the main circuit board 50 through a flexible flat cable 36. Of the flexible flat cable 36, one end is fixed to a cable connection part 64 of the display circuit board 60, and the other end is electrically connected to the third electrode tab connection part 52c of the main circuit board 50. This ensures that the third electrode tab 33 is electrically connected to the main circuit board 50 through the display circuit board 60, without any complicated wiring or the like.

Here, the main circuit board 50 is provided with a voltage detection unit 56 for detecting the voltage of each of the four sets of the parallel-connected paired battery cells 8, by use of a plurality of electronic parts such as IC chips. Since in the battery pack 1 the first to fifth electrode tabs 31 to 35 are electrically connected to the main circuit board 40 through the first to fifth electrode tab connection parts 52a to 52e (hereinafter, the first to fifth electrode tab connection parts 52a to 52e will also be referred to simply as the electrode tab connection parts 52) as shown in FIG. 10, the voltage of each of the four sets of the parallel-connected paired battery cells 8 can be detected by the voltage detection unit 56 of the main circuit board 50, which makes it possible to check the residual battery capacities of the battery cells 8, the presence or absence of abnormality in the battery cells 8, etc.

In addition, as shown in FIG. 9, the partition member 20 for partitioning the battery cells 8 includes: a roughly rectangular sheet-shaped partition plate 21; a positioning plate 22 which is formed at one side surface so as to be substantially orthogonal to the principal surface of the partition plate 21 and by which the main circuit board 50 is positioned; an attaching plate 23 which is formed on the other side of the partition plate 21, or the opposite side of the positioning plate 22, and to which the display circuit board 60 is attached; a plurality of support plates 24a to 24f (hereinafter, the support plates 24a to 24f will also be referred to simply as the support plates 24) which are formed on both principal surfaces of the partition member 20 at roughly regular intervals between the positioning plate 22 and the attaching plate 23 and by which the rows of the battery cells 8; and ribs 25 formed at corners formed between the partition plate 21 and the support plates 24. The partition member 20 is integrally formed from an insulating resin such as polypropylene. This ensures that the battery cells 8 can be insulated from one another by the partition member 20, without separately providing any insulating member or the like.

As shown in FIG. 9, the partition plate 21 is formed in a roughly rectangular sheet-like shape. Of the principal surfaces of the partition plate 21, the minor edges along which the positioning plate 22 and the attaching plate 23 are formed have a length approximately equal to the whole length of the battery cell 8, and the major edges have a length approximately equal to the overall height of the four layers in which the battery cells 8 are stacked. The partition plate 21 having such principal surfaces is disposed between the row on one side of the battery cells 8 arranged in two rows and four layers, specifically the first to fourth battery cells 8a to 8d, and the row on the other side, specifically the fifth to eighth battery cells 8e to 8h, so as to partition the battery cells 8a to 8d in the row on one side and the battery cells 8e to 8h in the row on the other side from each other.

Figure 11A:
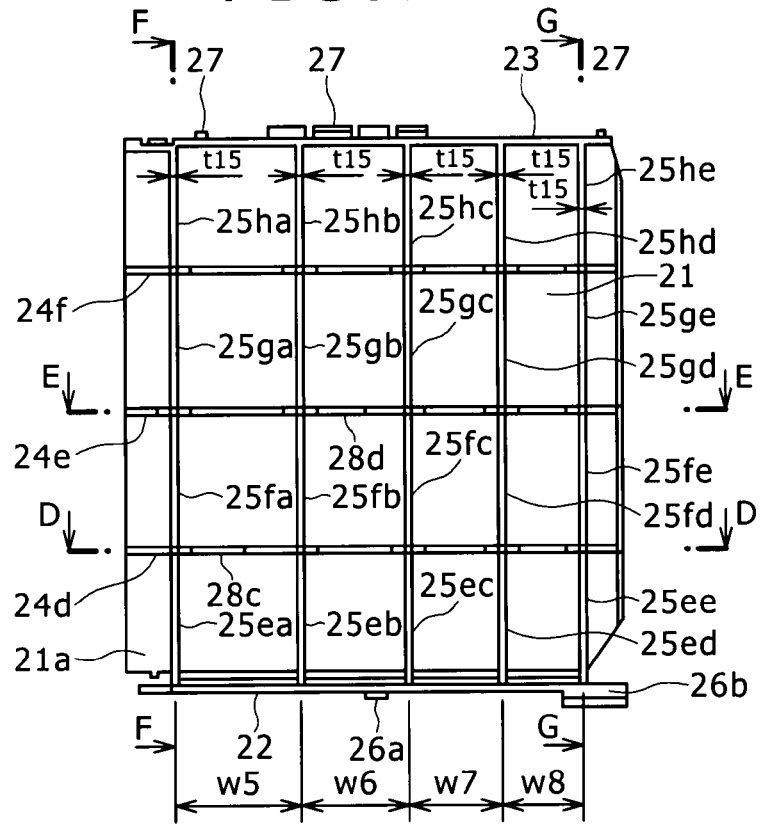
Figure 11B:
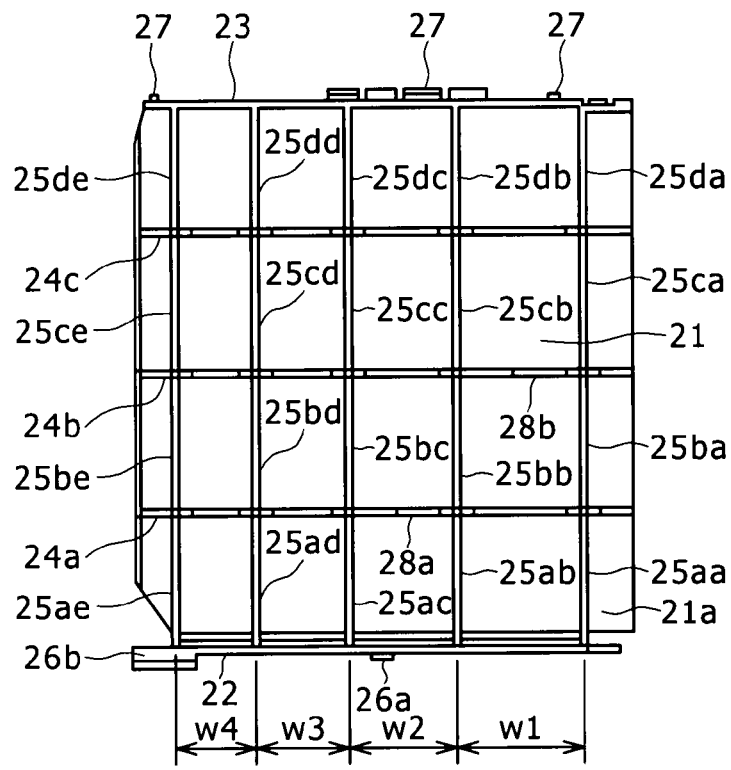

As shown in FIGS. 9, 11A and 11B, the positioning plate 22 formed integrally with and substantially orthogonally to the principal surfaces of the partition plate 21 is formed at one minor edge of the partition plate 21 in the state of substantially evenly projecting to both principal surface sides of the partition plate 21 so as to be substantially orthogonal to the principal surfaces of the partition plate 21. The positioning plate 22 is formed in a roughly rectangular sheet-like shape having substantially the same size as the main circuit board 50.

Figure 12:
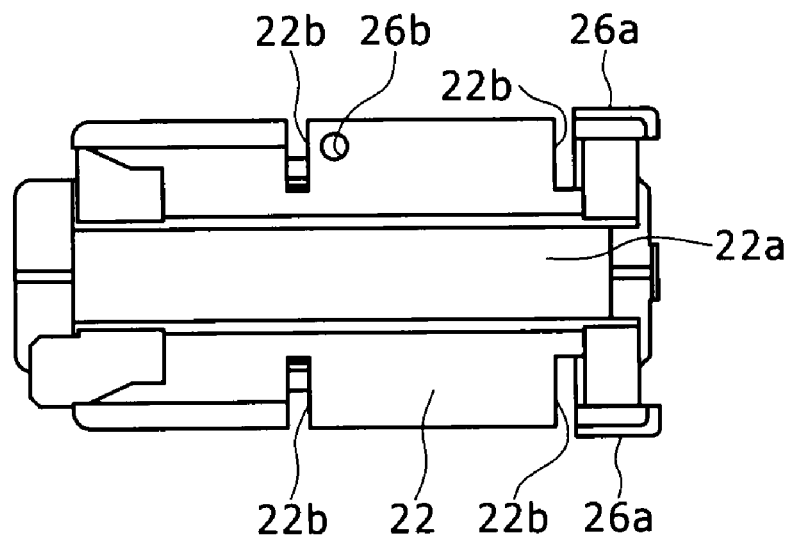
FIG. 12 is a bottom view of the partition member.

In addition, as shown in FIG. 12, the positioning plate 22 is formed with positioning parts 26a, 26a and positioning projections 26b for positioning the main circuit board 50. The positioning parts 26a, 26a are mutually oppositely projectingly provided in roughly L-shaped forms, at positions on the side opposite to the side of attachment to the terminal case 40 of the principal surfaces of the main circuit board 50, namely, at positions corresponding respectively to both corner parts of the main circuit board 50 on the side of the back surface 2e. The positioning parts 26a, 26a mutually oppositely projectingly provided in roughly L-shaped forms are operative to position the main circuit board 50 by inserting the main circuit board 50 into the inside of the positioning parts 26a, 26a. In addition, the positioning projection 26b is formed on a principal surface, on the side of facing the main circuit board 50, of the positioning plate 22 so as to project toward the side of the main circuit board 50, correspondingly to the layout position of a positioning hole 51 (see FIG. 9) which is a through-hole formed in the main circuit board 50. When the positioning projection 26b is inserted into the positioning hole 51, the main circuit board 50 is positioned into such a plane orientation that it is parallel to the positioning plate 22.

With the positioning parts 26a, 26a and the positioning projection 26b provided as above, in the process in which the tip parts 31a, 32a, 34a, 35a of the first, second, fourth and fifth electrode tabs 31, 32, 34, are soldered respectively to the first, second, fourth and fifth electrode tab connection parts 52a, 52b, 52c, 52d of the main circuit board 50, the main circuit board 50 is inserted on the inner side of the positioning parts 26a, 26a mutually oppositely projectingly provided in roughly L-shaped forms at positions corresponding to both corner parts on the side of the back surface 2e of the main circuit board 50, and then the positioning projection 26b is inserted into the positioning hole 51 formed in the main circuit board 50, by the manufacturer or the like, whereby the main circuit board 50 can be easily positioned and arranged on the positioning plate 22 without errors.

In addition, with the positioning parts 26a, 26a and the positioning projection 26b provided as above, even after the electrode tabs 30 are soldered to the main circuit board 50, the main circuit board 50 is positioned on the positioning plate 22 by inserting the main circuit board 50 into the inner side of the positioning parts 26a, 26a and then inserting the positioning projection 26b into the positioning hole 51 formed in the main circuit board 50, whereby the partition member 20 can be prevented from sliding relative to the main circuit board 50 in a direction parallel to the main circuit board 50. Therefore, the positioning parts 26a, 26a and the positioning projection 26b can prevent the problem that a tensile load, a shearing load, a torsional load or the like generated due to sliding of the partition member 20 is exerted on the electrode tab connection parts 52 to which the electrode tabs 30 are soldered, and can also prevent breakage of the electrode tabs 30 or the electrode tab connection parts 52 or the like from occurring. Incidentally, the positioning plate 22 may have either one of the positioning parts 26a, 26a and the positioning projection 26b, insofar as the main circuit board 50 can be positioned.

In addition, the positioning plate 22 provided with the positioning parts 26a, 26a and the positioning projection 26b is formed integrally with the partition plate 21. Therefore, for example, in soldering the electrode tabs 30 to the electrode tab connection parts 52 of the main circuit board 50, the main circuit board 50 can be positioned without separately providing any positioning member, a positioning jig or the like for positioning the main circuit board 50 relative to the positioning plate 22, so that the number of component parts can be reduced.

Besides, the positioning plate 22 is provided substantially in the center of its principal surface facing the main circuit board 50 with a board relief groove 22a extending along its major edge direction over the range from one minor edge thereof to the other minor edge thereof. The board relief groove 22a is a recessed groove. This ensures that electronic parts such as IC chips can be mounted on the principal surface, facing the positioning plate 22, of the main circuit board 50 at positions in the area corresponding to the board relief groove 22a. Therefore, electronic parts can be mounted on both principal surfaces of the main circuit board 50.

Further, since the positioning plate 22 is formed from an insulating resin such as polypropylene, the main circuit board 50 can be insulated from the battery cells 8 without interposing any insulating member between the positioning plate 22 and the main circuit board 50, even in the case where, for example, the main circuit board 50 is a printed circuit board having conductor patterns on both sides or in multiple layers.

In addition, the positioning plate 22 is provided with positioning grooves 22b correspondingly to the layout positions of case reinforcing ribs 4a formed on the inside of the lower case 4 which will be described later. Since the positioning grooves 22b are formed correspondingly to the layout positions of the case reinforcing ribs 4a, the partition member 20 can be positioned relative to the lower case 4 and mis-insertion can be prevented, in containing the partition member 20 into the inside of the lower case 4. Further, the positioning grooves 22b are engaged with the case reinforcing ribs 4a, whereby the partition member 20 can be prevented from sliding relative to the main circuit board 50 along the principal surface of the latter. Therefore, the positioning grooves 22 can obviate the problem that a tensile load, a shearing load, a torsional load or the like generated due to sliding of the partition member 20 is exerted on the electrode tab connection parts 52 to which the electrode tabs 30 are soldered, and can prevent breakage of the electrode tabs 30 or the electrode tab connection parts 52 or the like from occurring.

As shown in FIGS. 9, 11A and 11B, the attaching plate 23 formed integrally with the other minor edge, on the opposite side of the positioning plate 22, of the partition plate 21 is formed to project substantially evenly to both principal surface sides of the partition plate 21 so as to be substantially orthogonal to the principal surfaces of the partition plate 21. The attaching plate 23 is formed in a roughly rectangular sheet-like shape and in a size approximately equal to the size of the display circuit board 60.

Figure 13:
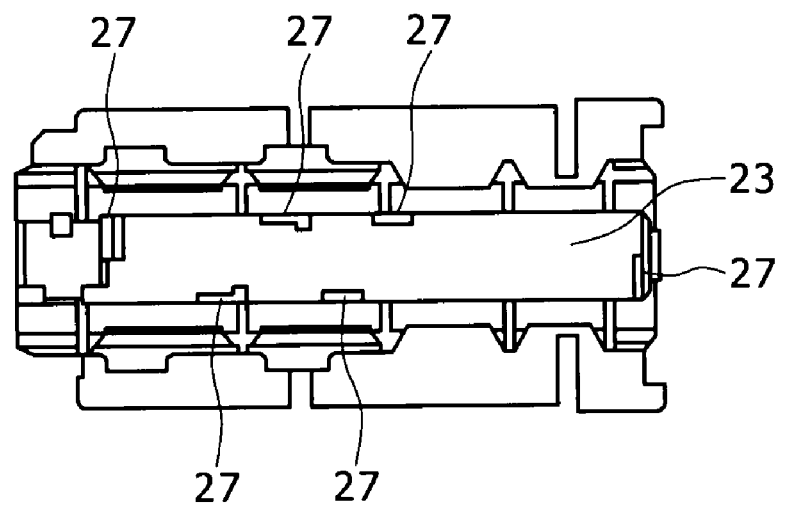
FIG. 13 is a plan view of the partition member.

In addition, as shown in FIGS. 9 and 13, the attaching plate 23 is formed with engaging pieces 27 for positioning the display circuit board 60. The engaging pieces 27 are engaged with the display circuit board 60, whereby the display circuit board 60 is easily positioned relative to the attaching plate 23 without errors, and the display circuit board 60 in the positioned state is engagedly supported by the attaching plate 23.

Therefore, the attaching plate 23 ensures that, at the time of soldering a board connection tab part 33d of the third electrode tab 33 to a board connection part 63 of the display circuit board 60 and connecting the flexible flat cable 36 to a cable connection part 64 of the display circuit board 60, the display circuit board 60 can be easily positioned and attached without errors through engaging the display circuit board 60 with the engaging pieces 27, the board connection tab part 33d can be soldered to the board connection part 63 of the display circuit board 60 without errors, and the flexible flat cable 36 can be easily connected to the cable connection part 64 of the display circuit board 60.

Besides, since the attaching plate 23 formed with such engaging pieces 27 is formed as one body with the partition plate 21, the display circuit board 60 can be attached without separately providing any attaching member or the like for attaching the display circuit board 60 in the casing 2; thus, the number of component parts can be reduced.

Further, since the attaching plate 23 is formed from an insulating resin such as polypropylene, the battery cells 8 and the display circuit board 60 can be insulated from each other without interposing any insulating member or the like between the attaching plate 23 and the display circuit board 60, even in the case where, for example, the display circuit board 60 is a printed circuit board having conductor patterns on both sides or in multiple layers.

Incidentally, the attaching plate 23 is not limited to the one that positions the display circuit board 60 by engagement of its engaging pieces 27 with the display circuit board 60. For example, a configuration may be adopted in which the display circuit board 60 is provided with through-holes, whereas the attaching plate 23 is provided with positioning projections correspondingly to the layout positions of the through-holes, and the display circuit board 60 is positioned by inserting the positioning projections into the through-holes.

Here, the display circuit board 60 to be attached to the attaching plate 23 is a printed wiring board including a rigid board provided with conductor patterns on one side, on both sides, in multiple layers, or the like. Incidentally, the display circuit board 60 is not limited to a rigid board, and may be a flexible board or the like. In addition, as shown in FIG. 9, on the display circuit board 60 are mounted light emitting devices 61 including LEDs (Light Emitting Diodes) turned on to indicate the residual battery capacity of the battery pack 1, a pushbutton type residual capacity display switch element 62 for turning on the light emitting devices 61, the board connection part 63 to be electrically connected to the third electrode tab 33, and the cable connection part 64 to be electrically connected to the main circuit board 50.

In addition, since the display circuit board 60 is attached to the attaching part 23 and is disposed on the opposite side of the main circuit board 50 with respect to the battery cells 8, the light emitting devices 61 and the residual charge display switch element 62 are so mounted as to be exposed to the exterior from the upper surface 2f of the upper cover 3. Further, as shown in FIG. 8B, the display circuit board 60 is electrically connected to the third electrode tab 33 by soldering the board connection tab part 33d of the third electrode tab 33 to the board connection part 63, and is electrically connected to the main circuit board 50 through the flexible flat cable 36 by connecting one end of the flexible flat cable 36 to the cable connection part 64.

When the pushbutton type residual charge display switch element 62 is depressed by the user or the like, the display circuit board 60 changes over the ON/OFF conditions of the light emitting devices 61 exposed to the exterior through a display window 3a formed in the upper surface 2f of the upper cover 3, as shown in FIG. 1, whereby the residual battery charge is informed through the turned-ON display of the light emitting devices 61. This permits the user to easily check the residual charge of a spare battery pack not being mounted in an electronic apparatus such as the video camera 7, to select a battery pack 1 with a large residual battery charge or to distinguish such a battery pack from a battery pack 1 with a smaller residual battery charge.

As shown in FIGS. 9, 11A and 11B, the support plates 24 provided between the positioning plate 22 and the attaching plate 23 are projectingly provided on the principal surfaces of the partition plate 21, in the number of three on each of the principal surfaces and a total of six on both the principal surfaces, substantially in parallel to the positioning plate 22 and the attaching plate 23, i.e., substantially orthogonally to the principal surfaces of the partition plate 21 and at substantially regular intervals approximate to the diameter of the battery cells 8 along the major edges (height direction) of the partition plate 21. In addition, the support plates 24 are formed in a roughly rectangular sheet-like shape and are substantially evenly projected from the principal surfaces of the partition plate 21.

Specifically, on one principal surface of the partition plate 21, the first to third support plate 24a to 24c are formed in this order along the direction from the positioning plate 22 toward the attaching plate 23. Similarly, on the other principal surface of the partition plate 21, the fourth to sixth support plates 24d to 24f are formed in this order along the direction from the positioning plate 22 toward the attaching plate 23. The support plates 24 formed on the principal surfaces of the partition plate 21 partition each of the battery cells 8a to 8d partition as one row by the partition plate 21, and partition each of the battery cells 8e to 8h partitioned as the other row by the partition plate 21. More specifically, the first support plate 24a partitions the first battery cell 8a and the second battery cell 8b from each other. The second support plate 24b partitions the second battery cell 8b and the third battery cell 8c from each other. The third support plate 24c partitions the third battery cell 8c and the fourth battery cell 8d from each other. The fourth support plate 24d partitions the fifth battery cell 8e and the sixth battery cell 8f from each other. The fifth support plate 24e partitions the sixth battery cell 8f and the seventh battery cell 8g from each other. The sixth support plate 24f partitions the seventh battery cell 8g and the eighth battery cell 8h from each other.

In other words, the first battery cell 8a is disposed between the first support plate 24a and the positioning plate 22; the second battery cell 8b is disposed between the first support plate 24a and the second support plate 24b; the third battery cell 8c is disposed between the second support plate 24b and the third support plate 24c; the fourth battery cell 8d is disposed between the third support plate 24c and the attaching plate 23; the fifth battery cell 8e is disposed between the fourth support plate 24d and the positioning plate 22; the sixth battery cell 8f is disposed between the fourth support plate 24d and the fifth support plate 24e; the seventh battery cell 8g is disposed between the fifth support plate 24e and the sixth support plate 24f; and the eighth battery cell 8h is disposed between the sixth support plate 24f and the attaching plate 23.

In addition, as shown in FIGS. 8A and 8B, of the battery cells 8 which are arranged in two rows and four layers and are partitioned by the partition member 20 and of which the terminals are electrically connected through the electrode tabs 30, the third and fourth battery cells 8c and 8d disposed in the one-side row and the seventh and eighth battery cells 8g and 8h disposed in the other-side row are connected in the manner of bridging between the one-side row and the other-side row through the roughly inverted U-shaped third electrode tab 33. On the other hand, the first and second battery cells 8a and 8b disposed in the one-side row and the fifth and sixth battery cells 8e and 8f disposed in the other-side row are not connected in the manner of bridging between the one-side row and the other-side row, through the rectilinear first, second, fourth and fifth electrode tabs 31, 32, 34, 35, either on the front surface 2b side or on the back surface 2e side.

Further, as for the first and second battery cells 8a and 8b, the negative electrode terminal 10b of the first battery cell 8a and the negative electrode terminal 10b of the second battery cell 8b are connected with the positive electrode terminal 10a of the third battery cell 8c and the positive electrode terminal 10a of the fourth battery cell 8d by the second electrode tab 32 on the back surface 2e side. Also, as for the fifth and sixth battery cells 8e and 8f, the positive electrode terminal 10a of the fifth battery cell 8e and the positive electrode terminal 10a of the sixth battery cell 8f are connected with the negative electrode terminal 10b of the seventh battery cell 8g and the negative electrode terminal 10b of the eighth battery cell 8h by the fourth electrode tab 34 on the back surface 2e side. Therefore, for example, when the battery pack is handled by the manufacturer's hand, the first and second battery cells 8a and 8b might be turned in the direction of arrow C1 in FIG. 8A, with the second electrode tab 32 as a center, in such a manner that the positive electrode terminal 10a side of the first and second battery cells 8a and 8b would come off from the partition member 20, resulting in loosening and dropping. Also, the fifth and sixth battery cells 8e and 8f might be turned in the direction of arrow C2 in FIG. 8A, with the fourth electrode tab 34 as a center, in such a manner that the negative electrode terminal 10b side of the fifth and sixth battery cells 8e and 8f would come off from the partition member 20, resulting in loosening and dropping.

To avoid this possibility, the first and second battery cells 8a, 8b and the fifth and sixth battery cells 8e, 8f are supported by the support plates 24 so that they would not be loosened and released from the partition member 20. In addition, the support plates 24 supporting the first and second battery cells 8a, 8b and the fifth and sixth battery cells 8e, 8f are demanded only to support either one of the first and second battery cell 8a, 8b because the first and second battery cells 8a, 8b are bound together by the first electrode tab 31 on the front surface 2b side, and the support plates 24 are demanded only to support either one of the fifth and sixth battery cells 8e, 8f because the fifth and sixth battery cells 8e, 8f are bound together by the fifth electrode tab 35 on the front surface 2b side.

Figure 14A:
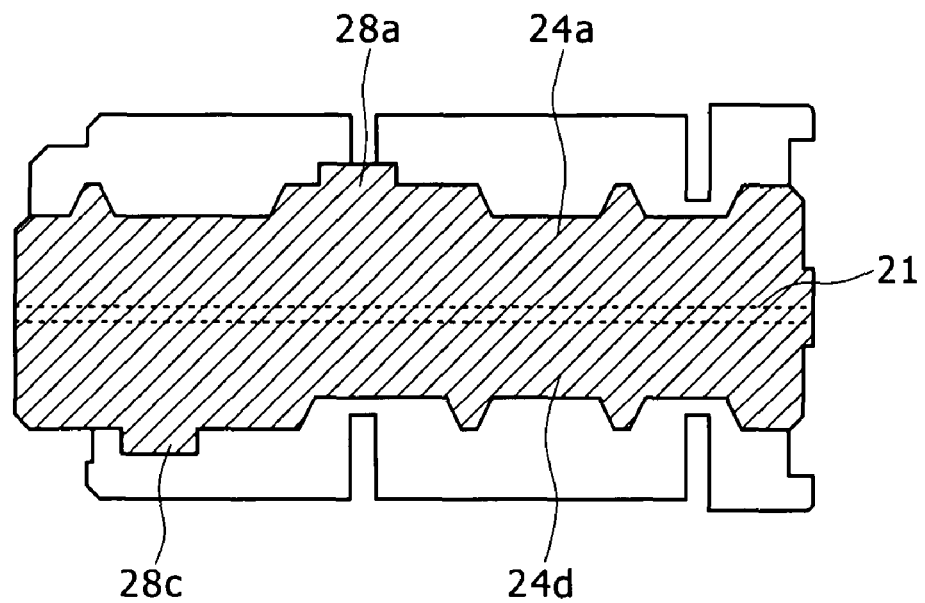
Figure 14B:
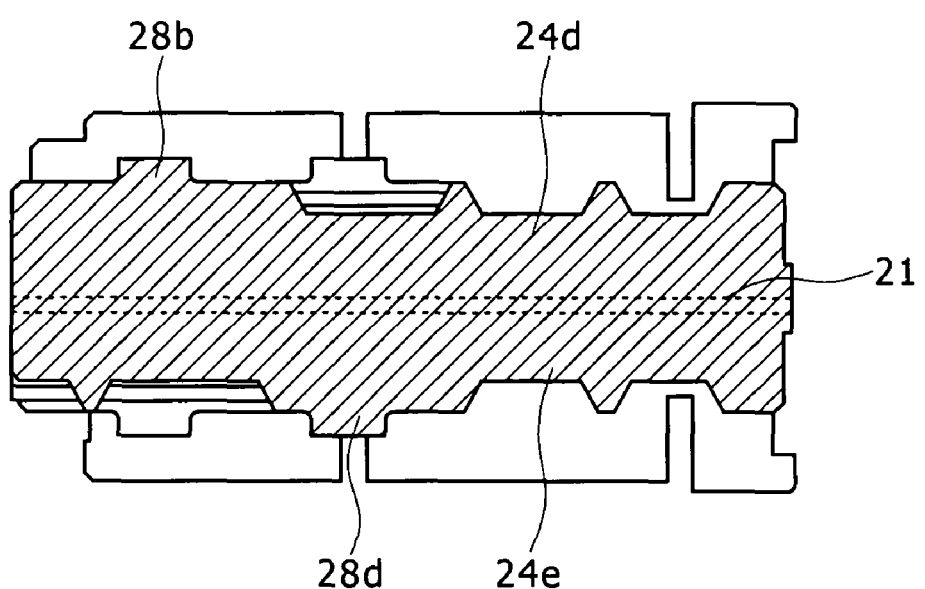

Here, FIG. 14A is a sectional view taken along line D-D of FIG. 11A, and FIG. 14B is a sectional view taken along line E-E of FIG. 11A. As shown in FIGS. 11A, 11B, 14A and 14B, the first support plate 24a is formed with a first projected piece 28a for supporting the second battery cell 8b, the second support plate 24b is formed with a second projected piece 28b for supporting the second battery cell 8b, the fourth support plate 24d is formed with a third projected piece 28c for supporting the sixth battery cell 8f, and the fifth support plate 24e is formed with a fourth projected piece 28d for supporting the sixth battery cell 8f (hereinafter, the first to fourth projected pieces 28a to 28d will also be referred to simply as the projected pieces 28).

The projected pieces 28 are formed to project further in the extension direction from the support plates 24. The first and second projected pieces 28a and 28b adjacent to each other in the height direction support, by clamping therebetween, the side surface of the second battery cell 8b which is disposed between the first and second projected pieces 28a, 28b. Similarly, the third and fourth projected pieces 28c and 28d adjacent to each other in the height direction support, by clamping therebetween, the side surface of the sixth battery cell 8 which is disposed between the third and fourth projected pieces 28c, 28d. In other words, the second battery cell 8b is supported with its side surface clamped between the first projected piece 28a and the second projected piece 28b, and the sixth battery cell 8f is supported with its side surface clamped between the third projected piece 28c and the fourth projected piece 28d.

Accordingly, the projected pieces 28 ensure that, since the second battery cell 8b and the sixth battery cell 8f are supported by the support plates 24, the first and second battery cells 8a, 8b and the fifth and sixth battery cells 8e, 8f which are not connected by the electrode tabs 30 over the range from one row to the other row, on the front surface 2b side and on the back surface 2e side, can be prevented from becoming loosened and released from the support plates 24.

Incidentally, the positioning plate 22 is not limited to the configuration in which one each of the first to fourth projected pieces 28a to 28d is projected in the extension direction from each of the first, second, fourth and fifth support plates 24a, 24b, 24c, 24d, and a plurality of projected pieces may be projected from each of the support plates. This ensures that the second battery cell 8b and the sixth battery cell 8f are supported by the support plates 24 more rigidly, and the first and second battery cells 8a, 8b and the fifth and sixth battery cells 8e, 8f can be prevented from being loosened and released from the support plates 24.

Incidentally, since the positioning plate 22 is projected substantially orthogonally to the partition plate 21, the positioning plate 22 may support the first battery cell 8a by clamping it in cooperation with the first projected piece 28a, and may support the fifth battery cell 8e by clamping it in cooperation with the third projected piece 28c. This ensures that the first and second battery cells 8a, 8b and the fifth and sixth battery cells 8e, 8f can be more securely prevented from being loosened and released from the support plates 24.

As shown in FIGS. 9, 11A and 11B, reinforcing ribs 25aa to 25de formed in respectively the corner formed between the partition plate 21 and the positioning plate 22, the corners formed between the partition plate 21 and the support plates 24, and the corner formed between the partition plate 21 and the attaching plate 23 are formed, for example, in the number of five in each reinforcing rib set along the minor edge direction of the partition plate 21. Specifically, the reinforcing ribs formed on the principal surface on one side of the partition member 20 include the reinforcing ribs 25aa to 25ae formed in the corner formed between the partition plate 21 and the positioning plate 22 and the corner formed between the partition plate 21 and the first support plate 24a, the reinforcing ribs 25ba to 25be formed in the corner formed between the partition plate 21 and the first support plate 24a and the corner formed between the partition plate 21 and the second support plate 24b, the reinforcing ribs 25ca to 25ce formed in the corner formed between the partition plate 21 and the second support plate 24b and the corner formed between the partition plate 21 and the third support plate 24c, and the reinforcing ribs 25da to 25de formed in the corner formed between the partition plate 21 and the third support plate 24c and the corner formed between the partition plate 21 and the attaching plate 23. Similarly, the reinforcing ribs formed on the principal surface on the other side of the partition member 20, the reinforcing ribs 25ea to 25ee formed in the corner formed between the partition plate 21 and the positioning plate 22 and the corner formed between the partition plate 21 and the fourth support plate 24d, the reinforcing ribs 25fa to 25fe formed in the corner formed between the partition plate 21 and the fourth support plate 24d and the corner formed between the partition plate 21 and the fifth support plate 24e, the reinforcing ribs 25ga to 25ge formed between the partition plate 21 and the fifth support plate 24e and the corner formed between the partition plate 21 and the sixth support plate 24f, and the reinforcing ribs 25ha to 25he formed in the corner formed between the partition plate 21 and the sixth support plate 24f and the corner formed between the partition plate 21 and the attaching plate 23. Thus, the reinforcing ribs 25aa to 25de are formed on the principal surface on one side of the partition member 20, the 20 reinforcing ribs 25ea to 25he are formed on the principal surface on the other side of the partition member 20, and a total of 40 reinforcing ribs are formed (hereinafter, the reinforcing ribs 25aa to 25de and the reinforcing ribs 25ea to 25he will also be referred to simply as the reinforcing ribs 25).

As a result, the reinforcing ribs 25 enhance the mechanical strength of the partition plate 21, the positioning plate 22, the attaching plate 23 and the support plates 24 and the like, whereby they can be prevented from deformation or the like, and an enhanced impact resistance performance of the partition member 20 can be contrived. Incidentally, the number of the reinforcing ribs 25 in each reinforcing rib set along the minor edge direction of the partition plate 21 is not limited to five, and may be changed, as demanded, insofar as each part of the partition member 20 can be reinforced.

In addition, the reinforcing ribs 25da to 25de formed in the corner formed between the one-side principal surface of the partition plate 21 and the third support plate 24c and the corner formed between the one-side principal surface of the partition plate 21 and the attaching plate 23 and the reinforcing ribs 25ha to 25he formed in the corner formed between the other-side principal surface of the partition plate 21 and the sixth support plate 24f and the corner formed between the other-side principal surface of the partition plate 21 and the attaching plate 23, particularly, reinforce the attaching plate 23 and prevent the attaching plate 23 from deformation or the like. Consequently, the reinforcing ribs 25da to 25de and the reinforcing ribs 25ha to 25he can prevent the attaching plate 23 (which is a part receiving a pressure, particularly) from deformation or the like under the pressure exerted on the attaching plate 23 when the residual charge display switch element 62 mounted on the display circuit board 60 attached to the attaching plate 23 is depressed by the user or the like.

Further, the reinforcing ribs 25 are so located that the interval of the reinforcing ribs 25 on the side where the residual charge display switch element 62 is mounted, along respect to the minor edge direction of the partition plate 21, is gradually reduced as compared with that of the reinforcing ribs 25 on the side where the residual charge display switch element 62 is not mounted. This enhances the mechanical strength of the partition member 20 against the pressure exerted on the partition member 20 when the residual charge display switch element 62 mounted on the display circuit board 60 is depressed by the user or the like. Therefore, the partition member 20 can be prevented from deformation or the like under the pressure exerted on the partition member 20 when the residual charge display switch element 62 mounted on the display circuit board 60 is depressed by the user or the like.

Specifically, in this embodiment, the residual display switch element 62 mounted on the display circuit board 60 is located on the back surface 2e side, as shown in FIG. 2. In view of this, as shown in FIG. 11B, the reinforcing ribs 25aa to 25de formed on the one-side principal surface of the partition plate 21 are so located that the interval w1 between the reinforcing ribs 25aa, 25ba, 25ca, 25da and the reinforcing ribs 25ab, 25bb, 25cb, 25db, the interval w2 between the reinforcing ribs 25ab, 25bb, 25cb, 25db and the reinforcing ribs 25ac, 25bc, 25cc, 25dc, the interval w3 between the reinforcing ribs 25ac, 25bc, 25cc, 25dc and the reinforcing ribs 25ad, 25bd, 25cd, 25dd, and the interval w4 between the reinforcing ribs 25ad, 25bd, 25cd, 25dd and the reinforcing ribs 25ae, 25be, 25ce, 25de are gradually decreased in the order of the interval w1, interval w2, interval w3, and interval w4, in the direction from the interval of the reinforcing ribs 25 on the front surface 2b side where the residual charge display switch element 62 is not mounted toward the interval of the reinforcing ribs 25 on the back surface 2e side where the residual charge display switch element 62 is mounted.

Similarly, as shown in FIG. 11A, the reinforcing ribs 25ea to 25he formed on the other-side principal surface of the partition plate 21 are so located that the interval w5 between the reinforcing ribs 25ea, 25fa, 25ga, 25ha and the reinforcing ribs 25eb, 25fb, 25gb, 25hb, the interval w6 between the reinforcing ribs 25eb, 25fb, 25gb, 25hb and the reinforcing ribs 25ec, 25fc, 25gc, 25hc, the interval w7 between the reinforcing ribs 25ec, 25fc, 25gc, 25hc and the reinforcing ribs 25ed, 25fd, 25gd, 25hd, and the interval w8 between the reinforcing ribs 25ed, 25fd, 25gd, 25hd and the reinforcing ribs 25ee, 25fe, 25ge, 25he are gradually decreased in the order of the interval w5, interval w6, interval w7, and interval w8, in the direction from the interval of the reinforcing ribs 25 on the front surface 2b side where the residual charge display switch element 62 is not mounted toward the interval of the reinforcing ribs 25 on the back surface 2e side where the residual charge display switch element 62 is mounted.

Therefore, since the reinforcing ribs 25 are formed at a reduced interval on the side where the residual charge display switch element 62 is mounted, the mechanical strength of the portion, on which a pressure is exerted when the residual charge display switch element 62 is depressed by the user or the like, of the partition member 20 and the surroundings can be enhanced concentratedly, and the partition member 20 can be prevented from deformation or the like under the pressure.

Incidentally, the manner in which the reinforcing ribs 25 are formed is not limited to the configuration in which the interval of the reinforcing ribs 25 is gradually decreased from the side where the residual charge display switch element 62 is not mounted toward the side where the residual charge display switch element 62 is mounted, insofar as the mechanical strength of the portion, on which the pressure is exerted when the residual charge display switch element 62 is depressed by the user or the like, of the partition member 20 and the surroundings can be enhanced concentrically. Thus, a configuration may be adopted in which only the interval of the reinforcing ribs 25 at and around the position where the residual charge display switch element is mounted is reduced.

In addition, as shown in FIG. 9, the reinforcing ribs 25 are each formed in a curved shape corresponding to the outer shape of the battery cell 8, for supporting the battery cells 8 disposed between them and the support plates 24.

Figure 15:
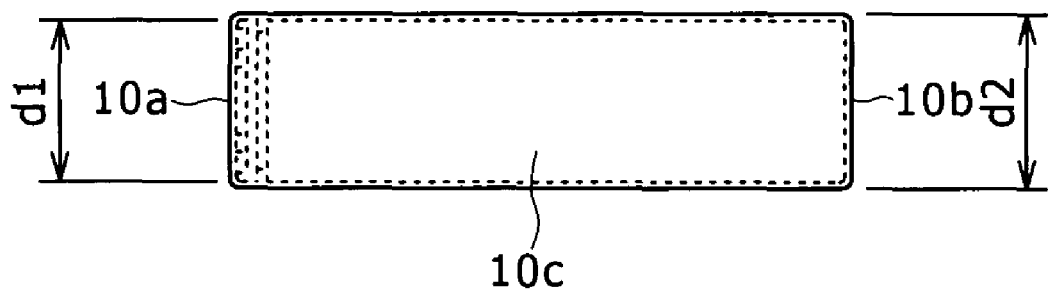
FIG. 15 is a side view of the battery cell.

As shown in FIG. 15, the battery cell 8 has such a shape that its outer size on the positive electrode terminal 10a side is greater than that on the negative electrode terminal 10b side. This is because the battery cell 8 is expanded in the radial direction when the positive electrode cap constituting the positive electrode terminal 10a is welded to the cell can of the battery cell 8. Specifically, the battery cell 8 has a shape in which its outer size d1 on the positive electrode terminal 10a side is greater than its outer size d2 on the negative electrode terminal 10b side by about 0.2 mm.

In view of this, the reinforcing ribs 25 are formed correspondingly to the outer sizes d1, d2 which are different on the positive electrode terminal 10a side and the negative electrode terminal 10b side of the battery cell 8. Specifically, the reinforcing ribs 25 corresponding to the positive electrode terminal 10a side of the battery cell 8 are formed in a curved shape with an inner diameter d3 corresponding to the outer size d1 on the positive electrode terminal 10a side, whereas the reinforcing ribs 25 corresponding to the negative electrode terminal 10b side are formed in a curves shape with an inner diameter d4 corresponding to the outer size d2 on the negative electrode terminal 10b side. The inner diameter d3 of the reinforcing rib 25 is greater than the inner diameter d4 by about 0.2 mm, correspondingly to the fact that the outer size d1 on the positive electrode terminal 10a side is greater than the outer size d2 on the negative electrode terminal 10b side by about 0.2 mm.

More specific description will be made by taking as an example the row (set) of the reinforcing ribs 25ha to 25he formed in the corner formed between the other-side principal surface of the partition plate 21 and the sixth support plate 24f and the corner formed between the other-side principal surface of the partition plate 21 and the attaching plate 23. As shown in FIGS. 8A and 8B, the eighth battery cell 8h disposed between the sixth support plate 24f and the attaching plate 23 is so disposed that its positive electrode terminal 10a fronts on the terminal part 6 side, i.e., on the front surface 2b side. Here, FIG. 16A is a sectional view taken along line F-F of FIG. 11A, and FIG. 16B is a sectional view taken along line G-G of FIG. 11A.

Figure 16A:
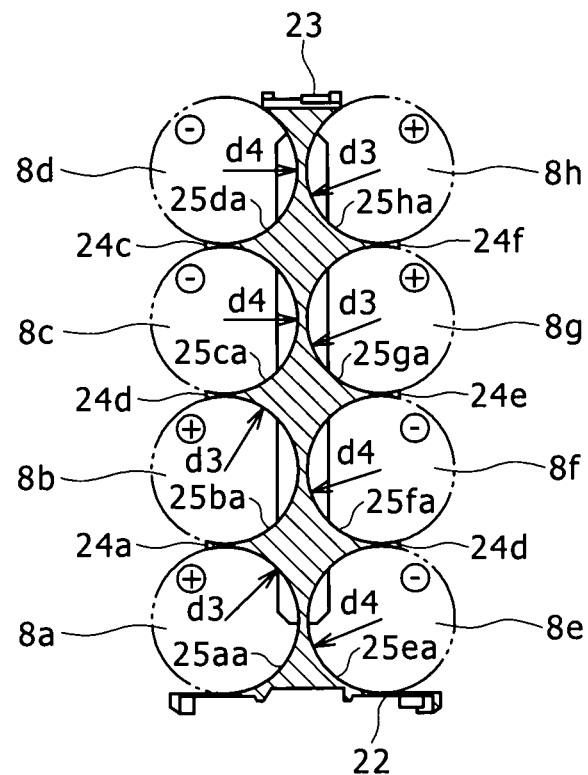
Figure 17A:
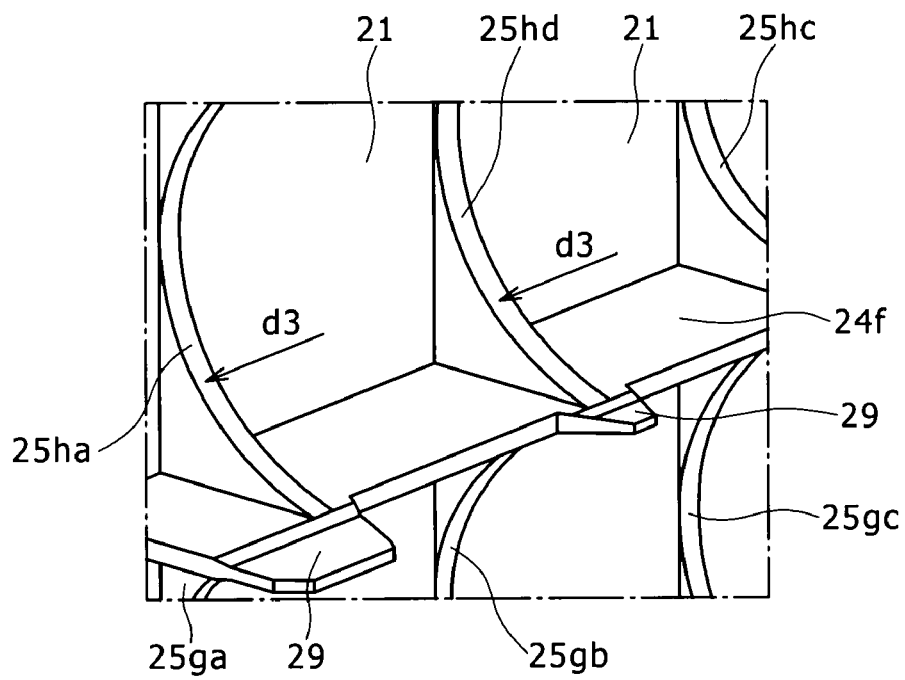

As shown in FIGS. 11A and 16A, the reinforcing ribs 25ha to 25hc corresponding to the positive electrode terminal 10a side of the eighth battery cell 8h so disposed that its positive electrode terminal 10a fronts on the front surface 2b side are formed in a curved shape with the inner diameter d3 corresponding to the outer diameter d1 on the positive electrode terminal 10a side of the battery cell 8. As a result, as shown in FIG. 17A, the reinforcing ribs 25ha to 25hc formed in the curved shape with the inner diameter d3 are provided on the support plate 24 in the state of not reaching the positions on the tongue pieces 29 which are formed to project in the extension direction from the support plate 24.

Figure 16B:
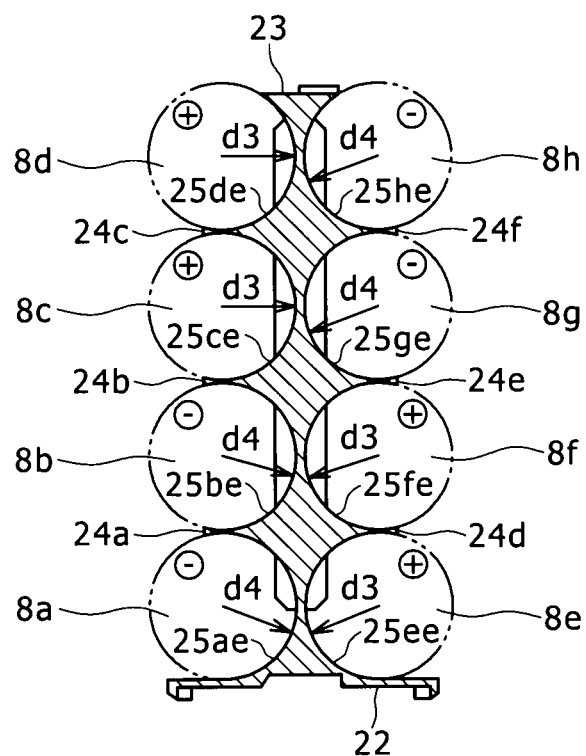
Figure 17B:
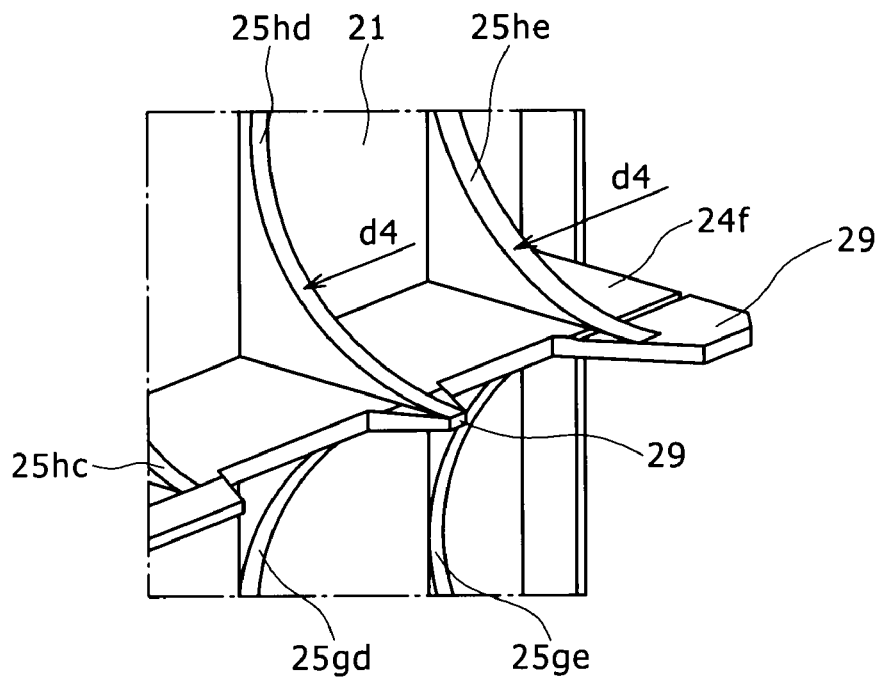

In addition, as shown in FIG. 16B, the reinforcing ribs 25hd, 25he corresponding to the negative electrode terminal 10b side of the eighth battery cell 8, other than the reinforcing ribs 25ha to 25hc corresponding to the positive electrode terminal 10a side of the battery cell 8, are formed in a curved shape with the inner diameter d4 corresponding to the outer size d2 on the negative electrode terminal 10b side of the battery cell 8. As a result, as shown in FIG. 17B, the reinforcing ribs 25hd, 25he formed in the curved shape with the inner diameter d4 are provided to reach the positions on the tongue pieces 29 formed to project in the extension direction from the support plate 24.

Similarly, the rows (sets) of the reinforcing ribs 25aa to 25ae, 25ba to 25be, 25ga to 25ge are configured correspondingly to the arrangement in which the positive electrode terminals 10a of the first, second and seventh battery cells 8a, 8b, 8g front on the terminal part 6 side, i.e., on the front surface 2b side. Specifically, the reinforcing ribs 25aa to 25ac, 25ba to 25bc, 25ga to 25gc corresponding to the positive electrode terminal 10a side of the first, second and seventh battery cells 8a, 8b, 8g are formed in a curved shape with the inner diameter d3 corresponding to the outer size d1 on the positive electrode terminal 10a side of the battery cell 8, in the same manner as the reinforcing ribs 25ha to 25hc, whereas the reinforcing ribs 25ad, 25ae, 25bd, 25be, 25gd, 25ge corresponding to the negative electrode terminal 10b side of the first, second and seventh battery cells 8a, 8b, 8g are formed in a curved shape with the inner diameter d4 corresponding to the outer size d2 on the negative electrode terminal 10b side of the battery cell 8, in the same manner as the reinforcing ribs 25hd, 25he.

In addition, the rows (sets) of the reinforcing ribs 25ca to 25ce, 25da to 25de, 25ea to 25ee, 25fa to 25fe are configured correspondingly to the arrangement in which the positive electrode terminals 10a of the third, fourth, fifth and sixth battery cells 8c, 8d, 8e, 8f front on the opposite side of the terminal parts 6, i.e., on the back surface 2e side. Specifically, the reinforcing ribs 25cb to 25ce, 25db to 25de, 25eb to 25ee, 25fb to 25fe corresponding to the positive electrode terminals 10a of the third, fourth, fifth and sixth battery cells 8c, 8d, 8e, 8f are formed in a curved shape with the inner diameter d3 corresponding to the outer size d1 on the positive electrode terminal 10a side of the battery 8, in the same manner as the reinforcing ribs 25ha to 25hc, whereas the reinforcing ribs 25ca, 25da, 25ea, 25fa corresponding to the negative electrode terminals 10b of the third, fourth, fifth and sixth battery cells 8c, 8d, 8e, 8f are formed in a curves shape with the inner diameter d4 corresponding to the outer size d2 on the negative electrode terminal 10b side of the battery cell 8, in the same manner as the reinforcing ribs 25hd, 25he.

Thus, the reinforcing ribs 25 are configured correspondingly to the outer sizes d1, d2 which are different on the positive electrode terminal 10a side and the negative electrode terminal 10b side of the battery cell 8. Therefore, the battery cells 8 can be supported in better contact with the reinforcing ribs 25, and the battery cells 8 can be supported without chattering.

In addition, the reinforcing ribs 25 are so configured that at least the reinforcing ribs 25 formed on the most front surface 2b and back surface 2e sides and corresponding to the outer diameter d1 on the positive electrode terminal 10a side of the battery cells 8 are formed to be greater in diameter than the other reinforcing ribs 25. Therefore, in assembling the battery cells 8 onto the partition member 20, the battery cells 8 can be easily inserted between the support plates 24, with their negative electrode terminal 10b side as the insertion end.

Incidentally, the reinforcing ribs 25 are not limited to the above-mentioned configuration in which the reinforcing ribs 25aa to 25ac, 25ba to 25bc, 25cb to 25ce, 25db to 25de, 25eb to 25ee, 25fb to 25fe, 25ga to 25gc, 25ha to 25hc are formed in the curved shape with the inner diameter d3, and the other reinforcing ribs 25ad, 25ae, 25bd, 25be, 15ca, 25da, 25ea, 25fa, 25gd, 25ge, 25hd, 25he are formed in the curved shape with the inner diameter d4. The configuration may be changed, as demanded, insofar as the reinforcing ribs are formed correspondingly to the outer sizes d1, d2 which are different on the positive electrode terminal 10a side and the negative electrode terminal 10b side of the battery cells 8 and the battery cells 8 can be thereby supported without chattering.

Besides, the reinforcing ribs 25 are not limited to the curved shapes with the inner diameters d3, d4, insofar as they can support the battery cells 8 without chattering. For example, the reinforcing ribs 25 may be formed with the inner diameters set corresponding to the respective outer sizes of the battery cell 8 at the positions where the battery cell 8 is supported by the reinforcing ribs 25.

Figure 18:
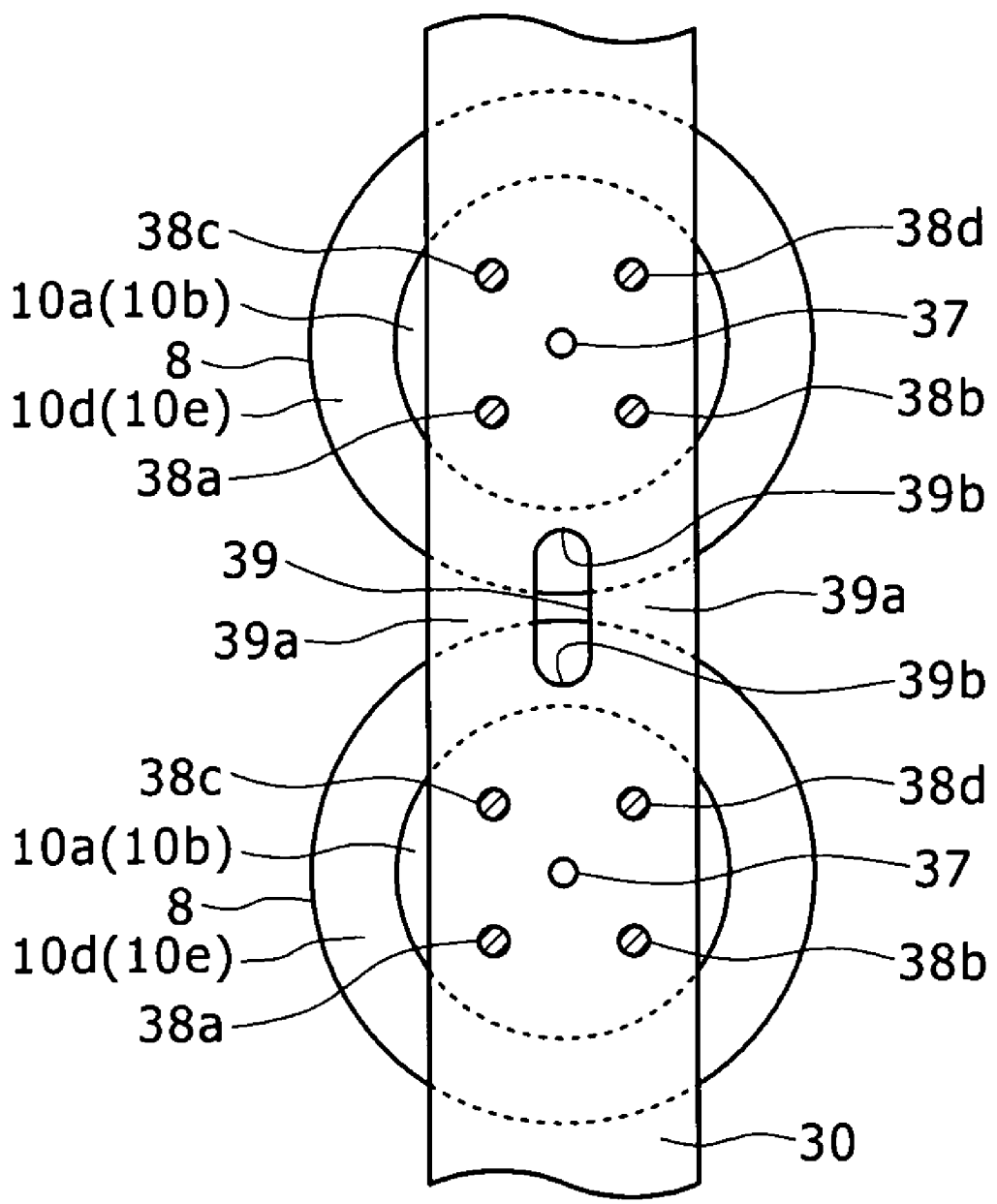
FIG. 18 is a front view showing a welded condition of an electrode tab and the battery cells.

The electrode tabs 30 for electrical connection between the terminals of the battery cells 8 partitioned and supported by the partition member 20 as above-described are fixed to the terminal surfaces of the battery cells 8 by spot welding, as shown in FIGS. 8A and 8B. In addition, as shown in FIG. 18, the electrode tab 30 fixed to the terminals of the battery cells 8 by spot welding is formed with a slit 39 along the longitudinal direction thereof, between sets of weld fixation parts 38a to 38d (hereinafter, the weld fixation parts 38a to 38d will also be referred to simply as the weld fixation parts 38) at the terminals of the battery cells 8, and with load absorbing parts 39a, 39a at both ends in the width direction of the slit 39. The slit 39 is formed in the shape of a slot (oblong hole), for example. The load absorbing parts 39a, 39a serve to provide electrical connection between the sets of the weld fixation parts 38 at the terminals of the battery cells 8. The electrode tab 30 thus provided with the slit 39 and the load absorbing parts 39a, 39a is so provided that, due to the presence of the slit 39, the load absorbing parts 39a, 39a provided at both ends in the width direction of the slit 39 are lower in rigidity than the other parts, particularly, the weld fixation parts 38.

This ensures that, for example, in the case where the battery pack 1 is dropped or in the like situation, the impact load generated due to the dropping of the battery pack 1 is concentrated in the load absorbing parts 39a, 39a, so that the electrode tab 30 is plastically or elastically deformed at the load absorbing parts 39a, 39a. Therefore, the load on the electrode tab 30 is concentrated on the load absorbing parts 39a, 39a so provided as to be lower in rigidity than the other parts, whereby the load can be prevented from being concentrated on the weld fixation parts 38 fixing the battery cells 8 and the electrode tab 30, and the load exerted on the weld fixation parts 38 are moderated, whereby the weld fixation parts 38 can be prevented from rupture or the like.

In addition, the slit 39 and the load absorbing parts 39a, 39a are formed roughly at a middle position between the sets of weld fixation parts 38 for the terminals of the battery cells 8. This ensures that the load is prevented from being concentrated on the load absorbing parts 39a, 39a provided at both end parts in the width direction of the slit 39, and the load is exerted substantially evenly on the load absorbing parts 39a, 39a, whereby the load absorbing parts 39a, 39a are prevented from rupture or the like. Therefore, since the electrode tab 30 is provided with the slit 39 and the load absorbing parts 39a, 39a roughly at the middle position between the sets of the weld fixation parts 38 for the terminals of the battery cells 8, the load is exerted substantially evenly on the load absorbing parts 39a, 39a, and the load exerted on the weld fixation parts 38 can be moderated substantially evenly, so that the weld fixation parts 38 can be prevented from rupture or the like.

Besides, the slit 39 is formed roughly at the center in the width direction of the electrode tab 30. This ensures that in the electrode tab 30, the load absorbing parts 39a, 39a provided at both end parts in the width direction of the slit 39 are substantially equal in width, so that concentration of a load on the load absorbing part 39a on one side is prevented from occurring. In addition, since the load is exerted evenly on the load absorbing parts 39a, 39a, the load absorbing parts 39a, 39a are prevented from rupture or the like. Thus, since the electrode tab 30 is provided with the slit 39 roughly at the center in the width direction thereof and the load absorbing parts 39a, 39a have substantially equal widths, the load is exerted substantially evenly on the load absorbing parts 39a, 39a, the load exerted on the weld fixation parts 38 can be moderated evenly, and the weld fixation parts 38 can be prevented from rupture or the like.

In addition, the slit 39 is formed in such a length that the both end parts 39b, 39b thereof are located on the outside of a positive electrode side covered part 10d, where an outer peripheral part of the end face of the positive electrode terminal 10a of the battery cell 8 is covered with an insulating film, and a negative electrode side covered part 10e, where an outer peripheral part of the end face of the negative electrode terminal 10b of the battery cell 8 is covered with an insulating film. This ensures that both end parts 39b, 39b of the slit 39 in the electrode tab 30 do not overlap with the positive electrode terminal 10a exposed from the positive electrode side covered part 10d or with the negative electrode terminal 10b exposed from the negative electrode side covered part 10e, so that the welding area at the time of spot welding of the electrode tab 30 to the positive electrode terminal 10a or the negative electrode terminal 10b of the battery cell 8 can be prevented from being reduced.

Besides, the electrode tabs 30 each includes a copper plate which is plated with nickel. Consequently, the electrode tabs 30 are lower in overall rigidity than the nickel electrode tabs which have hitherto been used. Therefore, the electrode tab 30 is formed to be low in overall rigidity, and the load thereon is concentrated on the load absorbing parts 39a, 39a, whereby the load can be prevented from being concentrated on the weld fixation parts 38 fixing the battery 8 and the electrode tab 30 to each other, and the load exerted on the weld fixation parts 38 is moderated, whereby the weld fixation parts 38 can be prevented from rupture or the like.

Figure 19:
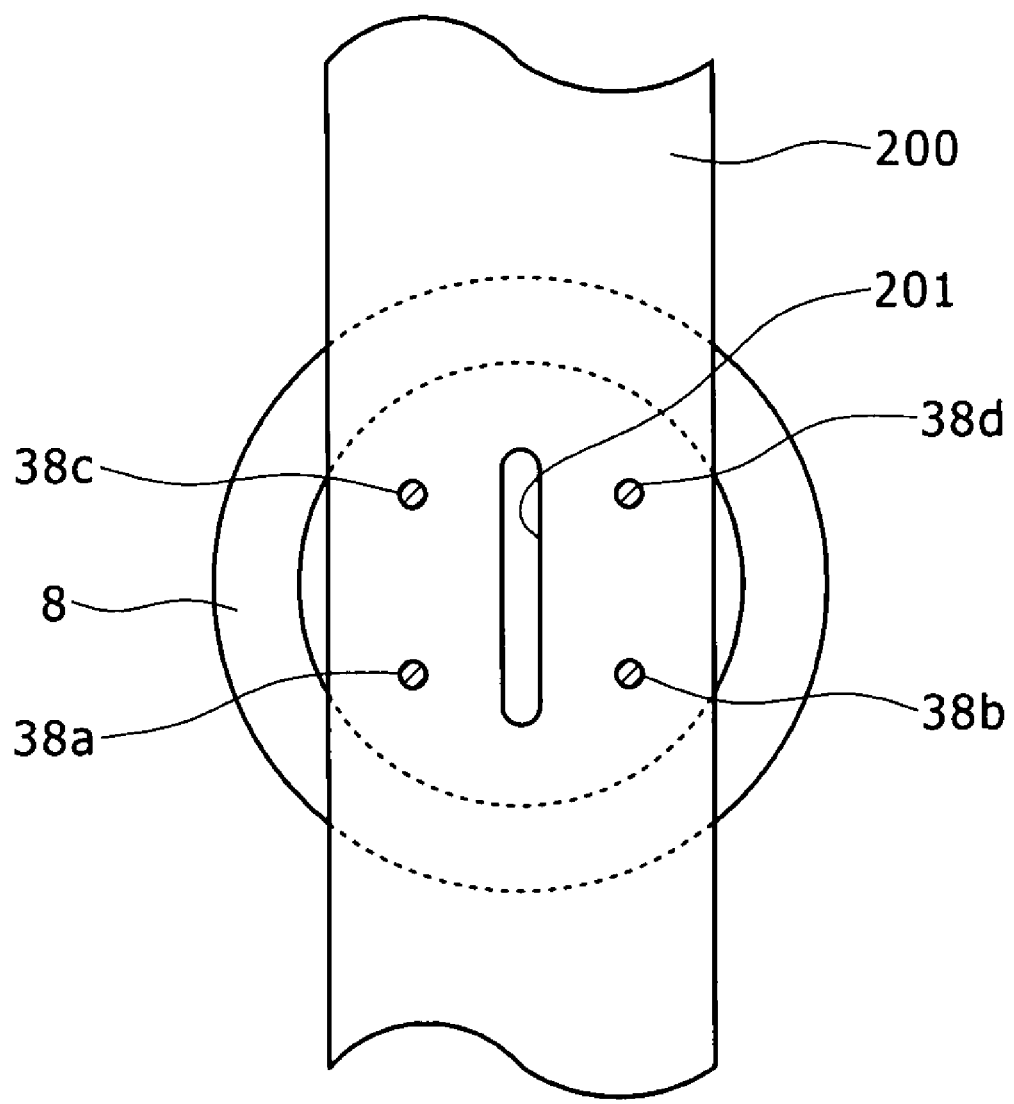
FIG. 19 is a front view showing a welded condition of an electrode tab and a battery cell according to the related art.

Here, as shown in FIG. 19, a nickel-made electrode tab 200 used in the related art is formed with a welding slit 201 corresponding to a terminal surface of the battery cell 8, for spot welding to the terminal of the battery cell 8. In the electrode tab 200 in the related art, a first welding electrode and a second welding electrode are operated twice in the manner of coming across the welding slit 201 to obtain a total of four welding points; specifically, they are operated twice to obtain a total of four welding points, namely, weld fixation parts 38a, 38b and weld fixation parts 38c, 38d, whereby the electrode tab 200 is spot welded to the terminal surface of the battery cell 8. In the spot welding of the electrode tab 200 in the related art, the non-effective shunt current, which flows from the first welding electrode directly to the second welding electrode through the related-art electrode tab 200 instead of flowing through the welding point and which therefore does not contribute to welding, is suppressed by elongating the non-effective shunt current path through providing the welding slit 201. On the other hand, in the case of the electrode tab 30 including a copper plate which is plated with nickel, copper has a very low electrical resistivity, so that the magnitude of the non-effective shunt current is little changed even when the non-effective shunt current path is elongated by providing the welding slit 201. In view of this, in the present invention, the electrode tab 30 is not provided with a welding slit 201.

Figure 20:
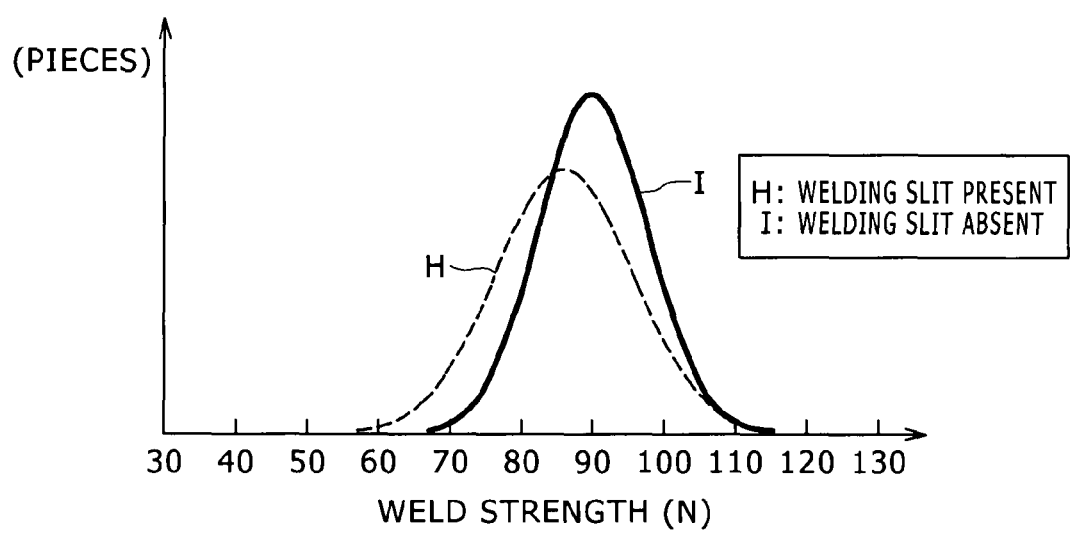
FIG. 20 is a diagram showing the distributions of weld strength depending on the presence/absence of a welding slit in an electrode tab including a nickel-plated copper plate.

In addition, FIG. 20 is a diagram showing the distributions of weld strength depending on the presence/absence of the welding slit 201 in the electrode tab 30 including a nickel-plated copper plate, wherein the distribution of weld strength in the case where the welding slit 201 is provided is indicated by broken line H, while the distribution of weld strength in the case where the welding slit 201 is not provided is indicated by solid line 1. As shown in FIG. 20, the distribution of weld strength is a normal distribution both when the welding slit 201 is present and when the welding slid 201 is absent. However, the mean value of weld strength is about 85 N where the welding slit 201 is present, and is about 90 N where the welding slit 201 is absent, as in the present invention; thus, it was confirmed that the weld strength is enhanced by the absence of the welding slit 201. In view of this, the electrode tab 30 is not provided with a welding slit 201 in the present invention.

As shown in FIG. 18, the electrode tab 30 not provided with any welding slit 201 is provided with a position matching hole 37 for matching the position thereof to the terminal of a battery cell 8 when the electrode tab 30 is spot welded to the terminal of the battery cell 8 by the manufacturer of the battery cell 8. The position matching hole 37 is a through-hole which is formed to correspond substantially to the center of the terminal face of the battery cell 8 when the electrode tab 30 is disposed on the terminal of the battery cell 8, and which is formed substantially at the center in the width direction of the electrode tab 30.

Thus, the position matching hole 37 is utilized as a register mark of aligning it to a substantially central position of the terminal of the battery cell 8 when the electrode tab 30 is disposed on the terminal of the battery cell 8 by the manufacturer who performs the spot welding, whereby the position matching between the center of the terminal of the battery cell 8 and the position of the electrode tab 30 can be easily carried out. In addition, the position matching hole 37 functions also as a register mark for applying the first welding electrode and the second electrode respectively to symmetric positions on the left and right sides of the substantially central position in the width direction of the electrode tab 30 when the electrode tab 30 is spot welded by the manufacturer.

In addition, in spot welding of the electrode tab 30, spot welding by use of the first welding electrode and the second welding electrode in the surroundings of the position matching hole 37 is conducted symmetrically on the left and right sides of the position matching hole 37, a total of two times, namely, once on the upper side (in FIG. 18) and once on the lower side, whereby the electrode tab 30 is welded to the terminal of the battery cell 8 with four weld fixation parts 38a to 38d. In this case, the position matching hole 37 and the weld fixation parts 38a to 38d are so laid out that the position matching hole 37 is provided in a central area of the four corners of a substantially rectangular shape defined by the weld fixation parts 38a to 38d; for example, they appear like the spots on a die indicating "5." Therefore, the manufacturer can easily check, by visual inspection, whether welding has been conducted at all the necessary positions, without leaving any yet-to-be-welded point.

Figure 21:
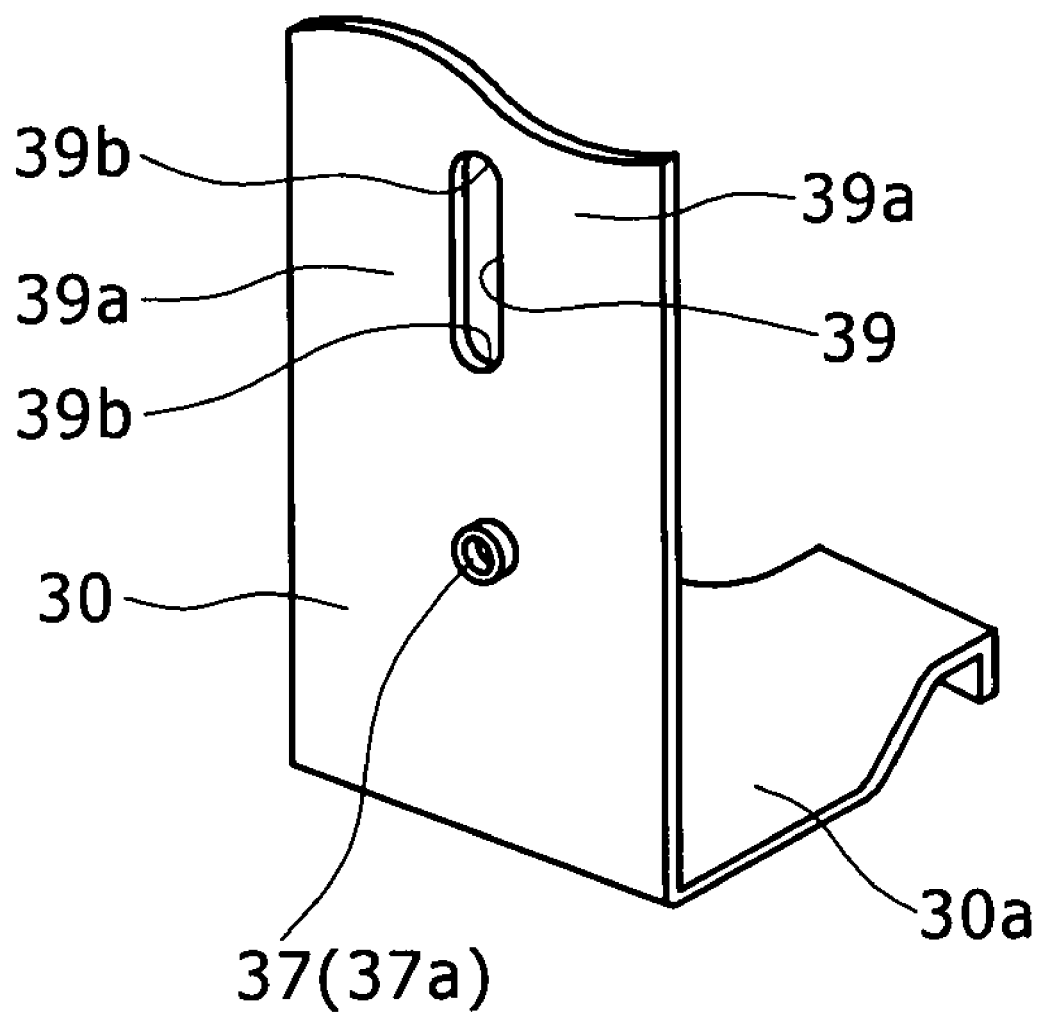
FIG. 21 is a perspective view of an essential part of an electrode tab showing a position matching hole having been subjected to burring.

Further, as shown in FIG. 21, each of the electrode tabs 30 has at least one position matching hole 37 subjected to burring in which a tubular projection is formed in the periphery of the hole by squeezing simultaneously with boring at the time of press forming. The tubular projection 37a formed by the burring is formed, for example, at the position matching hole 37 disposed on the most tip part 30a side of the electrode tab 30. Besides, the tubular projection 37a is projected on the side of the principal surface of the electrode tab 30 opposite to the side of the principal surface to be brought into contact with the battery cell 8. Therefore, with the position matching hole 37 of the electrode tab 30 subjected to the burring, the tubular projection 37a is formed at the principal surface part, whereby a plurality of electrode tabs 30 can be prevented from being stacked in secure contact with each other, and the manufacturer can be prevented from unknowingly picking up a plurality of electrode tabs 30 at a time.

Figure 22:
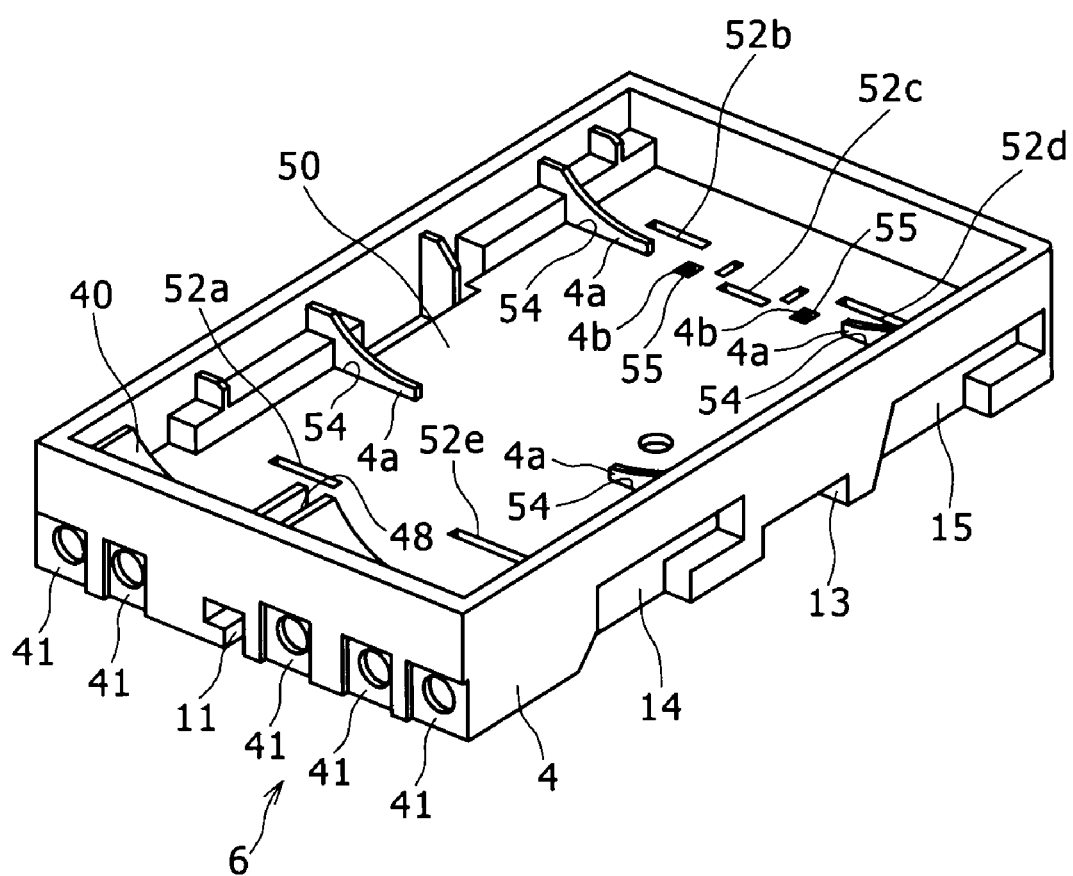
FIG. 22 is a perspective view showing the condition where a terminal case is mounted to a lower case.
Figure 23:
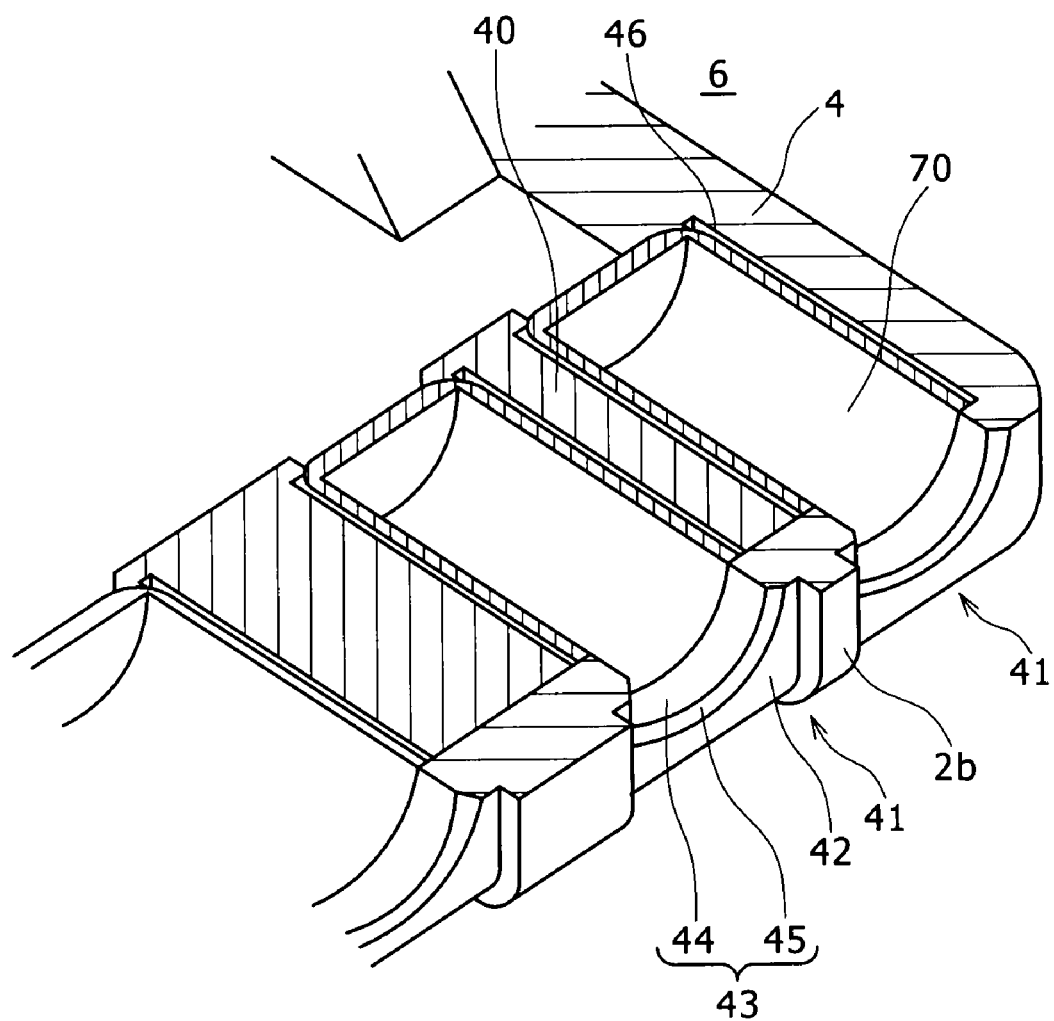
FIG. 23 is a perspective view, partly broken, of a terminal part.

As shown in FIG. 22, a lower case 4 for containing the battery cells 8 partitioned by the partition member 20 is formed in a roughly rectangular box-like shape having an opening part on the upper side. In addition, the lower case 4 is formed with a terminal part 6 at a lower part of the front surface 2b. As shown in FIG. 23, the terminal part 6 includes: terminal holes 41 exposed from the front surface 2b to the exterior; and a terminal case 40 in which joint members 70 disposed on the inner side of the terminal holes 41 and receiving terminal pins (not shown) formed on the battery mount part 5 side and inserted therein is fitted.

As shown in FIG. 23, the terminal hole 41 includes: a recessed surface part 42 formed at the front surface 2b of the casing 2; and a guide part 43 formed at the recessed surface part 42 to be continuous with the joint member 70. The recessed surface part 42 formed at the front surface 2b of the casing 2 is a roughly rectangular recess, which prevents a short-circuit from occurring due to contact of the joint member 70 with external metals and prevents the joint member 70 from being deformed by collision on an external body. The recessed surface part 42 is provided with a guide part 43 opened in a substantially circular shape roughly in the center of the bottom surface thereof. The guide part 43 formed at the recessed surface part 42 includes: a support surface part 44 formed to be substantially equal in diameter to the joint member 70 and operative to support the terminal pin together with the joint member 70; and an inclined surface part 45 opened, with a diameter greater than the diameter of the terminal pin, on the recessed surface part 42 side of the support surface part 44 and operative to guide the terminal pin into the joint member 70. The inclined surface part 45 formed on the recessed surface part 42 side of the support surface part 44 is opened with a diameter greater than the diameter of the terminal pin, so that it permits the terminal pin to be easily inserted into the support surface part 44. The support surface part 44 into which the terminal pin guided by the inclined surface part 45 is inserted is formed to be substantially equal in diameter to the joint member 70 and be continuous with the joint member 70, and therefore ensures that the terminal pin guided by the inclined surface part 45 can be inserted into the joint member 70 without any load exerted thereon. In addition, the support surface part 44 holds the terminal pin, together with the joint member 70.

Figure 24:
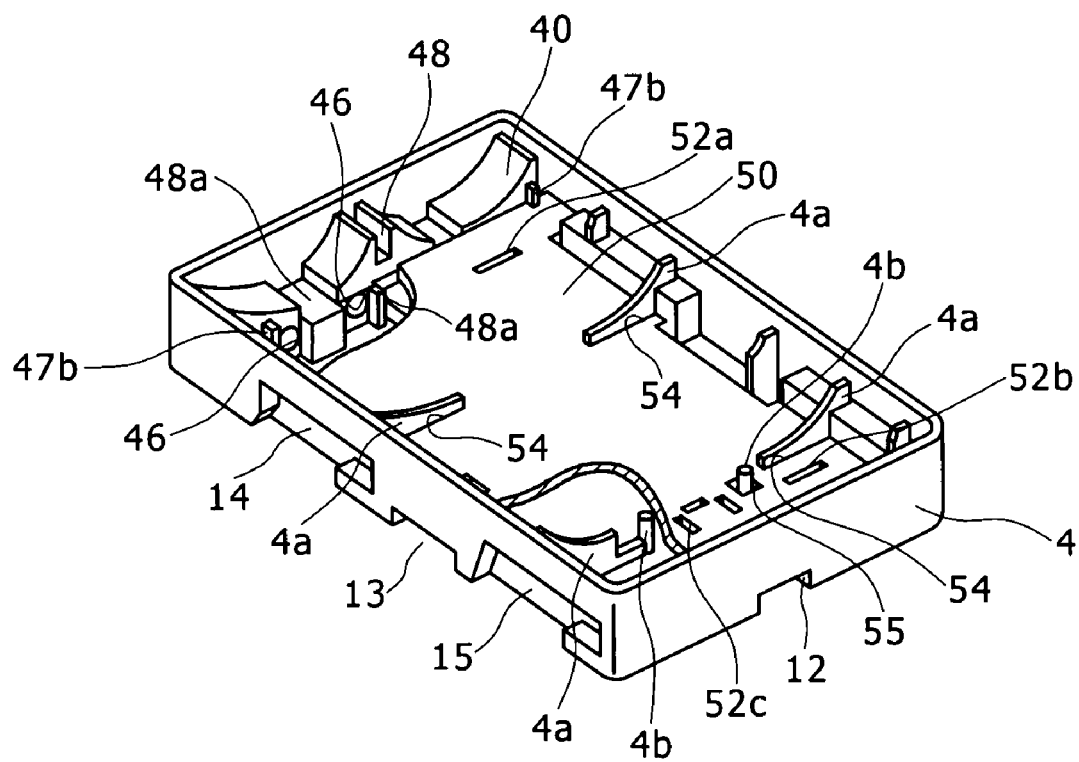
FIG. 24 is a perspective view, partly broken, of the condition where the terminal case is mounted to the lower case.

As shown in FIG. 24, the terminal case 40 disposed inside the terminal hole 41 is a roughly rectangular resin part formed to have major edges substantially equal in length with the inside width of the lower case 4. The terminal case 40 is provided along its major edge direction with fitting holes 46 in which to contain the joint members 70, and the main circuit board 50 is attached to the terminal case 40.

As shown in FIG. 9, the main circuit board 50 attached to the terminal case 40 is a printed wiring board having conductor patterns formed on one side, on both sides, or in multiple layers, and is a rigid board. In addition, the main circuit board 50 is formed to be roughly the same in size and shape as the inside of the lower case 4. Besides, as shown in FIG. 25B, the main circuit board 50 is provided, in the vicinity of the one-side minor edge to be attached to the terminal case 40 of the primary surface on the back surface side, with first to fifth terminal connection parts 53a to 53e (hereinafter, the first to fifth terminal connection parts 53a to 53e will also be referred to simply as the terminal connection parts 53) to be connected to the joint members 70 through connection tabs 71, correspondingly to the layout positions of the first to five terminal parts 6a to 6e.

As shown in FIG. 23, the joint member 70 contained in the terminal case 40 is a metallic member which is disposed to be continuous with the support surface part 44 of the terminal hole 41 and which has a cylindrical shape opened at one end of the longitudinal direction and closed at the other end. The fitting hole 46 in which to contain the joint member 70 has a cylindrical shape having an inner diameter substantially equal to the outer diameter of the joint member 70 and being opened at both ends of the longitudinal direction. The joint members 70 are fitted in the fitting holes 46, and are continuous with the terminal holes 41 through the end faces of the fitting holes 46 on the open end side thereof. On the closed end side, the joint members 70 are fixed by welding or soldering to the metal-made connection tabs 71 soldered respectively to the terminal connection parts 53a to 53e of the main circuit board 50 attached to the terminal case 40 (see FIG. 25B). Since the terminal case 40 is disposed inside the lower case 4 together with the main circuit board 50, as shown in FIG. 23, the joint members 70 are continuous with the support surface parts 44 of the terminal holes 41, and support the terminal pins inserted in the support surface parts 44 in the inserted state.

In the terminal part 6 as above, the insertion holes are opened inside the recessed surface parts 42 of the terminal holes 41, and continuation thereof with the joint members 70 through the guide parts 43 is secured, whereby the joint members 70 are disposed on the inner side of the casing 2 relative to the front surface 2b. This ensures that the terminal part 6 can prevent a short-circuit from occurring between the joint members 70 and external metals and can prevent the joint members from deformation or the like due to collision on an external body. In the terminal part 6, besides, the terminal pins are inserted and held in both the support surface parts 44 of the guide parts 43 of the terminal holes 41 and the joint members 70 fitted in the terminal case 40. Thus, the terminal pins are each inserted and held in two component parts, namely, the terminal hole 41 on the lower case 4 side and the terminal case 40 disposed inside the lower case 4. This ensures that, even when a vibration is exerted on the electronic apparatus at the time of loading the battery pack 1, the load exerted on the terminal pins can be lessened, and reliability of electrical connection can be maintained.

Besides, as shown in FIG. 4, in the terminal part 6 as above, five terminal parts, namely, the first to fifth terminal parts 6a to 6e are disposed side by side at a lower part of the front surface 2b. The first and second terminal parts 6a, 6b and the fourth and fifth terminal parts 6d, 6e are formed at left-right symmetrical positions in the front surface 2b of the casing 2. The third terminal part 6c is formed at a position deviated from the center of the front surface 2b toward the side of the fourth and fifth terminal parts 6d, 6e. In addition, an end face of the insertion guide groove 11 is exposed at the center of the front surface 2b.

Besides, as above-mentioned, the terminals formed at the terminal parts 6a to 6e have respective functions assigned according to the SMBus interface standard. Specifically, the first terminal part 6a has the function of a positive electrode terminal of the battery pack 1, the second terminal part 6b has the function of a clock line terminal, the third terminal part 6c has the function of a data line terminal, the fourth terminal part 6d has the function of an ID terminal to which an ID resistor is connected, and the fifth terminal part 6e has the function of a negative electrode terminal of the battery pack 1.

In use of the battery pack 1, the casing 2 is inserted into the battery mount part 5, and is slid toward the front surface 2b side, whereby the terminal pins disposed on the battery mount part 5 side are inserted into and held in the terminal parts 6a to 6e, respectively. Here, a communication circuit unit 57 for performing communication with an external electronic apparatus or the like connected to the terminal parts 6a to 6e is mounted on the main circuit board 5, by use of a plurality of electronic parts such as IC chips. Consequently, as shown in FIG. 10, the battery pack 1 enables various operations between the communication circuit unit 57 on the main circuit board 50 and the electronic apparatus side, such as supply of electric power through the first and fifth terminal parts 6a, 6e, communication of various data, for example, residual battery charge, full charge, the current charge, the time for which the battery pack 1 can be used under the current conditions, or the number of charge-discharge cycles, ID data indicative of the battery pack 1 being a genuine product, etc. through the third terminal part 6c, and detection of the ID resistance through the fourth terminal part 6d, according to clock data supplied through the second terminal part 6b.

The ID resistance detected through the fourth terminal part 6d is used to detect, on the electronic apparatus side, which one of a plurality of types of battery packs prepared according to the different values of capacity has been loaded; in short, different resistance values are set respectively for the L-size battery pack 1 and the S-size battery pack 100. When a terminal pin is inserted into the fourth terminal part 6d, the resistance on the side of the battery pack 1, 100 is measured on the electronic apparatus side, and it is decided which one of the battery packs 1 and 100 has been loaded.

Here, the fourth terminal part 6d is formed in proximity to the fifth terminal part 6e having the function of the negative electrode terminal. The reason is as follows. If the ID detection resistor and the negative electrode line are disposed remote from each other, electromagnetic radiations from the other signal lines and the like may be propagated therebetween as noises, possibly making it hard to achieve accurate measurement of resistance. In the battery pack 1, therefore, the fourth terminal part 6d is disposed in proximity to the negative electrode terminal constituted of the fifth terminal part 6e, which makes it possible to design a short distance between the ID resistor and the negative electrode line, and to achieve accurate measurement of resistance.

In addition, in consideration of the structure in which the insertion guide groove 11 on the front surface side is formed substantially at the center in the width direction of the front surface 2b of the casing 2, the third terminal part 6c is formed at a position deviated to either of the left and right sides, in this embodiment, to the side of the fourth and fifth terminal parts 6d, 6e.

As a result, the battery pack 1 has a configuration in which the terminal parts 6a to 6e are disposed at nonuniform intervals, and, accordingly, the terminal pins formed on the battery mount part 5 side are also formed at nonuniform intervals corresponding to the terminal parts 6a to 6e, respectively. Therefore, the terminal pins may not be inserted into the terminal parts 6a to 6e when the left and right sides of the battery pack 1 are reversed (in relation to those in the correct insertion mode), so that mis-insertion of the battery pack 1 into the battery mount part 5 can be obviated.

Figure 25A:
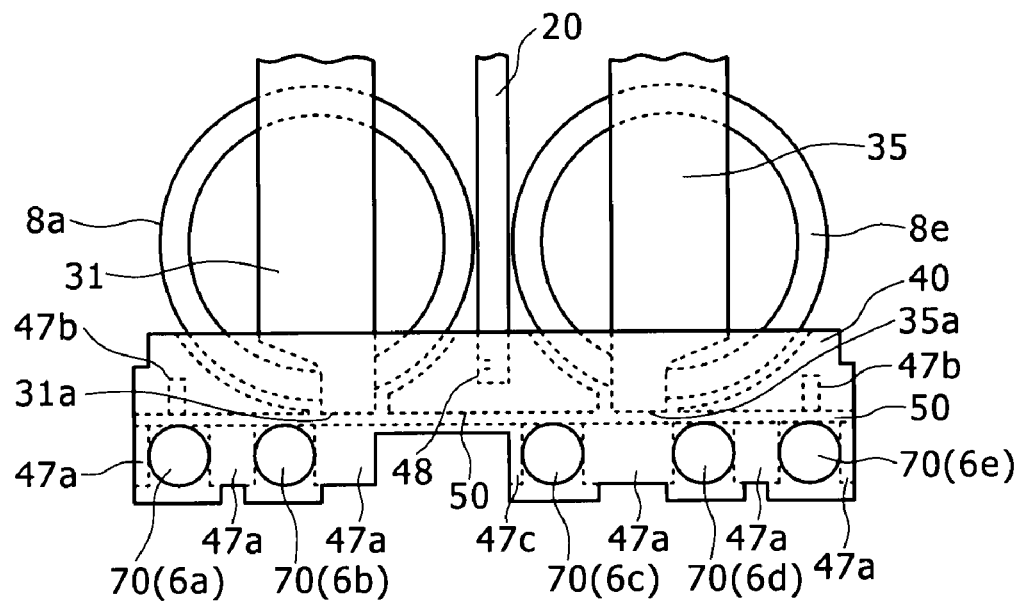
Figure 25B:
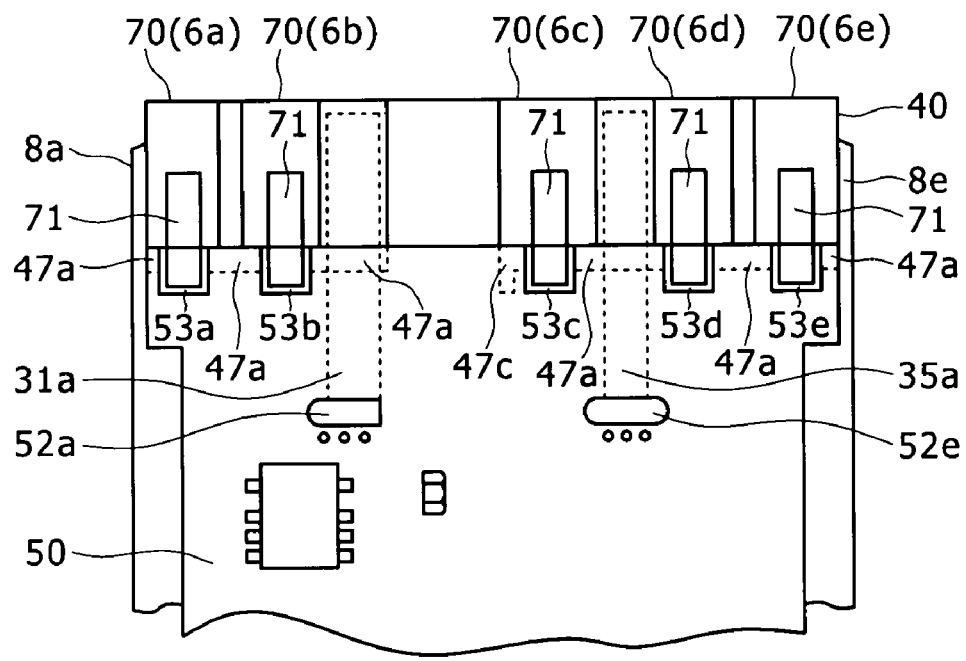

Besides, as shown in FIGS. 25A and 25B, between the second terminal part 6b and the third terminal part 6c and between the third terminal part 6c and the fourth terminal part 6d, the first and fifth electrode tabs 31, connected to the electrodes of the battery cell 8 are disposed in such a manner as to overlap with neither of the third and fourth terminal parts 6c, 6d. The first and fifth electrode tabs 31, 35 electrically connected between the terminals of the battery cell 8 are formed to be narrower on the side of their tip parts 31a, 35a, and when they are contained into the casing 2, the tip parts 31a, 35a are bent and then soldered respectively to first and fifth electrode tab connection parts 52a, 52e of the main circuit board 50. With the battery cell 8 contained in the casing 2 together with the main circuit board 5, the first and fifth electrode tabs 31, 35 are so disposed that their tip parts 31a, 35a are located between the second terminal part 6b and the third terminal part 6c and between the third terminal part 6c and the fourth terminal part 6d, but not located on the same plane as the terminal parts 6a to 6e. In addition, the first and fifth electrode tabs 31, 35 are bent from end parts of the battery cell 8 along the main circuit board 50, whereby their narrowed tip parts 31a, 35a are so laid around as not to overlap with the second to fourth terminal parts 6b to 6d. Therefore, in the battery pack 1, electromagnetic radiations due to the first and fifth electrode tabs 31, 35 can be prevented from being propagated as noises to communication lines, and accurate data communication can be achieved.

Figure 26:
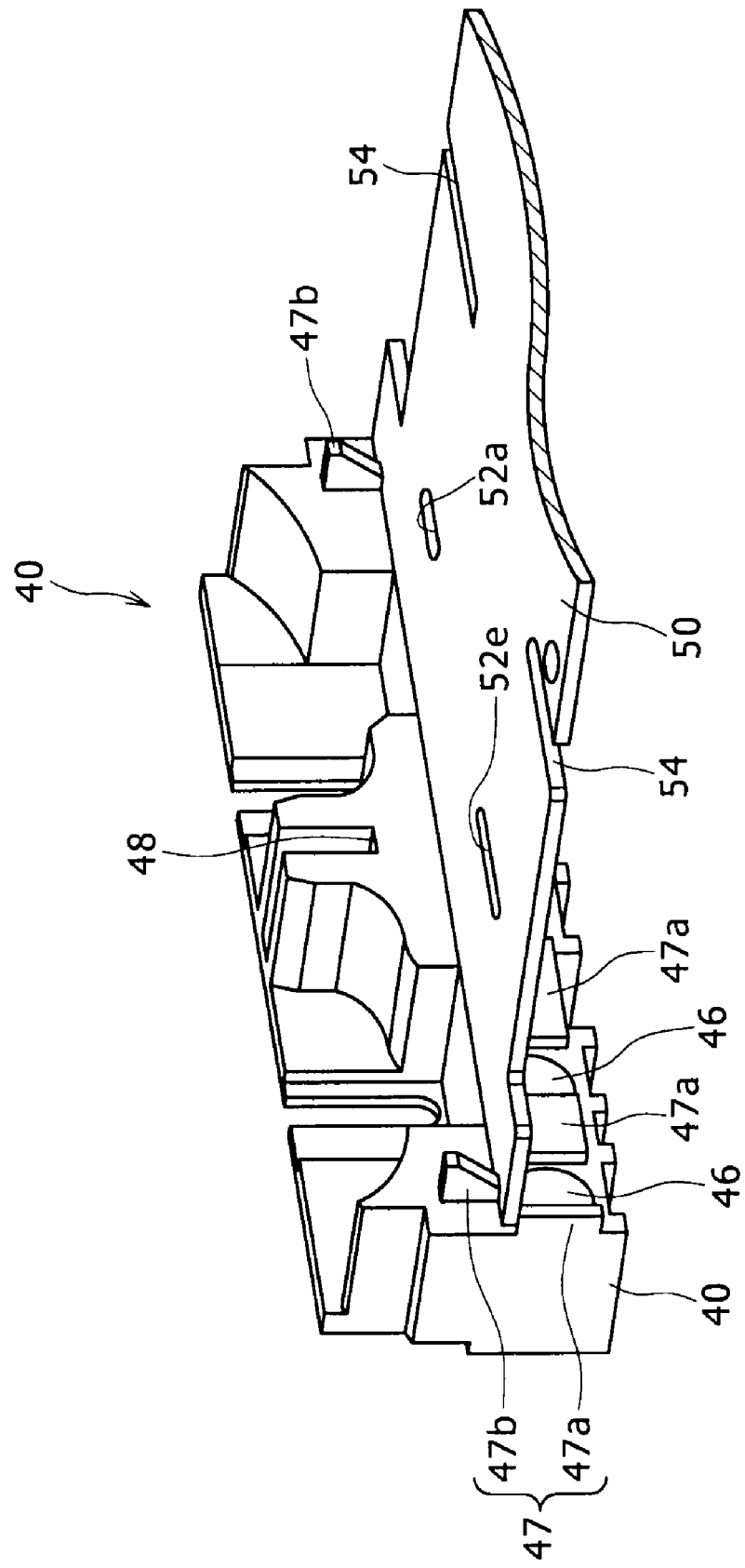
FIG. 26 is a perspective view showing the condition where the main circuit board is mounted to the terminal case.
Figure 27:
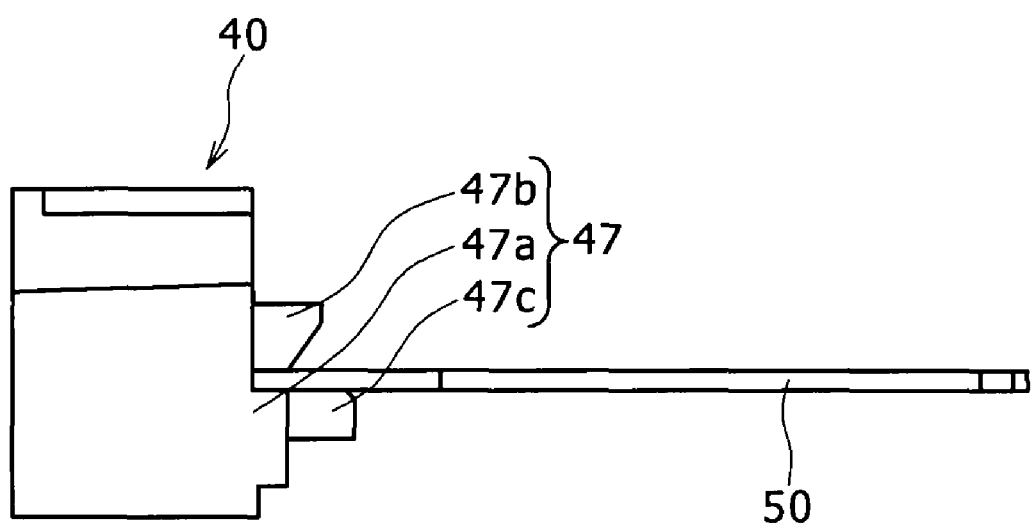
FIG. 27 is a side view showing the condition where the main circuit board is mounted to the terminal case.

In addition, as shown in FIGS. 22 and 24, the main circuit board 50 is attached to the principal surface, on the opposite side of the principal surface brought into contact with the terminal holes 41, of the terminal case 40. As shown in FIGS. 26 and 27, the principal surface, on the opposite side of the principal surface brought into contact with the terminal holes 41, of the terminal case 40 is provided with board support parts 47 for clamping one minor edge of the main circuit board 50 in the thickness direction of the main circuit board 50. The board support part 47 includes a lower side support part 47a for supporting one principal surface of the main circuit board 50, and an upper side support part 47b for supporting the other principal surface of the main circuit board 50. The lower side support parts 47a are projectingly provided in plurality between both end parts in the major edge direction of the terminal case 40 and the fitting holes 46. In addition, in the vicinity of a substantially central position of the minor edge on one side of the main circuit board 50, a lower side support part 47c supporting the one-side principal surface of the main circuit board 50 in the same manner as the lower side support part 47a but projected largely as compared with the lower side support part 47a is provided. The upper side support parts 47b are projectingly provided near both ends in the width direction of the main circuit board 50, in the state of being spaced from the lower side support parts 47a, 47c by an amount roughly equivalent to the thickness of the main circuit board 50. Thus, the principal surfaces on one side and the other side of the main circuit board 50 are supported respectively by the lower side support parts 47a, 47c and the upper side support part 47b of the board support parts 47, whereby the main circuit board 50 is mounted to the terminal case 40.

Figure 28:
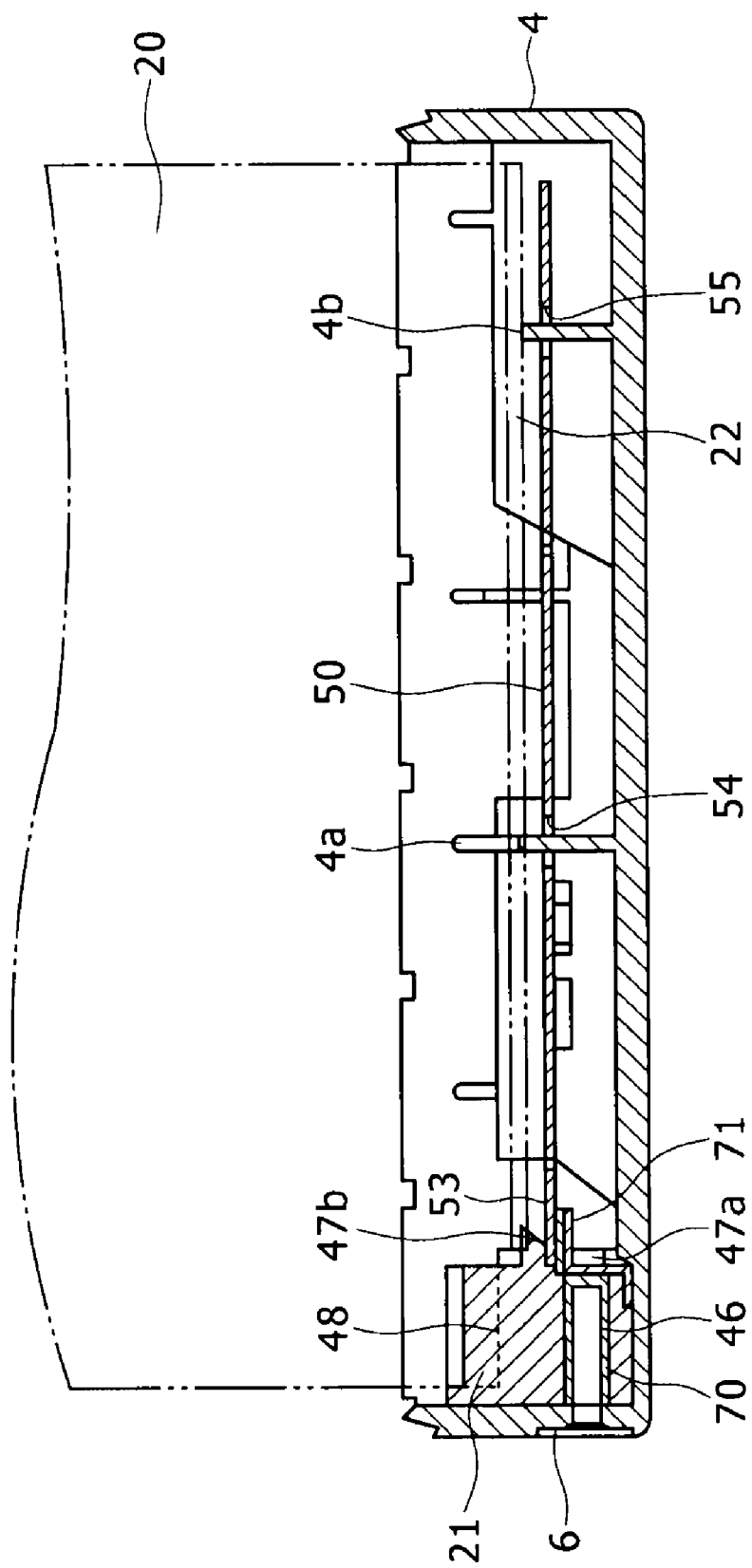
FIG. 28 is a vertical sectional view showing the main circuit board and the terminal case disposed on the inside of the lower case.

As shown in FIG. 28, the main circuit board 50 disposed inside the lower case 4 together with the terminal case 40 is mounted while being supported by the board support parts 47, so that the main circuit board 50 is provided in the state of being spaced from the inside bottom surface of the lower case 4. This ensures that electronic parts larger in height than existing ones can also be mounted on the principal surface, facing the bottom surface of the lower case 4, of the main circuit board 50.

Further, the main circuit board 50 is provided with rib relief grooves 54 corresponding to the layout positions of case reinforcing ribs 4a formed in the inside of the lower case 4. The rib relief grooves 54 are formed to leave clearances between themselves and the case reinforcing ribs 4a, so that the main circuit board 50 is prevented from interfering with the case reinforcing ribs 4a.

Here, the partition member 20 disposed over the main circuit board 50 is supported by a support part 48 formed at the upper surface of the terminal vase 40 shown in FIG. 24 and by support protrusions 4b formed inside the lower case 4 shown in FIG. 24. The support part 48 formed at the upper surface of the terminal case 40 has a groove shape opened on the upper side, and a support piece 21a provided on the lower side of the front surface of the partition plate 21 of the partition member 20 as shown in FIGS. 9, 11A and 11B is inserted in the support part 48, whereby the partition member 20 is supported. As shown in FIG. 24, the support protrusions 4b formed inside the lower case 4 are projectingly provided on the lower surface near the back surface of the lower case 4, at substantially symmetric positions on the left and right sides of the center in the width direction of the lower case 4, and are formed to be continuous with the tips of the case reinforcing ribs 4a of the lower case 4. As shown in FIG. 28, the support protrusions 4b are abutted on the positioning plate 22 of the partition member 20, thereby supporting the partition member 20. Therefore, the partition member 20 is stably supported at three or more points, since the support piece 21a is supported by the support part 48 while the positioning plate 22 is supported by the plurality of support protrusions 4b.

On the other hand, as shown in FIGS. 24 and 28, the main circuit board 50 is provided with support protrusion passing holes 55 through which to pass the support protrusions 4b, correspondingly to the layout positions of the support protrusions 4b. The support protrusion passing holes 55 are formed to be larger in diameter than the support protrusions 4b, which prevents the main circuit board 50 from interfering with the support protrusions 4b. This ensures that the main circuit board 50 is provided inside the lower case 4 in the state of being supported by the terminal case 40 in a cantilever mode, without interfering with the lower case 4. With the main circuit board 50 thus configured, therefore, for example when the battery pack 1 or 100 is dropped or in the like occasion, the impact load generated due to the dropping of the battery pack, the battery pack 1 or 100 can be prevented from being exerted on the main circuit board 50 through the lower case 4. Further, the load of the battery cell 8 disposed over the main circuit board 50 can be prevented from being exerted on the main circuit board 50.

In addition, as shown in FIG. 1, the lower case 4 for containing the terminal case 40 and the main circuit board 50 as above is provided in its lower surface 2a with a pair of insertion guide grooves 11, 12 which extend in the direction of sliding between the mount position of the battery mount part 5 and the loading/unloading position and which are spaced from each other along the sliding direction. Guide projections (not shown) projectingly provided at the bottom surface of the battery mount part 5 are inserted into the insertion guide grooves 11, 12, whereby the loading/unloading operations of the casing 2 can be guided, and the casing 2 mounted in the battery mount part 5 can be prevented from chattering in the directions of both side surfaces 2c, 2d.

Further, as shown in FIG. 1, the lower case 4 is provided with a detection recess or recesses 13 for detection of the species of the battery pack 1, at either one or both of edges formed by the lower surface 2a and both side surfaces 2c, 2d. The detection recesses 13 are provided at both side surfaces 2c, 2d in the case of the L-size battery pack 1, and the detection recess 13 is provided only on the side of the other side surface 2d in the case of the S-size battery pack 100. This ensures that, in using the battery pack 1, the species such as L-size and S-size of the battery packs 1, 100 can be detected, by mis-insertion preventive engaging projections (not shown) projectingly provided at side surfaces, facing both side surfaces 2c and 2d of the casing 2, of the battery mount part 5 correspondingly to the detection recesses 13.

In addition, the lower case 4 is provided with locking recesses 14 and 15 at positions which are on the edges formed by the lower surface 2a and the side surfaces 2c, 2d and which are on both sides of the detection recess 13. When the casing 2 is inserted into the battery mount part 5 and slid to the mount position, the locking recesses 14 and 15 are locked on locking projections (not shown) projectingly provided at side surfaces of the battery mount part 5 correspondingly to the locking recesses 14, 15, whereby the battery pack 1 is mounted to the bottom surface of the battery mount part 5.

Figure 3B:
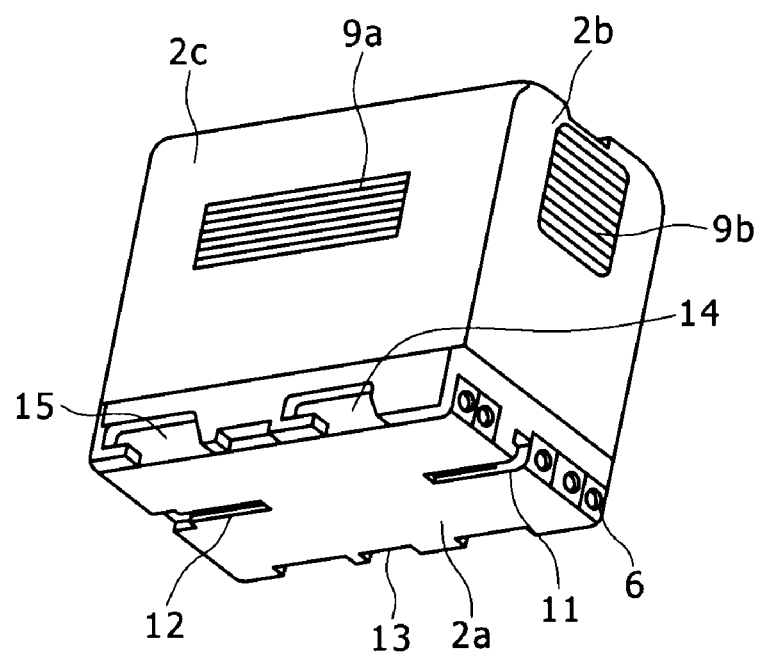

Furthermore, the lower case 4 is welded to the upper cover 3 in the state of covering the battery cell 8 contained therein. The upper cover 3 is formed by use of a synthetic resin. As shown in FIGS. 1B and 3B, one side surface 2c, which is adjacent to the front surface 2b and the back surface 2e and which is directed vertically up when the battery pack 1 is mounted into the battery mount part 5, of the casing 2 is provided with an identification part 9a for identification of the gripping surfaces according to the mounting direction. Furthermore, the front surface 2b and the back surface 2e of the casing 2 are provided with anti-slip parts 9b at the positions of gripping by the user.

The identification part 9a formed on the one side surface 2c which is directed up when the battery pack 1 is mounted into the battery mount part 5 is for permitting the user to identify the gripping surfaces of the casing 2 at the time of mounting the battery pack 1 into the battery mount part 5. The identification part 9a is formed by forming a recessed surface part in the one side surface 2c, graining the inside of the recessed surface part and, further, graining the recessed surface part to form projected lines extending in the front-rear direction. This permits the user, when gripping the battery pack 1 by his right hand, to put the index finger or the middle finger on the one side surface 2c, causing the identification part 9a to make contact with the fingertip, thereby intuitively recognize that the battery pack 1 is being correctly gripped with the one side surface of the casing 2 directed up, and intuitively sensing the sliding direction upon insertion of the casing 2 in the battery mount part 5. Accordingly, mis-insertion of the battery pack 1 can be prevented.

The anti-slip parts 9b formed in the front surface 2b and the back surface 2e are provided for permitting the user to easily grip the casing 2 and for preventing slip-off of the casing 2 at the time of mounting the battery pack 1 into the battery mount part 5, in consideration of the fact that the battery pack 1 for use in business-use electronic apparatuses contains more battery cells 8 and is hence heavier as compared with the battery pack for use in private-use electronic apparatuses. The anti-slip parts 9b are formed by forming recessed surface parts at upper parts of the front surface 2b and the back surface 2e, and graining the inside of the recessed surface parts.

With the identification part 9a and the anti-slip parts 9b thus formed, the battery pack 1 permits the user to see that the casing 2 is being gripped correctly for mounting it into the battery mount part 5, to avoid mis-insertion of the battery pack 1, and to securely recognize an increase, if any, in the weight of the casing 2.

Incidentally, the casing 2 is not only grained at the identification part 9a and the anti-slip parts 9b of the upper cover 3 but also grained in other regions in a manner different from the identification part 9a and the anti-slip parts 9b.

In addition, in consideration of the use for such electronic apparatuses as the business-use video camera 7, the casing 2 including the lower case 4 and the upper cover 3 has a configuration in which the lower case 4 and the upper cover 3 are greater in material thickness than the partition member 20.

The casing 2 in the related art is formed in a minimum material thickness which promises a reduced size instead of a larger outer size and which conforms to the UL (Underwriters Laboratories Inc.) 94 Standard (fire retardancy of plastics). Therefore, in the battery packs according to the related art, the material thickness of the partition member 20 is set to be larger than that of the casing 2, and enhancement of the impact resistance of the partition member 20 for partitioning the battery cells 8 contained in the casing 2 is contrived, so as to enhance the overall impact resistance performance.

However, the battery pack 1 to be used in such electronic apparatuses as video camera 7 for business use contains more battery cells 8 and is hence heavier, as compared with the battery pack to be used in private-use electronic apparatuses, so that the casing 2 itself exposed to the exterior is more keenly requisite to have a high strength.

Figure 29A:
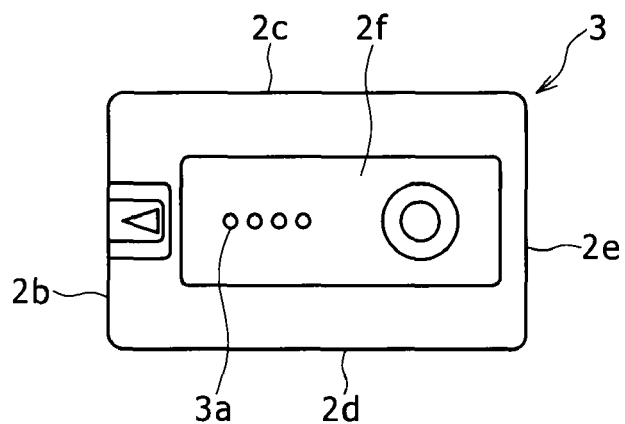
Figure 29B:
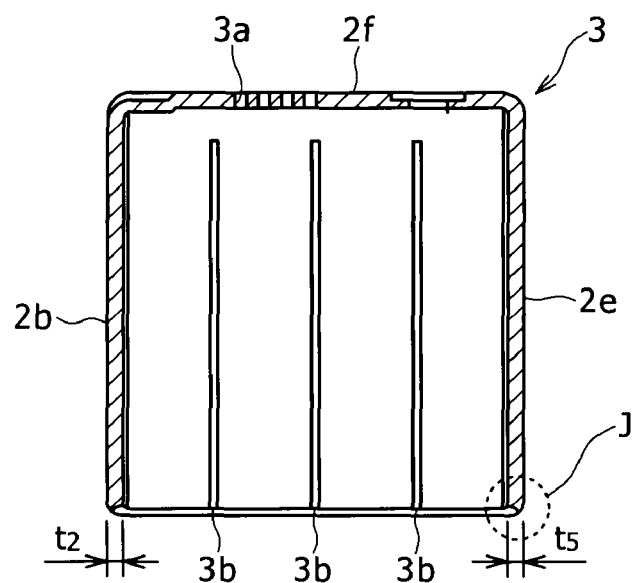
Figure 29C:
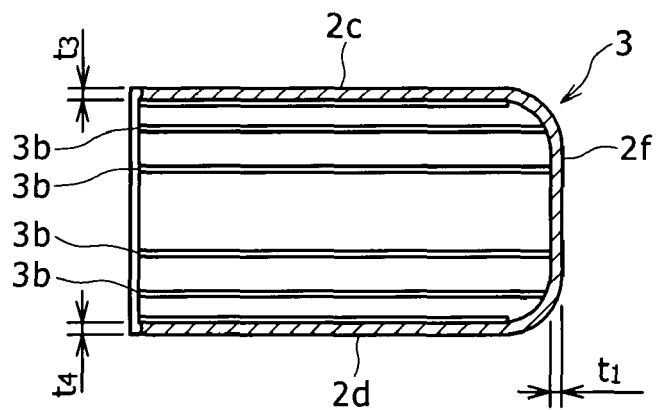
Figure 30A:
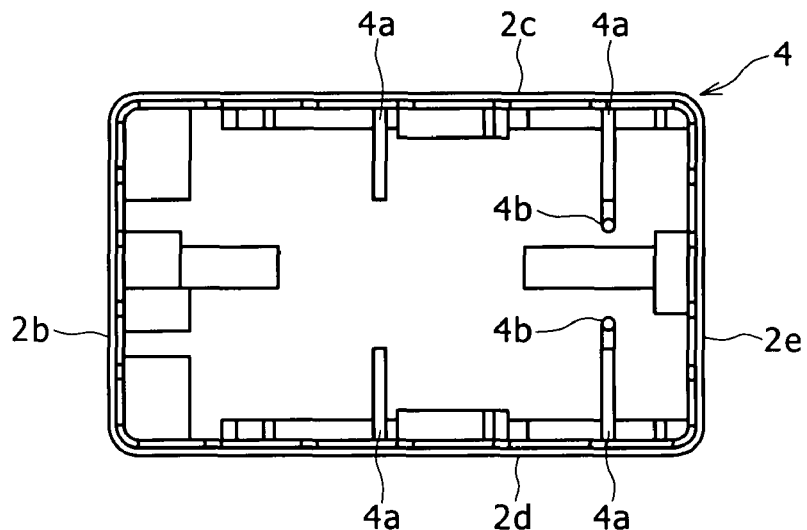
Figure 30B:
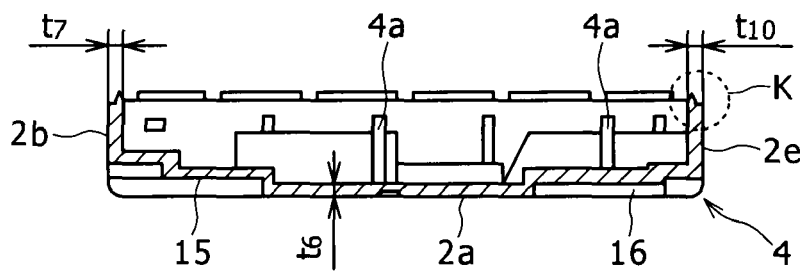
Figure 30C:
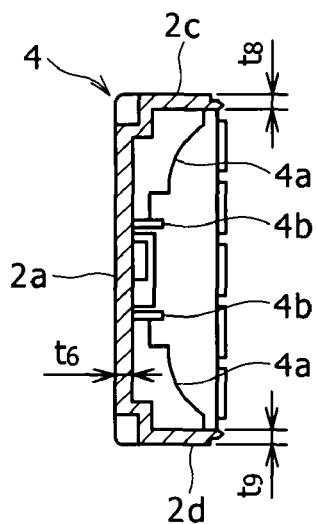
Figure 31:
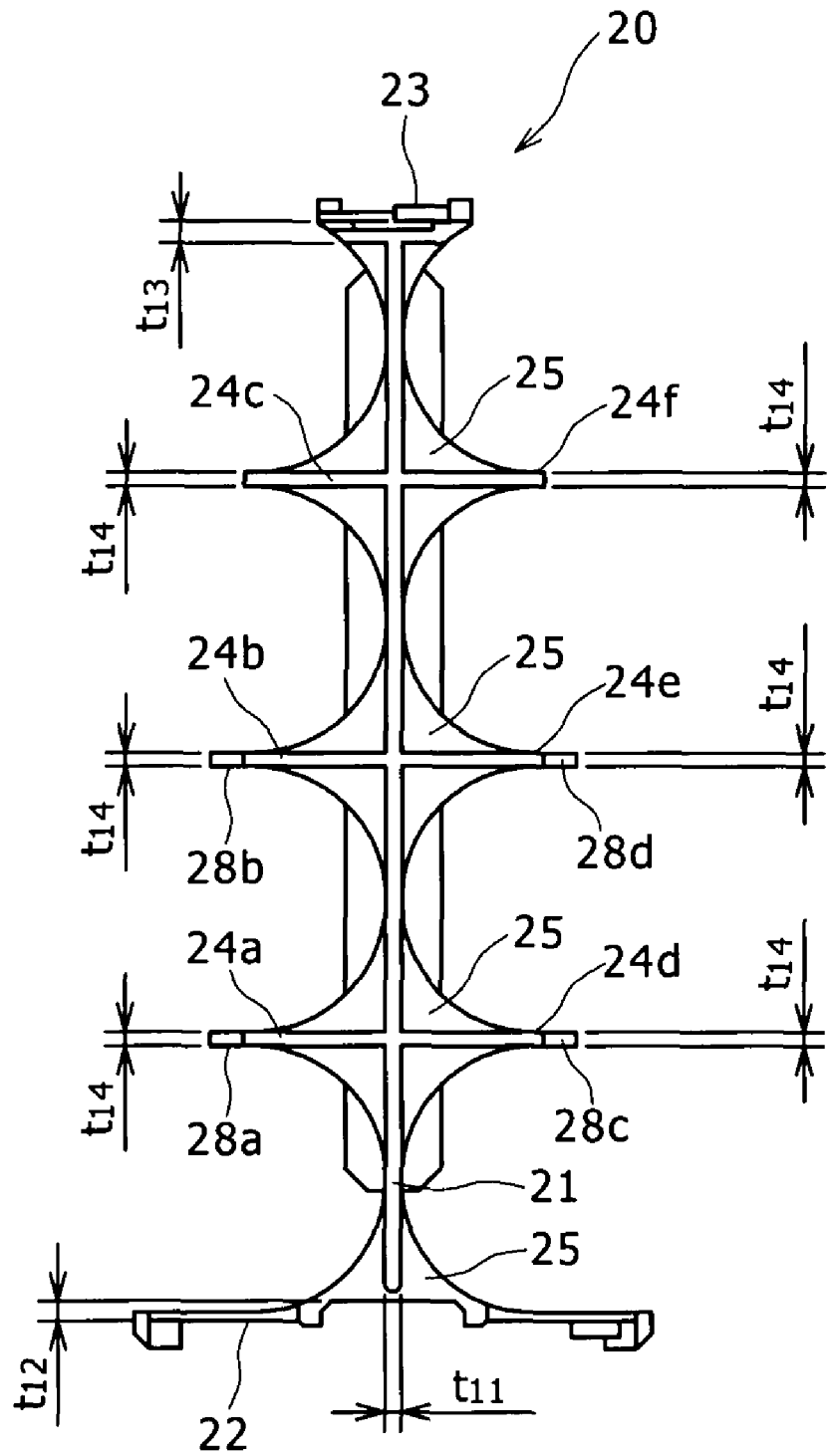
FIG. 31 is a front view of the partition member.

For example, as shown in FIGS. 29A, 29B and 29C, the upper cover 3 is formed by adopting the material thickness values of 1.5 mm (t1) for the upper surface 2f, 1.5 mm (t2) for the front surface 2b, 1.5 mm (t3) for the one side surface 2c, 1.5 mm (t4) for the other side surface 2d, and 1.5 mm (t5) for the back surface 2e. In addition, as shown in FIGS. 30A, 30B and 30C, the lower case 4 is formed by adopting the material thickness values of 1.8 mm (t6) for the lower surface 2a, 1.5 mm (t7) for the front surface 2b, 1.5 mm (t8) for the one side surface 2c, 1.5 mm (t9) for the other side surface 2d, and 1.5 mm (t10) for the back surface 2e. Further, as shown in FIGS. 29B and 29C, the upper cover 3 has a configuration in which the front surface 2b, the one side surface 2c, the other side surface 2d and the back surface 2e are provided respectively with pluralities of cover reinforcing ribs 3b; similarly, the lower case 4 is also provided with pluralities of case reinforcing ribs 4a. Besides, as shown in FIGS. 11 and 31, the partition member 20 is formed by adopting the material thickness values of 1 mm (t11) for the partition plate 21, 0.8 mm (t12) for the positioning plate 22, 0.8 mm (t13) for the attaching plate 23, 0.8 mm (t14) for the support plates 24, and 1 mm (t15) for the reinforcing ribs 25. In short, the casing 2 including the upper cover 3 and the lower case 4 is formed by adopting material thickness values of about 1.5 to 1.8 mm, whereas the partition member 20 is formed by adopting material thickness values of about 0.8 to 1 mm.

Therefore, when the battery pack 1 has a configuration in which the material thickness of the partition member 20 conforms to the UL 94 Standard, the casing 2 is set to be thinner and the casing 2 is set to be thicker, it is possible, for example while using the same overall amount of resin material as in the related art, to enhance the strength of the casing 2 and to enhance the impact strength performance. In addition, when the battery pack 1 has a configuration in which the material thickness of the partition member 20 contained in the casing 2 is set smaller, a reduction in the overall size of the casing 2 can be promised.

Figure 32:
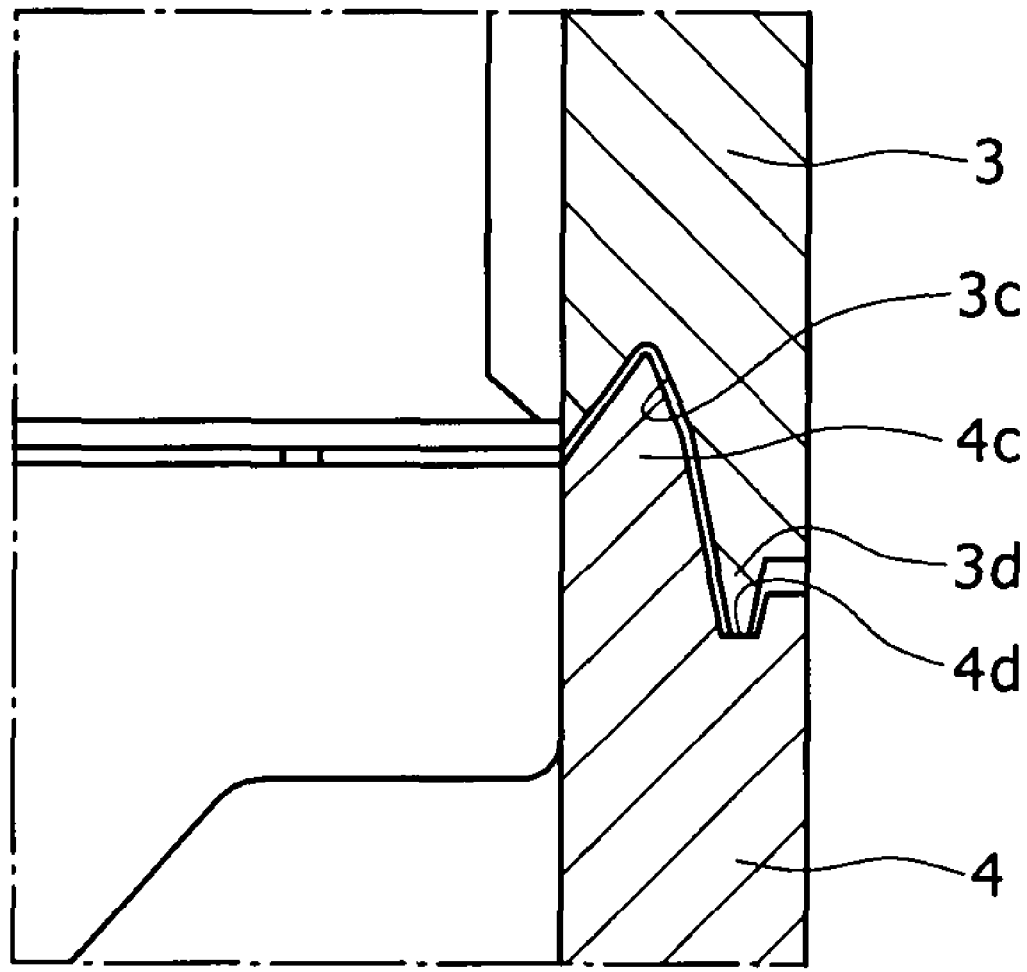
FIG. 32 is a vertical sectional view showing the condition where end parts of the upper cover and the lower case are opposed to and abutted on each other and welded to each other.

In addition, end parts of the upper cover 3 and the lower case 4 are opposed to and abutted on each other, and are welded to each other by ultrasonic welding. Here, FIG. 32 is an essential part enlarged view of part J of FIG. 29B and part K of FIG. 30B, showing the condition where end parts of the upper cover 3 and the lower case 4 are opposed to and abutted on each other. As shown in FIG. 32, the lower case 4 is formed with a first welding projection 4c along the whole inside periphery of the end part to be welded to the upper cover 3, and with a first welding recess 4d along the whole outside periphery of the end part. On the other hand, the upper cover 3 is formed with a second welding recess 3c to be engaged with the first welding projection 4c, along the whole inside periphery of the end part to be welded to the lower case 4, and with a second welding projection 3d to be engaged with the first welding recess 4d, along the whole outside periphery of the end part.

This ensures that, when the end parts of the upper cover 3 and the lower case 4 are opposed to and abutted on each other, the first welding projection 4c of the lower case 4 is engaged with the second welding recess 3c of the upper cover 3, and the second welding projection 3d of the upper cover 3 is engaged with the first welding recess 4d of the lower case 4, so that position matching can be easily achieved, the welding area of the upper cover 3 and the lower case 4 is enlarged, and an enhanced weld strength between the upper cover 3 and the lower case 4 is promised. Therefore, the upper cover 3 and the lower case 4 can be enhanced in impact resistance against an impact load generated, for example, in a situation in which the battery pack 1 to be used in such electronic apparatuses as the video camera 7 for business use that contains more battery cells 8 and is hence heavier as compared with the battery pack to be used in private-use electronic apparatuses is dropped or the like situation.

In addition, the first welding projection 4c and the first welding recess 4d of the lower case 4 are formed with rough surfaces. This ensures that, in welding the lower case 4 and the upper cover 3 to each other, the lower case 4 formed with the rough surface is more liable to generate frictional heat at the surface of welding to the upper cover 3, as compared with the related art. As a result, the surface of welding to the upper cover 3 is melted more easily, weldability of the surface to the upper cover 3 is enhanced, and ultrasonic welding is thus facilitated, as compared with the related art.

Incidentally, the lower case 4 is not limited to the configuration in which the first welding projection 4c and the first welding recess 4d are formed with rough surfaces, and it suffices that either one of the first welding projection 4c and the first welding recess 4d is formed with a rough surface, insofar as ultrasonic welding of the upper cover 3 and the lower case 4 can be achieved easily. Besides, the configuration in which the first welding projection 4c and/or the first welding recess 4d of the lower case 4 is formed with a rough surface is not limitative, and a configuration may be adopted in which the second welding projection 3d and/or the second welding recess 3c of the upper cover 3 is formed with a rough surface. Furthermore, a configuration may be adopted in which the first welding projection 4c and/or the first welding recess 4d and the second welding projection 3d and/or the second welding recess 3c are formed with rough surfaces.

Now, the S-size battery pack 100 in which four battery cells 8i to 8l are contained in two rows and two layers will be described. In the following description of the S-size battery pack 100, the parts having configurations the same as or equivalent to those in the L-size battery pack 1 described above will be denoted by the same reference symbols as used above, and descriptions of them will be omitted.

Figure 34:
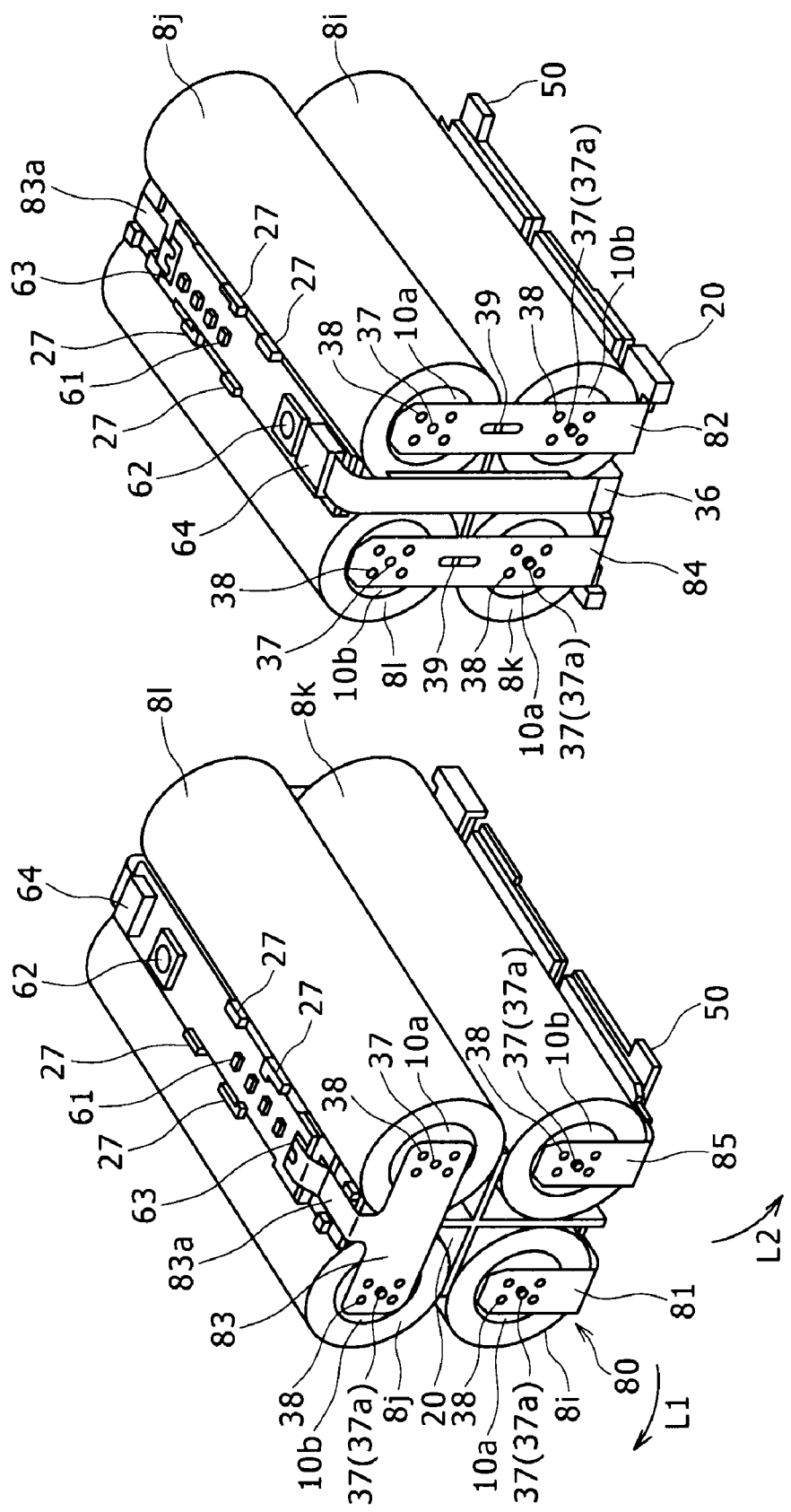
Figure 35:
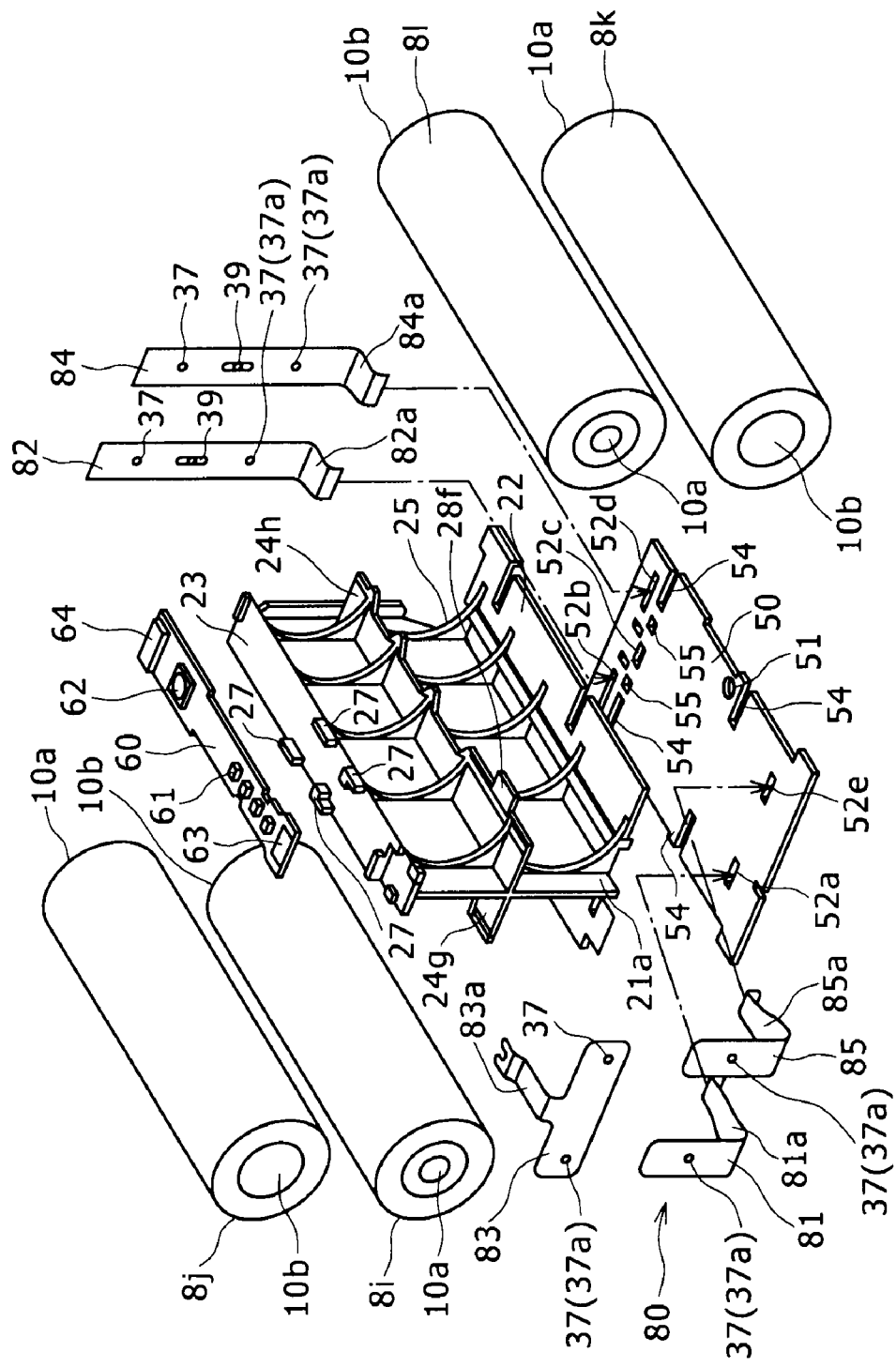
FIG. 35 is an exploded perspective view of the battery cells arranged in two rows and two layers.

As shown in FIG. 33, the battery cells 8i to 8l contained in two rows and two layers in a casing 2 of the S-size battery pack 100 are cylindrical lithium ion secondary cells (hereinafter, the battery cells 8i to 8l will also be referred to simply as the battery cells 8). The battery cells 8 are arranged in two rows and two layers so that their major axes are substantially parallel to the major edges of a main circuit board 50. Specifically, as shown in FIGS. 34A, 34B and 35, of the battery cells 8, the first battery cell 8i is disposed in the vicinity of a first terminal connection part 53a (see FIG. 25B) which is electrically connected to a first terminal part 6a and which is disposed on one side in the width direction of the main circuit board 50, and the second battery 8j is disposed on the first battery cell 8i. In addition, of the battery cells 8, the third battery cell 8k is disposed in the vicinity of a fifth terminal connection part 53e (see FIG. 25B) which is electrically connected to a fifth terminal part 6e and which is disposed on the other side in the width direction of the main circuit board 50, and the fourth battery cell 8l is disposed on the third battery cell 8k.

Further, the first battery cell 8i and the fourth battery cell 8l are so disposed that their positive electrode terminals 10a front on the side of the terminal parts 6, namely, on the side of a front surface 2b. In addition, the second battery cell 8j and the third battery cell 8k are so disposed that their negative electrode terminals 10b front on the side of the terminal parts 6, namely, on the side of the front surface 2b.

In the case where the battery pack 100 is to be used in electronic apparatuses for business use, the battery cells 8 arranged in two rows and two layers as above have to be all (four of them) connected in series, since the battery pack 100 needs a rated voltage of about 14.4 V and each of the battery cells 8 has a rated voltage of about 3.6 V. Taking this into account, the terminals of the battery cells 8 in the state of being partitioned by a partition member 20 are connected through electrode tabs 80, whereby the four battery cells 8 are connected in series.

Specifically, as shown in FIG. 35, the positive electrode terminal 10a of the first battery cell 8i disposed in the row on one side and a first electrode tab connection part 52a of the main circuit board 50 are electrically connected to each other through the first electrode tab 81. The first electrode tab 81 is fixed to the terminal by spot welding, and its tip part 81a is bent and soldered to the first electrode tab connection part 52a.

Further, of the battery cells 8, the negative electrode terminal 10b of the first battery cell 8i disposed in the row on one side and the positive electrode terminal 10a of the second battery cell 8j are electrically connected to each other through a second electrode tab 82. The second electrode tab 82 is fixed to the terminals by spot welding, and its tip part 82a is bent and soldered to a second electrode tab connection part 52b.

In addition, of the battery cells 8, the positive electrode terminal 10b of the second battery cell 8j disposed in the row on one side and the positive electrode terminal 10a of the fourth battery cell 8l disposed in the row on the other side are electrically connected to each other through a third electrode tab 83. The third electrode tab 83 is fixed to the terminals by spot welding.

Further, of the battery cells 8, the positive electrode terminal 10a of the third battery cell 8k disposed in the row on the other side and the negative electrode terminal 10b of the fourth battery cell 8l are electrically connected to each other through a fourth electrode tab 84. The fourth electrode tab 84 is fixed to the terminals by spot welding, and its tip part 34a is bent and soldered to a fourth electrode terminal connection part 52d of the main circuit board 50.

Besides, of the battery cells 8, the negative electrode terminal 10b of the third battery cell 8k disposed in the row on the other side and a fifth electrode tab connection part 52e of the main circuit board 50 are electrically connected to each other through a fifth electrode tab 85. The fifth electrode tab 85 is fixed to the terminal by spot welding, and its tip part 85a is bent and soldered to the fifth electrode tab connection part 52e (hereinafter, the first to fifth electrode tabs 81 to 85 will also be referred to simply as the electrode tabs 80).

Figure 36:
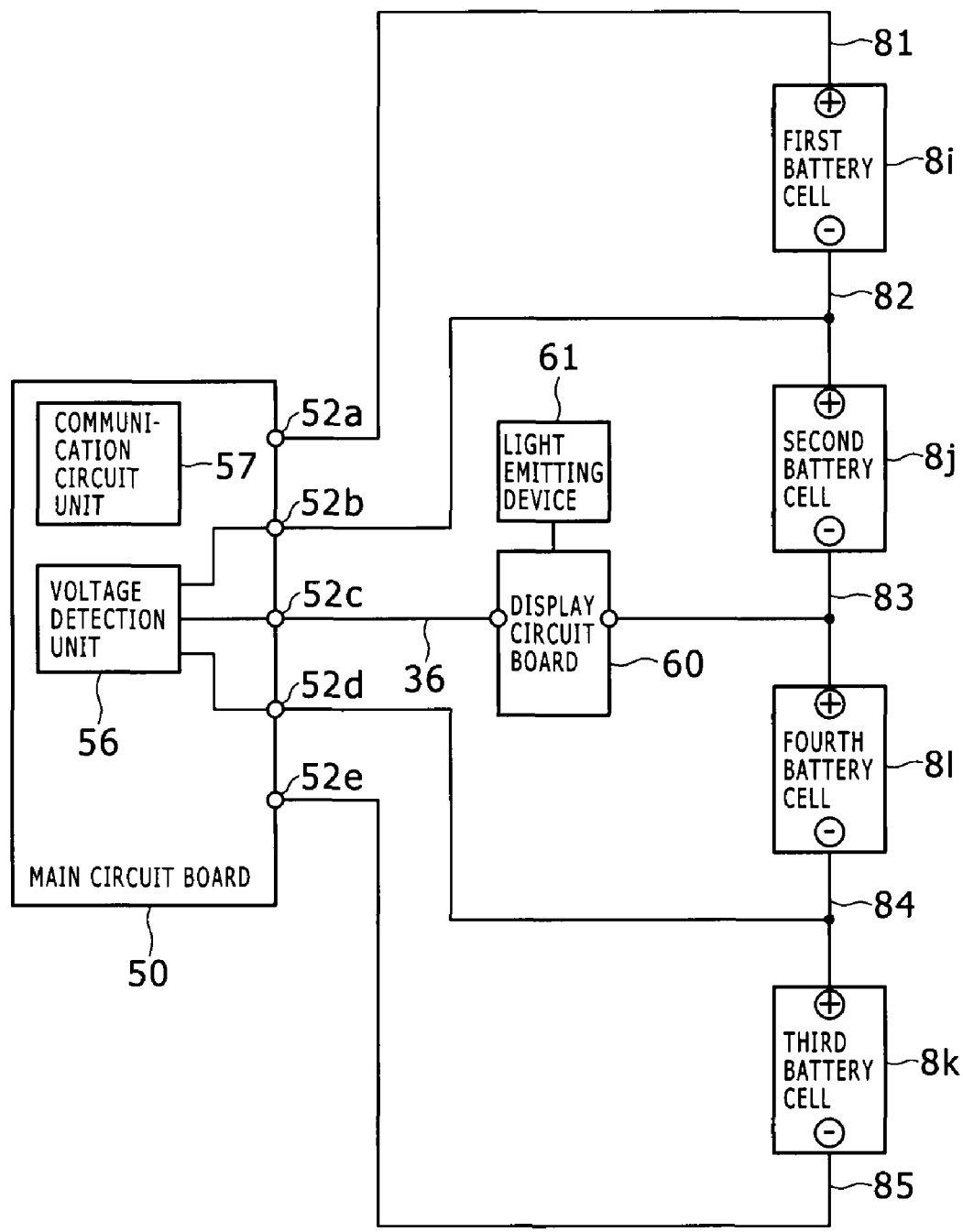
FIG. 36 is a wiring diagram of the battery cells arranged in two rows and two layers.

As shown in FIG. 36, the four battery cells 8 arranged in two rows and two layers as above-described, namely, the first battery cell 8i, the second battery cell 8j, the fourth battery cell 8l and the third battery cell 8k in this order are connected in series through the electrode tabs 80.

Thus, in the battery pack 100 configured as above, the battery cells 8 each having a rated voltage of about 3.6 V are arranged in two rows and two layers over the main circuit board 50, and the four battery cells 8 are connected in series to realize an overall rated voltage of about 14.4 V. Therefore, the battery pack 100 can be used in business-use electronic apparatuses such as the video camera 7.

In addition, as shown in FIGS. 34A and 34B, the partition member 20 is fitted with a display circuit board 60 on the upper side of the second battery cell 8*j* and the fourth battery cell 8*l*. The display circuit board 60 is electrically connected to a board connection tab part 83*a* formed at a substantially middle position of the third electrode tab 83. The board connection tab part 83*a* is bent relative to the third electrode tab 83, and is soldered to a board connection part 63 of the display circuit board 60. Further, the display circuit board 60 is electrically connected to the main circuit board 50 through a flexible flat cable 36. The flexible flat cable 36 is fixed at its one end to a cable connection part 64 of the display circuit board 60, and is electrically connected at its other end to the third electrode tab connection part 52*c* of the main circuit board 50. This permits the third electrode tab 83 to be electrically connected to the main circuit board 50 through the display circuit board 60, without needing complicated wiring or the like.

Thus, in the battery pack 100, as shown in FIG. 36, the first to fifth electrode tabs 81 to 85 are electrically connected to the main circuit board 50 through the first to fifth electrode tab connection parts 52*a* to 52*e*, respectively. Therefore, the voltages across the four respective battery cells 8 connected in series can be detected by a voltage detection unit 56 of the main circuit board 50, so that the residual battery charges of the battery cells 8, the presence/absence of an abnormality in the battery cells 8, etc. can be checked.

The partition member 20 for partitioning these battery cells 8 includes: a roughly rectangular sheet-like partition plate 21; a positioning plate 22 which is formed at one side surface of the partition plate 21 so as to be substantially orthogonal to the principal surfaces of the partition plate 21 and to which the main circuit board 50 is attached; an attaching plate 23 which is formed at the other side surface of the partition plate 21 on the opposite side of the positioning plate 22 and to which the display circuit board 60 is attached; support plates 24*g*, 24*h* (hereinafter, the support plates 24*g* and 24*h* will also be referred to simply as the support plates 24) which are formed at substantially regular intervals between the positioning plate 22 and the attaching plate 23 and which partition each of the rows of the battery cells 8; and reinforcing ribs 25 formed respectively in the corners formed by the partition plate 21 and the support plates 24.

The partition plate 21 has the principal surfaces, each of which the minor edges where the positioning plate 22 and the attaching plate 23 are formed have a length approximately equal to the overall length of the battery cell, and the major edges have a length approximately equal to the overall height of the battery cells 8 stacked in two layers. The partition plate 21 having such principal surfaces is disposed between the one-side row of the battery cells 8 arranged in two rows and two layers, specifically, the row including the first and second battery cells 8*i*, 8*j*, and the other-side row of the battery cells 8, specifically, the row including the third and fourth battery cells 8*k*, 8*l*, thereby partitioning the battery cells 8*i*, 8*j* in the one-side row from the battery cells 8*k*, 8*l* in the other-side row.

In addition, the positioning plate 22, the attaching plate 23 and the display circuit board 60 are configured in the same manner as above-described, and, hence, descriptions of them are omitted.

The support plates 24 provided between the positioning plate 22 and the attaching plate 23, in a total number of two, are provided respectively on the principal surfaces of the partition plate 21, as shown in FIG. 35. Specifically, on each principal surface of the partition plate 21, the support plate 24 is disposed so as to be substantially parallel to the positioning plate 22 and the attaching plate 23, namely, to be substantially orthogonal to the principal surface of the partition plate 21, and to provide substantially regular intervals (which are approximately equal to the diameter of the battery cell 8) along the major edge direction (height direction) of the partition plate 21.

To be more specific, the first support plate 24*g* is formed on the principal surface on one side of the partition plate 21, and the second support plate 24*h* is formed on the principal surface on the other side of the partition plate 21. The first partition plate 24*g* partitions the first battery cell 8*i* and the second battery cell 8*j* from each other. The second support plate 24*h* partitions the third battery cell 8*k* and the fourth battery cell 8*l* from each other. In other words, the first battery cell 8*i* is disposed between the first support plate 24*g* and the positioning plate 22, the second battery cell 8*j* is disposed between the first support plate 24*g* and the attaching plate 23, the third battery cell 8*k* is disposed between the second support plate 24*h* and the positioning plate 22, and the fourth battery cell 8*l* is disposed between the second support plate 24*h* and the attaching plate 23.

In addition, as shown in FIGS. 34A and 34B, of the battery cells 8 arranged in two rows and two layers, partitioned by the partition member 20 and having their terminals electrically connected through the electrode tabs 80, the second battery 8*j* disposed in the one-side row and the fourth battery cell 8*l* disposed in the other-side row are connected through the third electrode tab 83 in the manner of bridging between the one-side row and the other-side row. On the other hand, the first battery cell 8*i* disposed in the one-side row and the third battery cell 8*k* disposed in the other-side row are not connected through the first, second, fourth and fifth electrode tabs 81, 82, 84, 85 in the manner of bridging between the one-side row and the other-side row, either on the side of the front surface 2*b* or on the side of the back surface 2*e*.

Further, referring to the first and second battery cells 8*i*, 8*j*, the negative electrode terminal 10*b* of the first battery cell 8*i* and the positive electrode terminal 10*a* of the second battery cell 8*j* are connected to each other by the second electrode tab 82 on the back surface 2*e* side. Similarly, referring to the third and fourth battery cells 8*k*, 8*l*, the positive electrode terminal 10*a* of the third battery cell 8*k* and the negative electrode terminal 10*b* of the fourth battery cell 8*l* are connected to each other by the fourth electrode tab 84 on the back surface 2*e* side. In the case where for example the battery pack is handled by the manufacturer, the first battery cell 8*i* may be turned in the direction of arrow L1 in FIG. 34A, with the second electrode tab 82 as a center, in such a manner that the positive electrode terminal 10*a* side of the first battery 8*i* would be loosened and released from the partition member 20. Similarly, the third battery cell 8*k* may be turned in the direction of arrow L2 in FIG. 34A, with the fourth electrode tab 84 as a center, in such a manner that the negative electrode terminal 10*b* side of the third battery cell 8*k* would be loosened and released from the partition member 20.

In order to obviate such a trouble, the first battery 8*i* and the third battery cell 8*k* are supported by the support plates 24 so that they would not be loosened and released from the partition member 20. The first support plate 24*g* is provided with a first projected piece (not shown) for supporting the first battery cell 8*i*, and the second support plate 24*h* is provided with a second projected piece 28*f* for supporting the second battery cell 8*j* (hereinafter, the first projected piece (not shown) and second projected piece 28f will also be referred to simply as the projected pieces 28).

The first projected piece 28 (not shown) cooperates with the positioning plate 22 adjacent thereto in the height direction in clampingly supporting therebetween the first battery cell 8i disposed between the first projected piece (not shown) and the positioning plate 22. The second projected piece 28f cooperates with the positioning plate 22 adjacent thereto in the height direction in clampingly supporting therebetween the third battery cell 8k disposed between the second projected piece 28f and the positioning plate 22. In other words, the first battery cell 8i is supported by being clamped between the first projected piece (not shown) and the positioning plate 22, and the third battery cell 8k is supported by being clamped between the second projected piece 28f and the positioning plate 22.

This ensures that, with the first battery cell 8i and the third battery cell 8k supported by the support plates 24, the projected pieces 28 can prevent the first battery cell 8i and the third battery cell 8k (which are not connected by the electrode tabs 80 in the manner of bridging between the one-side row and the other-side row) from being loosened and released from the support plates 24.

Reinforcing ribs 25, the electrode tabs 80, a lower case 4, and an upper cover 3 are configured in the same manner as in the above-described battery pack 1, and, therefore, descriptions of them are omitted.

In the battery pack 1 configured as above-described, the battery cells 8 each having a rated voltage of about 3.6 V are arranged in two rows and four layers, the battery cells 8 in each set of paired battery cells are connected in parallel, and the four sets of the parallel-connected paired battery cells 8 are sequentially connected in series, whereby a rated voltage of about 14.4 V can be realized, permitting the battery pack 1 to be used in business-use electronic apparatuses.

In addition, in the battery pack 1, the battery cells 8 are arranged in two rows and four layers, so that the area of the lower surface 2a serving as a mount surface in mounting into the battery mount part 5 of the electronic apparatus is made to be equal to the area occupied by two battery cells 8 arranged side by side; thus, the insertion area can be reduced.

Further, in the battery pack 1, the partition member 20 is fitted with the display circuit board 60 on the upper side of the fourth battery cell 8d and the eighth battery cell 8h, so that the electronic parts mounted on the display circuit board 60 such as the light emitting devices 61 and the residual charge display switch element 62 can be exposed to the exterior from the upper surface 2f of the upper cover 3.

Besides, in the battery pack 1, the display circuit board 60 is electrically connected to the board connection tab part 33d formed at a substantially middle position of the continuous tab part 33c of the third electrode tab 33, and, further, the display circuit board 60 is electrically connected to the main circuit board 50 through the flexible flat cable 36. Therefore, the third electrode tab 33 can be electrically connected to the main circuit board 50 through the display circuit board 60, without need for complicated wiring or the like.

Further, in the battery pack 1, the main circuit board 50 is electrically connected through the first to fifth electrode tabs 31 to 35 for electrical connection between the terminals of the battery cells 8. Therefore, respective set voltages of the sets of parallel-connected paired battery cells 8 can be detected by the voltage detection unit 56 in the main circuit board 50, and it is possible to check the residual battery charges of the battery cells 8, the presence/absence of an abnormality in the battery cells 8, etc.

Incidentally, the battery packs 1, 100 are not limited to the configuration in which the four sets (a total number being eight) of parallel-connected paired battery cells 8 are connected in series or the four battery cells 8 are directly connected in series, for realizing a rated voltage of about 14.4 V which is demanded for business-use electronic apparatuses. For example, a configuration may be adopted in which four sets (a total number being twelve) of three-membered grouped battery cells are connected in series to realize a rated voltage of about 14.4 V.

In addition, the application of the battery packs 1, 100 is not limited to the application to the video camera 7 described above, and the battery packs are applicable also to other electronic apparatuses for business use.

Further, the application of the battery packs 1, 100 is not limited to the application to business-use electronic apparatus described above, and the battery packs are applicable also to private-use electronic apparatuses.

It should be understood by those skilled in the art that various modifications, combinations, sub-combinations and alterations may occur depending on design requirements and other factors insofar as they are within the scope of the appended claims or the equivalents thereof.

What is claimed is:

1. A battery pack comprising:
a roughly rectangular casing including support protrusions extending from a bottom surface of the case into an interior of the case;
a partition member that supports cylindrical battery cells, the partition member being supported by the support protrusions;
a main circuit board disposed in the interior of the case and at the bottom surface of said casing, the main circuit board including holes having a greater diameter than a diameter of the support protrusions, the support protrusions extending from the bottom of the case through the holes in the main circuit board to the partition member; and
the cylindrical battery cells arranged in two rows and two layers over said main circuit board and connected in series, said cells including:
a first battery cell having a positive electrode terminal disposed in the vicinity of a positive electrode terminal connection part of said main circuit board provided with said positive electrode terminal connection part on one side and with a negative electrode terminal connection part on the other side;
a second battery cell disposed over said first battery cell in the state of having a negative electrode terminal directed to the side to which a positive electrode terminal of said first battery cell is directed;
a third battery cell having a negative electrode terminal disposed at said negative electrode terminal connection part of said main circuit board;
a fourth battery cell disposed over said third battery cell in the state of having a positive electrode terminal directed to the side to which said negative electrode terminal of said third battery cell is directed;
said positive electrode terminal connection part of said main circuit board and said positive electrode terminal of said first battery cell being electrically connected to each other through a first electrode tab;
a negative electrode terminal of said first battery cell and a positive electrode terminal of said second battery cell being electrically connected to each other through a second electrode tab;

a negative electrode terminal of said second battery cell and a positive electrode terminal of said fourth battery cell being electrically connected to each other through a third electrode tab;

a positive electrode terminal of said third battery cell and a negative electrode terminal of said fourth battery cell being electrically connected to each other through a fourth electrode tab; and said negative electrode terminal of said fourth battery cell and said negative electrode terminal connection part of said main circuit board being electrically connected to each other through a fifth electrode tab.

2. The battery pack as set forth in claim 1, wherein a display circuit board is disposed over said second battery cell and said fourth battery cell.

3. The battery pack as set forth in claim 2, wherein a middle point of said third electrode tab is electrically connected to said display circuit board, and is connected to said main circuit board through said display circuit board.

4. The battery pack as set forth in claim 1, wherein said main circuit board is provided with a voltage detection unit;

said first to fifth electrode tabs are electrically connected to said main circuit board; and voltages of said first to fourth battery cells are detected by said voltage detection unit of said main circuit board through said first to fifth electrode tabs.

5. The battery pack as set forth in claim 1, wherein three or more support protrusions extend from the bottom of the case through the holes in the main circuit board to the partition member to support the partition member.

\* \* \* \* \*